(12) United States Patent
Lochtefeld

(10) Patent No.: US 6,716,107 B2
(45) Date of Patent: *Apr. 6, 2004

(54) CONTAINERLESS SHEET FLOW WATER RIDE

(75) Inventor: Thomas J. Lochtefeld, La Jolla, CA (US)

(73) Assignee: Light Wave, Ltd., NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/010,163

(22) Filed: Nov. 16, 2001

(65) Prior Publication Data

US 2002/0072422 A1 Jun. 13, 2002

Related U.S. Application Data

(63) Continuation of application No. 09/594,386, filed on Jun. 13, 2000, now Pat. No. 6,319,137, and a continuation of application No. 09/265,722, filed on Mar. 9, 1999, now Pat. No. 6,132,317, which is a continuation of application No. 08/826,902, filed on Apr. 9, 1997, now Pat. No. 5,899,633, which is a continuation of application No. 08/398,158, filed on Mar. 3, 1995, now Pat. No. 5,628,584, which is a division of application No. 07/866,073, filed on Apr. 1, 1992, now Pat. No. 5,401,117, which is a continuation of application No. 07/722,980, filed on Jun. 28, 1999, now abandoned, which is a continuation-in-part of application No. 07/577,741, filed on Sep. 4, 1990, now Pat. No. 5,236,280.

(51) Int. Cl.[7] .............................................. A63G 21/18
(52) U.S. Cl. ........................................ 472/117; 472/128
(58) Field of Search .................................. 472/116, 117, 472/128, 129; 104/69, 70; 405/79

(56) References Cited

U.S. PATENT DOCUMENTS

| 490,484 | A | 1/1893 | Mackaye |
|---|---|---|---|
| 799,708 | A | 9/1905 | Boyce |
| 1,655,498 | A | 1/1928 | Fisch |
| 1,701,842 | A | 2/1929 | Fisch |
| 1,871,215 | A | 8/1932 | Keller et al. |
| 1,884,075 | A | 10/1932 | Meyers |
| 2,815,951 | A | 12/1957 | Baldanza |
| 3,005,207 | A | 10/1961 | Matrai |
| 3,038,760 | A | 6/1962 | Crooke |
| 3,085,404 | A | 4/1963 | Smith |
| 3,473,334 | A | 10/1969 | Dexter |
| 3,477,233 | A | 11/1969 | Andersen |
| 3,478,444 | A | 11/1969 | Presnell et al. |
| 3,562,823 | A | 2/1971 | Koster |
| 3,598,402 | A | 8/1971 | Frenzl |
| 3,789,612 | A | 2/1974 | Richard et al. |
| 3,802,697 | A | 4/1974 | Le Mehaute |

(List continued on next page.)

FOREIGN PATENT DOCUMENTS

| DE | 159793 | 8/1903 |
|---|---|---|
| DE | 373684 | 7/1932 |
| DE | 22 22 594 | 5/1972 |

(List continued on next page.)

OTHER PUBLICATIONS

Hornung, PhD, Hans. "Surfing im Labor, die Stromungsmechanik des Wellenreitens," vol. 32, Feb. 1981. pp. 21–26.
Frenzl, Dr. O. "Surfing Pool als Skipistensimulator," Apr. 1977.

(List continued on next page.)

*Primary Examiner*—Kien T. Nguyen
(74) *Attorney, Agent, or Firm*—Knobbe, Martens, Olson & Bear, LLP

(57) ABSTRACT

A water ride attraction is disclosed which utilizes a containerless riding surface to eliminate disadvantageous boundary layer effects. A sheet flow of water is directed up the incline to produce a simulated wave. The configuration and contour of the riding surface and the various flow parameters can be widely varied to produce numerous desirable wave conditions.

49 Claims, 42 Drawing Sheets

U.S. PATENT DOCUMENTS

| | | |
|---|---|---|
| 3,851,476 A | 12/1974 | Edwards |
| 3,913,332 A | 10/1975 | Forsman |
| 3,981,612 A | 9/1976 | Bunger et al. |
| 4,201,496 A | 5/1980 | Andersen |
| 4,276,664 A | 7/1981 | Baker |
| 4,522,535 A | 6/1985 | Bastenhof |
| 4,539,719 A | 9/1985 | Schuster et al. |
| 4,564,190 A | 1/1986 | Frenzl |
| 4,662,781 A | 5/1987 | Tinkler |
| 4,790,685 A | 12/1988 | Scott et al. |
| 4,792,260 A | 12/1988 | Sauerbier |
| 4,905,987 A | 3/1990 | Frenzl |
| 4,954,014 A | 9/1990 | Sauerbier et al. |
| 5,171,101 A | * 12/1992 | Sauerbier et al. ............. 405/52 |

FOREIGN PATENT DOCUMENTS

| | | |
|---|---|---|
| DE | 271412 | 10/1978 |
| DE | 27 14 223 | 10/1978 |
| DE | 34 45 976 | 10/1985 |
| EP | 0 096 216 | 12/1987 |
| FR | 1019527 | 10/1952 |
| FR | 1300144 | 6/1962 |
| FR | 1539959 | 8/1968 |
| GB | 1090262 | 2/1965 |
| GB | 1118083 | 3/1966 |
| GB | 1159269 | 11/1967 |
| JP | 52-41392 | 3/1977 |
| JP | 64-19490 | 1/1989 |
| JP | 2-57170 | 4/1991 |
| JP | 3-258280 | 11/1991 |
| SU | 212138 | 4/1968 |
| SU | 953075 | 8/1982 |
| WO | WO 83/04375 | 12/1983 |
| WO | WO 90/06790 | 6/1990 |

OTHER PUBLICATIONS

Fauvelle/Blocquel. Brevet D'Invention, Sep. 19, 1933.

Hornung/Killen. "A Stationary Oblique Breaking Wave for Laboratory Testing of Surfboards," May 7, 1976.

Killen. "Model Studies for a Wave Riding Facility," Aug. 1980.

Killen/Stalker. "A Facility for Wave Riding Research," Dec. 2, 1983.

* cited by examiner

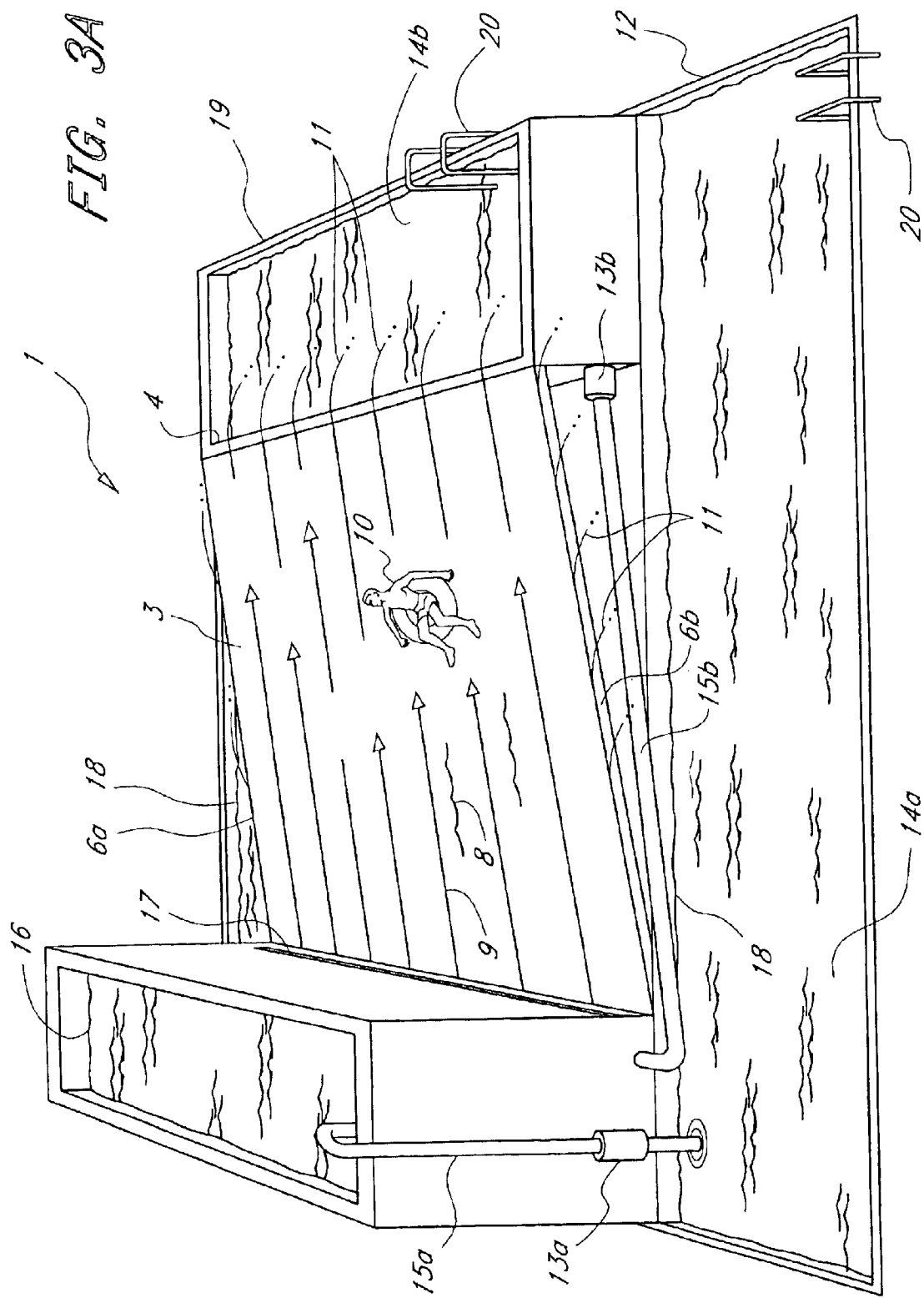

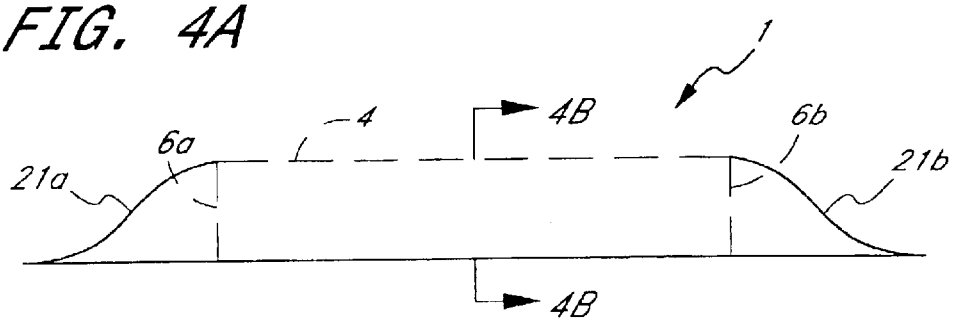
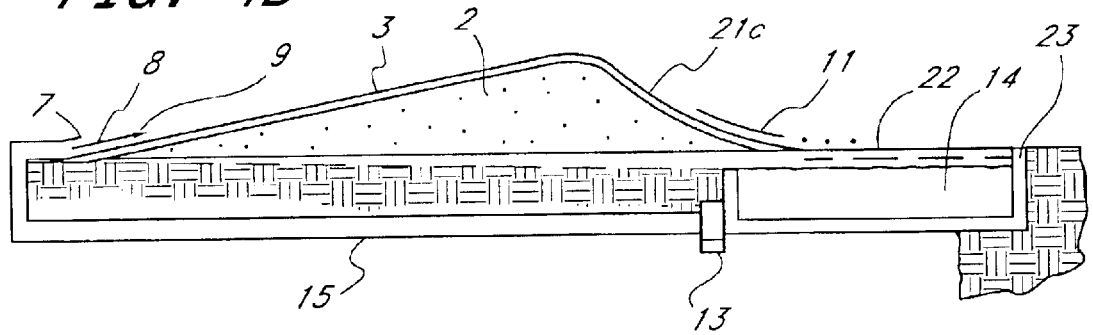
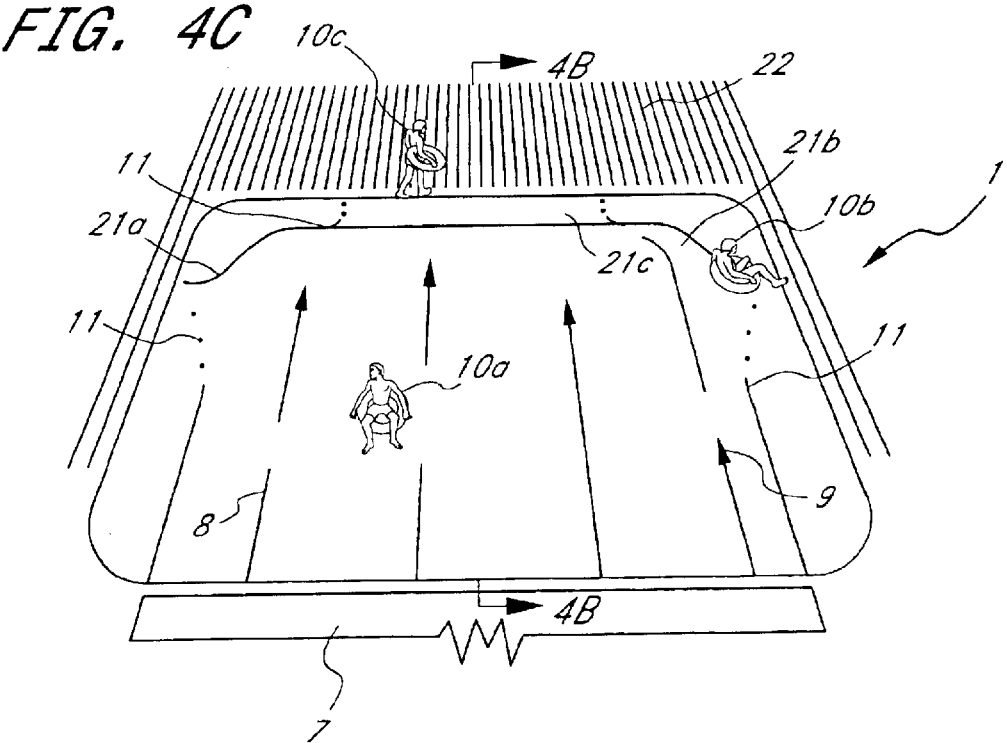

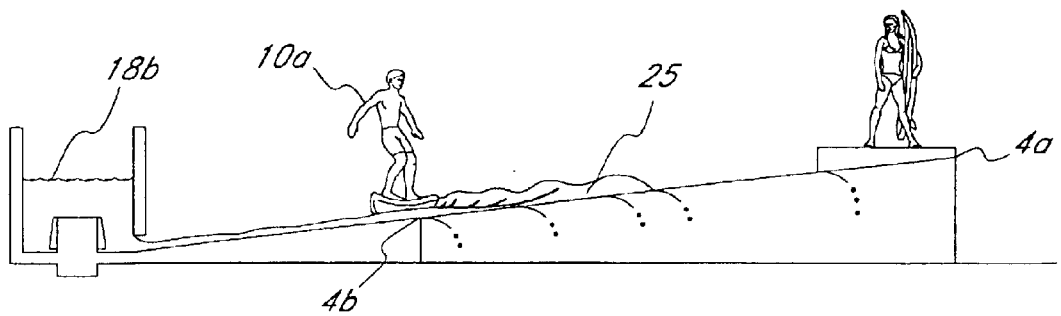
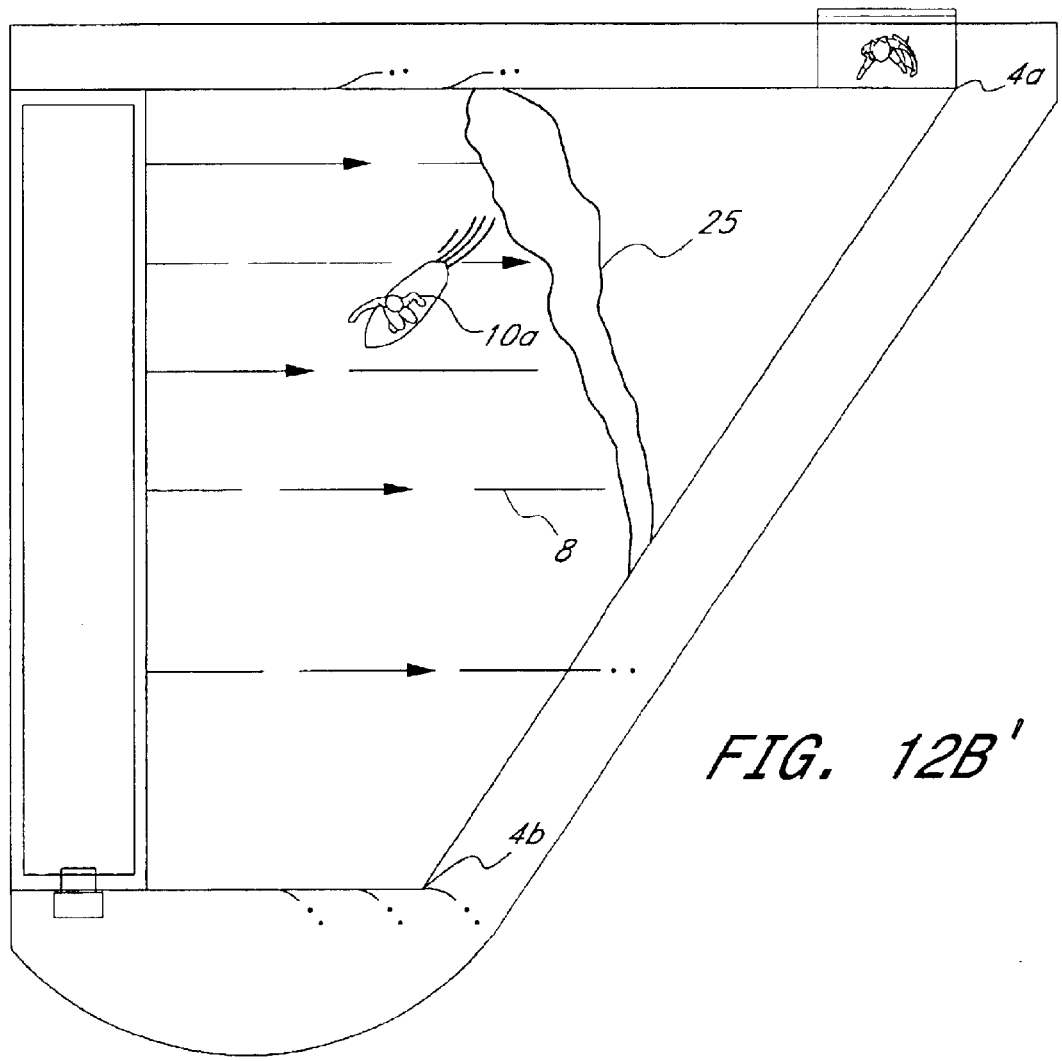

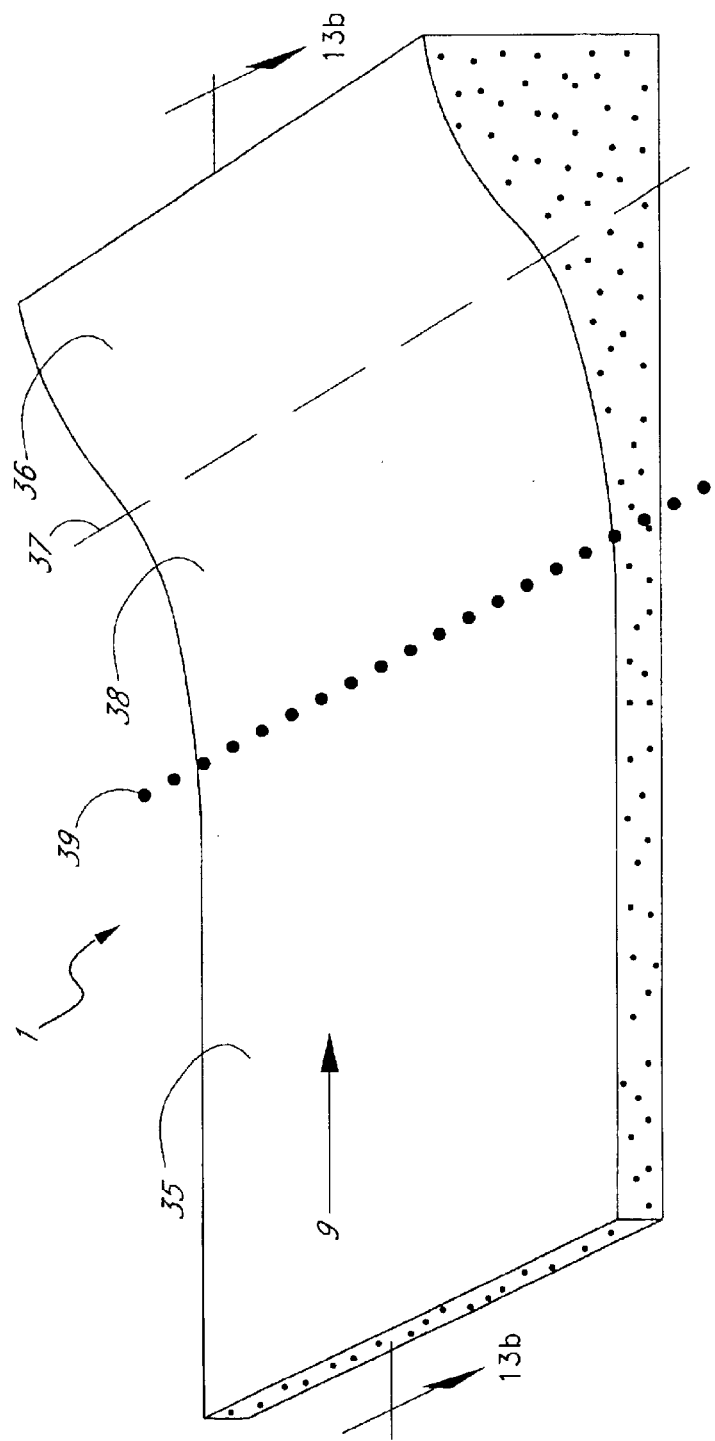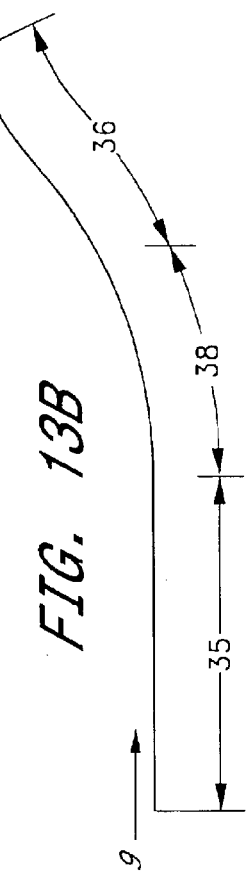
FIG. 13A
FIG. 13B

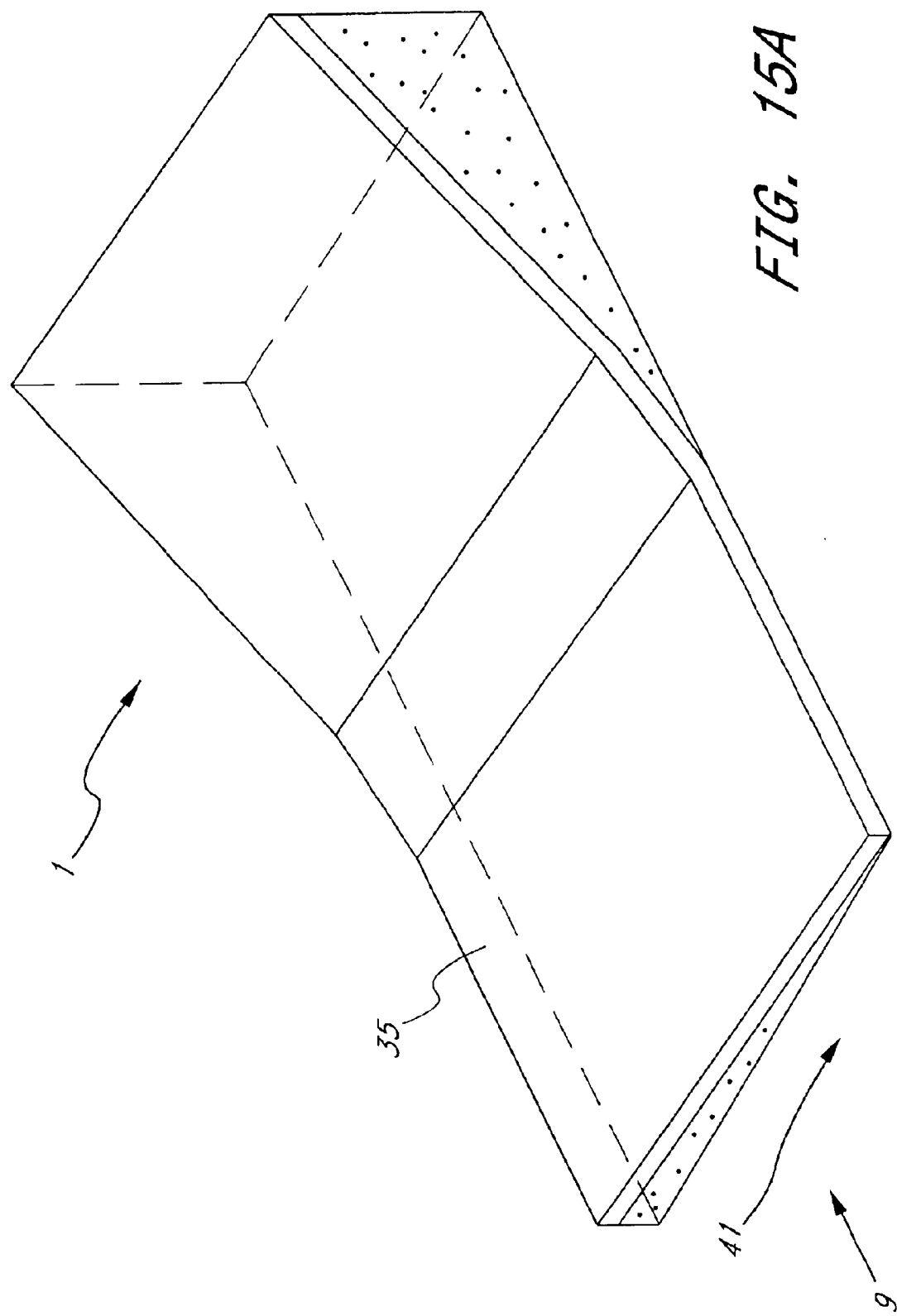

CONTAINERLESS SHEET FLOW WATER RIDE

RELATED APPLICATIONS

This application is a continuation of U.S. Ser. No. 09/594,386, filed Jun. 13, 2000, now U.S. Pat. No. 6,319,137, which is hereby incorporated by reference in its entirety, and which is a continuation of U.S. Ser. No. 09/265,722, filed Mar. 9, 1999, now U.S. Pat. No. 6,132,317, issued Oct. 17, 2000, which is a continuation of U.S. Ser. No. 08/826,902, filed Apr. 9, 1997, now U.S. Pat. No. 5,899,633, issued May 4, 1999, which is a continuation of U.S. Ser. No. 08/398,158, filed Mar. 3, 1995, now U.S. Pat. No. 5,628,584, issued May 13, 1997, which is a division of U.S. Ser. No. 07/866,073, filed Apr. 1, 1992, now U.S. Pat. No. 5,401,117, issued Mar. 28, 1995, which is a continuation of U.S. Ser. No. 07/722,980, filed Jun. 28, 1991, abandoned, which is a continuation-in-part of U.S. Ser. No. 07/577,741, filed Sep. 4, 1990, now U.S. Pat. No. 5,236,280, issued Aug. 17, 1993.

BACKGROUND OF THE INVENTION

1. Field of the Invention

The present invention relates in general to water rides, and specifically a method and apparatus for providing a flowing body of water on a containerless surface with a portion thereof being inclined. By regulating the speed and depth of flow in relation to the area and angles of containerless incline, novel flow dynamics are generated which enable rider controlled water-skimming activity analogous to the sport of surfing.

2. Description of the Related Art

For the past 25 years, surfboard riding and associated wave riding activities, e.g., knee-boarding, body or "Boogie" boarding, skim-boarding, surf-kayaking, inflatable riding, and body surfing (all hereinafter collectively referred to as wave-riding) have continued to grow in popularity along the world's surf endowed coastal shorelines. In concurrence, the 80's decade has witnessed phenomenal growth in the participatory family water recreation facility, i.e., the waterpark. Large pools with manufactured waves have been an integral component in such waterparks. Several classes of wavepools have successfully evolved. The most popular class is that which enables swimmers or inner-tube/inflatable mat riders to bob and float on the undulating unbroken swells generated by the wave apparatus. Although small breaking waves can result from this class of wavepool, it is not an ideal wave for wave-riding. A few pools exist that provide large turbulent white-water bores that surge from deep to shallow pool end. Such pools enable white water bore (broken wave) riding, however, broken wave riding is not preferred by the cognoscenti of the wave-riding world. The type wave which holds ultimate appeal to a wave-rider is a combination of unbroken yet rideable wave face with a "breaking"/"transitioning" curl or spill.

The ideal unbroken yet rideable wave face can be described as a smooth inclined mound of water of at least one meter in height with a face of sufficient incline such that the gravity force component can allow a rider to overcome the forces of drag and perform water skimming (e.g., surfing) maneuvers thereon. The classic breaking wave can be described as one moving obliquely incident to a beach; having a wave height in excess of one meter; having a portion closest to the beach that is broken, while that portion farthest from the beach has a smooth surface; having the transition from the smooth to the broken part of the wave occurring continuously over a region spanning a few wave heights; and having a transition area with a duration in excess of 10 seconds. In a breaking wave, this transition area is of particular interest to the wave-rider. The transition area is where the wave-rider performs optimum water skimming (e.g., surfing) maneuvers. The transition area is also where the wave face reaches its maximum angle of steepness.

As a wave-rider develops in skill from beginner to advanced, he or she will seek mastery upon different types of waves. First timers start on the "inside" with an already broken white water bore. These waves are the easiest to catch, however, they offer little opportunity for surfing maneuvers. The next step is to move to the "outside, Just past the break zone. Here a beginner prefers an unbroken wave with only enough steepness to allow them to "catch" the wave. As the wave breaks, beginners prefer a gentle spilling type wave. The more advanced a wave-rider becomes the greater is the preference for steeper waves, with an ultimate wave shape resembling a progressive tube or tunnel.

For years, inventors have attempted to mechanically duplicate the ideal wave for wave-riding that will offer the complete range of wave-riding experience for beginners and advanced riders alike. The majority of such attempts focus on reproduction of travelling, progressive gravity waves found naturally occurring at a beach. Unfortunately, such attempts have met with limited success for wave-riding. Problems inherent to travelling progressive wave technology include: safety, skill, cost, size and capacity. Reproduction of travelling, progressive breaking waves require a large pool with expensive wave generating equipment. Desired increases in wave size result in inherently more dangerous conditions, e.g., deeper water and strong currents. Access to travelling progressive waves usually requires a strenuous swim or paddle through broken waves in order to properly position oneself in the unbroken wave "take-off zone." Catching a progressive breaking wave requires split-second timing and developed musculature. Riding a progressive breaking wave requires extensive skill in balancing the hydrodynamic lift forces associated with a planing body and the buoyancy forces associated with a displacement body. Progressive waves are an inherently low capacity attraction for water parks, i.e., one or two riders per wave. As a consequence of limited wave quality, inordinate participant skill, excessive cost, potential liability, and large surface area to low rider capacity ratios, wavepools specifically designed to produce conventional travelling progressive breaking waves have proven, with few exceptions, unjustifiable in commercial application.

Le Mehaute (U.S. Pat. No. 3,802,697) and the following three publications: (1) Hornung, H G and Killen, P., "A Stationary Oblique Breaking Wave For Laboratory Testing Of Surfboards," Journal of Fluid Mechanics (1976), Vol 78, Part. 3, pages 459–484; (2) P. D. Killen, "Model Studies Of A Wave Riding Facility," 7th Australasian Hydraulics and Fluid Mechanics Conference, Brisbane, (1980); and (3) P. D. Killen and R. J. Stalker, "A Facility For Wave Riding Research," Eighth Australasian Fluid Mechanics Conference, University of Newcastle, N.S.W. (1983), (all three articles will be collectively referred to as "Killen") describe the production of a unique class of progressive waves called a stationary wave. Stationary waves, as opposed to the aforementioned travelling waves, are normally found in rivers where submerged boulders act to disturb the flowing river water, creating a wave which advances against the current at an equal and opposite speed to remain stationary relative to the bottom.

The stationary breaking waves as contemplated by Le Mehaute and Killen avoid the "moving target" problem associated with travelling progressive gravity waves. Consequently, from a shore bound observer's perspective, they are more predictable, easier to observe, and easier to access. Although improved, the stationary breaking waves of Le Mehaute and Killen when applied to the commercial water recreation setting are still plagued by significant progressive wave problems. In particular these problems include: inordinate rider skill to catch and ride the wave, deep water drowning potential (since the water depth is greater than the height of the breaking wave) and high costs associated with powering the requisite flow of water to form the wave. In other words, both Le Mehaute and Killen still contemplate relatively deep bodies of water comparable to that found at the ocean shore.

Furthermore, the wave forming process of Le Mehaute and Killen involves an obstacle placed in a flow of water bounded by containment walls. The hydraulic state of the flow is described as supercritical flow going up the face of the obstacle, critical flow at the top or crest of the obstacle as the wave breaks (a towering "hydraulic jump"), and subcritical flow over the back of the obstacle. A submerged dividing stream surface splits the supercritical upstream portion from the subcritical downstream portion which flows over the back of their respective obstacles. A corollary to this "critical flow" breaking process (i.e., where the Froude number equals one at the point of break) is the relationship of water depth with wave size, wherein the maximum wave height obtainable is ⅔ the water depth. Consequently, in Killen and Le Mehaute, the larger the desired wave the deeper the associated flow.

The above-described disadvantage has enormous economic significance. Killen and Le Mehaute require pumps with enormous pumping capacity to produce a larger sized wave. Furthermore, a rider's performance under a deep flow condition requires great skill. By way of example, when a waverider paddles to catch a wave in a deep water flow (a deep water flow is where the pressure disturbance due to the rider and his vehicle is not influenced by the proximity of the bottom) his vehicle serves primarily as a displacement hull sustained by the buoyancy force and transitions to primarily a planing hull (reducing the draft of the board) as a result of the hydrodynamic lift that occurs from paddling and upon riding the wave. The forces involved in riding this wave is a combination of buoyancy and hydrodynamic lift. The faster the board goes the more the lift is supporting the weight of the rider and the less the buoyancy force. In reaction to this lift, there is an increase in pressure directly underneath the board. This pressure disturbance diminishes at a distance from the board in ratio to one over the square of the distance.

In a deep water flow environment, by the time the pressure disturbance reaches the flow bed, it has already attenuated to such a low level that the bottom creates a negligible influence on that pressure disturbance. Consequently, there is no reaction to be transferred to the rider. This lack of bottom reaction in a deep water flow leaves a rider with no support. Lack of support results in greater physical strength required to paddle, and to transition the surfboard from a displacement hull to a planing hull, in order to catch the wave. Lack of support also results in greater instabilities with axiomatic greater skill required to ride the wave. Furthermore, a deep water flow has inherently increased drowning potential. For example, a 2 foot high breaking wave requires a 5.38 knot current in 2.5 feet of water. Not even an Olympic swimmer could avoid being swept away in such current.

Frenzl (U.S. Pat. Nos. 3,598,402 (1971), 4,564,190 (1986) and 4,905,987 (1990)) describes water flow up an incline. However, in addition to the above-described disadvantages, the structure of Frenzl is described as the bottom of a container. The side walls of this container function to constrain the water flow in its upward trajectory in expectation of conserving maximum potential energy for subsequent recirculation efficiency. However, it has been found that such side walls propagate oblique waves which can interfere with the formation of supercritical flow and eliminate the possibility of breaking waves. That is, the container of Frenzl simply fills with water and submerges any supercritical flow. The side wall containment also proves detrimental in its ability to facilitate ride access. Further, Frenzl's device is designed for wave riding in equilibrium. The majority of wave riding maneuvers, however, require movement or oscillation around a point of equilibrium through the various zones of inequilibrium, in order to achieve maneuvers of interest.

SUMMARY OF THE INVENTION

Accordingly, it is a principle object and advantage of the present invention to overcome some or all of these limitations and to provide an improved stationary wave forming apparatus and method which eliminates boundary layer induced subcritical flow and associated flow disturbance which greatly diminish wave quality. That is, during the operation of a wave making apparatus having side wall containment, drag forces along the side walls result in localized subcritical flow. The transition from supercritical to subcritical flow along these sidewalls generates an undesirable wave envelope properly termed an "oblique wave."

In an inclined flow environment, it is extremely easy for such oblique waves to form, because, as these waves propagate against the flow, they have a downhill component that gains an extra increase in energy from the downhill change in elevation. Since this gain in energy results in a gain in amplitude as the oblique waves move downhill against the current, they create a "chop" which not only impairs a rider in his performance of water skimming maneuvers, but also propagates and leads to choking of the entire flow.

Therefore, in order to eliminate these disadvantages, the present invention provides a containerless incline which prevents the formation of oblique waves. The inclined riding surface is configured without lateral water constraints which permit low velocity water runoff, so that the main flow of water up the incline remains at or above desired velocity. Thus, riding wave quality, as well as a diversity of wave types, can be achieved and maintained. It should also be pointed out that, in addition to countless configurations of the present invention, the principals of this invention can be accomplished in accordance with several other methods for eliminating boundary layer induced subcritical flow.

Another feature of the present invention is that the preferred water flow type over the containerless incline is a relatively thin "sheet" flow, rather than the relatively deep water utilized in the prior art. A sheet flow is where the water depth is sufficiently shallow such that the pressure disturbance caused by a rider and his vehicle is influenced by the riding surface through a reaction force, whose effects on the rider and his vehicle are generally known as the "ground effect." This provides for an inherently more stable ride, thus requiring less skill to catch and ride the wave.

In the sheet flow situation, the board is so close to a solid boundary, i.e., the flow bed or riding surface, that the pressure disturbance form the board does not have time to diminish before it comes in contact with the solid boundary. This results in the pressure disturbance transmitting through the fluid and directly to the ground. This allows the ground to participate, as a reaction wall, against the weight of the riders body and helps to support the rider by virtue of the ground effect. Thus, sheet flows are inherently more stable than deeper water flows. From the perspective of an accomplished rider, the ground effect principal offers improved performance in the form of more responsive turns, increased speed, and tighter radius maneuvers resulting from lift augmentation that enables a decrease in vehicle planing area.

Sheet flows also can provide a conforming flow in the sense that the flow generally follows the contours of the riding surface. Therefore, this enables one to better control the shaping of the waves as they conform to the riding surface, while still achieving wave special effects when insufficient velocity at the boundary layer allows for flow separation from the contoured flow bed.

In this regard, it should be pointed out that, with a sheet flow up a containerless incline, no wave is necessarily required in order for a rider to enjoy a water attraction constructed in accordance with the principals of the present invention. All that is required is an incline of sufficient angle to allow the rider to slide down the upwardly sheeting flow. Furthermore, intentional rider-induced drag can slow the rider and send him back up the incline to permit additional maneuvers. Likewise, if desired, the rider can achieve equilibrium (e.g., a stationary position with respect to the flow) by regulating his drag relative to the uphill waterflow.

Another feature of the present invention is that, whenever a hydraulic jump occurs, there is no critical and subcritical flow over the top and back of the obstacle (i.e., "containerless incline"), in fact, the top or crest of the obstacle utilized by the subject invention is dry. Additionally, the subject invention describes a separation streamline that not only defines the transition from supercritical to subcritical, it divides the wet lower portion of the incline surface from its dry upper portion. The phenomenon of a separation streamline is absent in the prior art. Of great significance is the fact that the subject invention has no correspondence between wave size and water depth; consequently, the illusion of a large wave can be produced with advantageous shallow flows.

The principals of the present invention are applicable to incredibly diverse stationary wave conditions. For example, the degree of inclination of the inclined riding surface can be varied widely to achieve various effects. The riding surface can also be canted about its longitudinal axis or provided with mounds, shapes, forms, or a variety of contours to produce a wave of a particular shape.

The riding surface can also be extended, shortened, symmetrical, asymmetrical, planar, or have a complex curvature. In addition, the depth or velocity of the flow can be varied from one ride to another, or even in a gradient on a single ride. Also, of course, all of the above parameters can be varied individually or simultaneously, along with other parameters within the scope of this invention.

To better understand the advantages of the invention, as described herein, a more detailed explanation of a few terms set forth below is provided. However, it should be pointed out that these explanations are in addition to the ordinary meaning of such terms, and are not intended to be limiting with respect thereto.

Deep water flow is a flow having sufficient depth such that the pressure disturbance from the rider and his vehicle are not significantly influenced by the presence of the bottom.

A body of water is a volume of water wherein the flow of water comprising that body is constantly changing, and with a shape thereof at least of a length, breadth and depth sufficient to permit water skimming maneuvers thereon as limited or expanded by the respective type of flow, i.e., deep water or sheet flow.

Water skimming maneuvers are those maneuvers capable of performance on a flowing body of water upon a containerless incline including: riding across the face of the surface of water; riding horizontally or at an angle with the flow of water; riding down a flow of water upon an inclined surface countercurrent to the flow moving up said incline; manipulating the planing body to cut into the surface of water so as to carve an upwardly arcing turn; riding back up along the face of the inclined surface of the body of water and cutting-back so as to return down and across the face of the body of water and the like, e.g., lip bashing, floaters, inverts, aerials, 360's, etc. Water skimming maneuvers can be performed with the human body or upon or with the aid of a riding or planing vehicle such as a surfboard, bodyboard, water ski(s), inflatable, mat, innertube, kayak, jet-ski, sail boards, etc. In order to perform water skimming maneuvers, the forward force component required to maintain a rider (including any skimming device that he may be riding) in a stable riding position and overcome fluid drag is due to the downslope component of the gravity force created by the constraint of the solid flow forming surface balanced primarily by momentum transfer from the high velocity upward shooting water flow upon said forming surface. A rider's motion upslope (in excess of the kinetic energy added by rider or vehicle) consists of the rider's drag force relative to the upward shooting water flow exceeding the downslope component of gravity. Non-equilibrium riding maneuvers such as turns, cross-slope motion and oscillating between different elevations on the "wave" surface are made possible by the interaction between the respective forces as described above and the use of the rider's kinetic energy.

The equilibrium zone is that portion of a inclined riding surface upon which a rider is in equilibrium on an upwardly inclined body of water that flows thereover; consequently, the upslope flow of momentum as communicated to the rider and his vehicle through hydrodynamic drag is balanced by the downslope component of gravity associated with the weight of the rider and his vehicle.

The supra-equidyne area is that portion of a riding surface contiguous with but downstream (upslope) of the equilibrium zone wherein the slope of the incline is sufficiently steep to enable a water skimming rider to overcome the drag force associated with the upwardly sheeting water flow and slide downwardly thereupon.

The sub-equidyne area is that portion of a riding surface contiguous with but upstream (downslope) of the equilibrium zone wherein the slope of the incline is insufficiently steep to enable a water skimming rider to overcome the drag force associated with the upwardly sheeting water flow and stay in equilibrium thereon. Due to fluid drag, a rider will eventually move in the direction of flow back up the incline.

The Froude number is a mathematical expression that describes the ratio of the velocity of the flow to the phase speed of the longest possible waves that can exist in a given depth without being destroyed by breaking. The Froude number equals the flow speed divided by the square root of the product of the acceleration of gravity and the depth of the water. The Froude number squared is a ratio between the kinetic energy of the flow and its potential energy, i.e., the Froude number squared equals the flow speed squared divided by the product of the acceleration of gravity and the water depth.

Subcritical flow can be generally described as a slow/thick water flow. Specifically, subcritical flows have a Froude number that is less than 1, and the kinetic energy of the flow is less than its gravitational potential energy. If a stationary wave is in a sub-critical flow, then, it will be a non-breaking stationary wave. In formula notation, a flow is subcritical when v<square root gd where v=flow velocity in ft/sec, g=acceleration due to gravity ft/sec2, d=depth (in feet) of the sheeting body of water.

Critical flow is evidenced by wave breaking. Critical flow is where the flow's kinetic energy and gravitational potential energy are equal. Critical flow has the characteristic physical feature of the hydraulic jump itself. Because of the unstable nature of wave breaking, critical flow is difficult to maintain in an absolutely stationary state in a moving stream of water given that the speed of the wave must match the velocity of the stream to remain stationary. This is a delicate balancing act. There is a match for these exact conditions at only one point for one particular flow speed and depth. Critical flows have a Froude number equal to one. In formula notation, a flow is critical when v=square root gd where v=flow velocity, g=acceleration due to gravity ft/sec2, d=depth of the sheeting body of water.

Supercritical flow can be generally described as a thin/fast flow. Specifically, supercritical flows have a Froude number greater than 1, and the kinetic energy of the flow is greater than its gravitational potential energy. No stationary waves are involved. The reason for the lack of waves is that neither breaking nor non-breaking waves can keep up with the flow speed because the maximum possible speed for any wave is the square root of the product of the acceleration of gravity times the water depth. Consequently, any waves which might form are quickly swept downstream. In formula notation, a flow is supercritical when v>square root gd where v=flow velocity in ft/sec, g=acceleration due to gravity ft/sec2, d=depth (in feet) of the sheeting body of water.

The hydraulic jump is the point of wave-breaking of the fastest waves that can exist at a given depth of water. The hydraulic jump itself is actually the break point of that wave. The breaking phenomenon results from a local convergence of energy. Any waves that appear upstream of the hydraulic jump in the supercritical area are unable to keep up with the flow, consequently they bleed downstream until they meet the area where the hydraulic jump occurs; now the flow is suddenly thicker and now the waves can suddenly travel faster. Concurrently, the down stream waves that can travel faster move upstream and meet at the hydraulic jump. Thus, the convergence of waves at this flux point leads to wave breaking. In terms of energy, the hydraulic jump is an energy transition point where energy of the flow abruptly changes from kinetic to potential. A hydraulic jump occurs when the Froude number is 1.

A stationary wave is a progressive wave that is travelling against the current and has a phase speed that exactly matches the speed of the current, thus, allowing the wave to appear stationary.

A white water occurs due to wave breaking at the leading edge of the hydraulic jump where the flow transitions from critical to sub-critical. In the flow environment, remnant turbulence and air bubbles from wave breaking are merely swept downstream through the sub-critical area, and dissipate within a distance of 7 jump heights behind the hydraulic lump.

Separation is the point of zero wall friction whereas the sheet flow breaks away from the wall of the incline or other form or shape placed thereon. In this regard, a two dimensional riding surface should be distinguished from a three dimensional riding surface. The former is essentially a smooth or uniform planar surface, which may or may not be planar, while the latter has uniform characteristics as well as raised or contoured shapes mounted thereon to produce unique wave features.

Flow separation results from differential losses of kinetic energy through the depth of the sheet flow. As the sheet flow proceeds up the incline it begins to decelerate, trading kinetic energy for gravitational potential energy. The portion of the sheet flow that is directly adjacent to the walls of the incline (the boundary layers) also suffer additional kinetic energy loss to wall friction. These additional friction losses cause the boundary layer to run out of kinetic energy and come to rest in a state of zero wall friction while the outer portion of the sheet flow still has residual kinetic energy left. At this point the outer portion of the sheet flow breaks away from the wall of the incline (separation) and continues on a ballistic trajectory with its remaining energy forming either a spill down or curl over back upon the upcoming flow.

The boundary layer is a region of retarded flow directly adjacent to a wall due to friction.

The separating streamline is the path taken by the outer portion of the sheet flow which does not come to rest under the influence of frictional effects, but breaks away from the wall surface at the point of separation.

Flow partitioning is the lateral division of flows having different hydraulic states.

A dividing streamline is the streamline defining the position of flow partitioning. The surface along which flows divide laterally between super critical and critical hydraulic states.

A bore is a progressive hydraulic jump which can appear stationary in a current when the bore speed is equal and opposite to the current.

A velocity gradient is a change in velocity with distance.

A pressure gradient is a change in pressure with distance.

Conforming flow occurs where the angle of incidence of the entire depth range of a body of water is (at a particular point relative to the inclined flow forming surface over which it flows) predominantly tangential to this surface. Consequently, water which flows upon an inclined surface can conform to gradual changes in inclination, e.g., curves, without causing the flow to separate. As a consequence of flow conformity, the downstream termination of an inclined surface will always physically direct and point the flow in a direction aligned with the downstream termination surface. The change in direction of a conforming flow can exceed 180 degrees.

The subject invention seeks not only to solve the previously identified problems of existing unbroken wave and breaking wave methodologies, it also attempts to pioneer a whole new realm of water ride dynamics, as yet unexplored by current art. In addition to a sheet flow of water upon a containerless upwardly inclined surface, alterations to this combination, through adjustments to water depth, water speed, water direction, surface area, surface shape (contour), and surface altitude, create wave like shapes that simulate: a white water bore; an unbroken yet rideable wave face; a spilling breaking wave; and, a breaking tunnel wave. Alterations can also create a fluid environment with ride performance characteristics superior to those available on naturally occurring progressive waves, e.g., greater lift and speed. Furthermore, functional structural additions to a containerless incline will allow creation of an array of new water ride attractions presently unknown in nature or the water recreation industry.

The reason the subject invention can succeed in its objectives is that it does not duplicate naturally breaking progressive waves, rather, it creates "flow shapes" from high velocity sheet flows over a suitably shaped forming surface. The majority of flow manifestations created by the subject invention are technically not waves. They may appear like gravity waves breaking obliquely to a beach; however, these sheet flow manifestations are distinct hydrodynamic phenomena caused by the interaction of four dynamics: (1) the subject invention's unique surface architecture; (2) the trajectory of the water relative to the flow forming surface; (3) flow separation from this surface; and (4) changes in hydraulic state of the flow (i.e., supercritical, critical or subcritical) upon this surface.

Accordingly, several advantages of the subject invention are:

a) to provide an inclined containerless surface upon which a uniform flow of water can produce a body of water that simulates a kind prized by surfers in the first stage of wave riding, i.e., an unbroken yet rideable wave face. This body of water has the appearance of a stationary wave in a subcritical flow, however, it is actually formed by supercritical water flowing over the containerless surface. Advantages of containerless surface embodiments include: (1) improved start characteristics through side ventilation of transient surge; (2) smooth water flow by avoiding undesirable oblique waves induced by enclosure, e.g., channel walls; (3) safe and rapid rider ingress or egress without channel wall obstruction; (4) elimination of operational downtime associated with containment flooding; (5) elimination of pump and valve equipment as required to remedy a containment flood; (6) elimination of expensive quick open/close valves as required for instantaneous starting of supercritical flow; (7) elimination of complex and expensive control equipment as required to coordinate valve opening/closing and pump on/off operation; and (8) increased ride capacity through a forgiving open flow architecture.

b) to provide an inclined containerless surface upon which a uniform flow of water can produce a body of water that simulates a kind prized by first time wave-riders, i.e., a broken white water bore. The white water bore effect results from supercritical flow moving up the incline transitioning by way of a hydraulic jump across the incline to produce a two dimensional stationary breaking wave that simulates the white water bore in the absence of flow over the back side of the incline. The containerless surface allows the spilling white water to ventilate laterally and avoid supercritical flow submersion.

c) to introduce a cross-stream velocity gradient to a flow of water that moves up a containerless surface with level ridge line, which then produces a body of water that simulates a kind prized by beginning surfers while riding a wave, i.e., a spilling wave with unbroken shoulder. The "breaker like" effect results from the flow having two coexisting hydraulic states, i.e., a higher velocity supercritical flow over the top of ridge line and an adjacent lower velocity supercritical flow that fails to reach the ridge line due to insufficient kinetic energy. This lower energy supercritical flow will decelerate to a critical state and form a hydraulic jump below the ridge line with an associated subcritical spill of turbulent water occurring to the side of the supercritical flow. If the adjacent flow were subcritical, then it would merge with the supercritical flow by means of a streamwise oblique hydraulic jump. The containerless surface allows the spill of turbulent white water to ventilate and avoid complete supercritical flow submersion.

d) to controllably cause a cross-stream velocity gradient to occur and simulate the previously described spilling wave with unbroken shoulder by either a properly designed pump means or nozzle means.

e) to provide an asymmetrically extended containerless surface upon which a uniform flow velocity produces a body of water that simulates a kind prized by beginning wave-riders, i.e., a spilling wave with unbroken shoulder. The asymmetrically extended containerless surface forms a downstream ridge line of increasing elevation. A flowing body of water with kinetic energy sufficient to overflow the low side supercritically, but insufficient energy to overflow the high side will exhibit flow partitioning, i.e., the flow to the high side will transition to subcritical as evidenced by a hydraulic jump and associated white water. A corollary to containerless surface asymmetry is its ability to solve the transient surge problems associated with ride start-up and rider induced flow decay upon upwardly inclined flow surfaces, i.e., creation of asymmetrically inclined flow forming surface provides a maximum height ridge line of decreasing elevation to facilitate self-clearing of undesirable transitory surges and excess white water.

f) to provide an extended surface comprised of a substantially horizontal flat surface (the sub-equidyne area) that extends the aforementioned containerless inclined surface in the upstream direction. The extended surface facilitates a riders ability to maximize his forward speed by the riders own efforts of "pump-turning," hereinafter more fully described as the acceleration process. The acceleration process permits the rider to gain additional velocity in a manner analogous to how a child on a swing generates additional velocity and elevation. Given that the heart and soul of surfing is to enable a rider to enjoy the feel and power of increased velocity that results from cyclical transition between the supra-equidyne area and sub-equidyne area relative to a position of equilibrium, the extended surface provides a significant advantage. A corollary improvement to the extended surface is to tilt the extended surface in a direction perpendicular to its extension to provide a gravity induced sideways component that causes a rider to move in the direction of fall. Such motion has the added benefit of increased throughput capacity by hastening a riders course through the apparatus.

g) to provide a three dimensional contoured containerless surface from flat to incline that produces a body of water that simulates a kind prized by intermediate to expert wave-riders, i.e., an unbroken yet rideable shoulder with tunnel wave of variable size dependent upon flow velocity. That is, the essentially two dimensional riding surface may be provided with a contoured shape or form to create a three dimensional flow bed which produces unique wave features. The tunnel portion of this body of water has a mouth and an enclosed tunnel extending for some distance into the interior of the forward face of the wave-shape within which the wave rider seeks to ride. This tunnel portion has the appearance of a plunging progressive wave as found on natural beaches. However, it actually results from contour induced supercritical flow separation. An advantage of flow separation is the ability of a properly shaped containerless incline to generate tunnel waves that grow in size (i.e., tunnel diameter) in relation to an increase in the velocity of water flowing thereover yet without requiring an increase in water depth or change in shape or size of the containerless incline. As this supercritical tunnel reattaches itself at the toe of the incline, the containerless surface allows the turbulent water to ventilate and avoid supercritical flow submersion. Flow separation also allows tunnel wave formation upon a containerless incline forming surface that is not curved back upon itself, and in fact, can be substantially less than vertical. A less than vertical containerless incline flow forming surface is easier to design and construct since it avoids complicated coordinate mapping and structural support problems. Additionally, this containerless surface arrangement allows tunnel wave formation in both deep water and sheet flow conditions.

h) to provide a beyond vertical extension of a three dimensional contoured containerless surface that produces a conformed body of water that simulates a kind prized by intermediate to expert wave-riders, i.e., a tunnel wave with unbroken yet rideable shoulder. As distinguished from the tunnel wave as described in (f) supra, a beyond vertical extension allows high velocity flow tunnel formation without separation. This containerless surface arrangement advantageously allows tunnel wave formation in situations where flow velocity head is significantly higher than the vertical height of the wave forming means.

i) to provide a flow of water upon the previously described contoured containerless surfaces that (by way of a progressive increase of flow velocity) transforms this flow from a simulated stationary white water bore along the entire forming means, to a simulated spilling wave with unbroken shoulder, to the final tunnel wave with unbroken yet rideable shoulder. This method is hereinafter referred to as the "wave transformation process." The wave transformation process has the advantage of enabling a rider to enjoy or an operator to provide a multiplicity of wave types, e.g., white water bore, unbroken, spilling or tunnel, upon a single properly configured appliance all within a relatively short time span.

j) to provide longitudinal movement across an inclined containerless surface of a sufficiently sized upwardly sheeting body of water (hereinafter referred to as a "swath") to permit a rider(s) to match his longitudinal speed with the speed of the swath and perform water skimming maneuvers thereon. This moving swath will provide the practical benefit of increasing rider throughput capacity and reducing the overall energy requirements of flow across the entire inclined containerless surface. This embodiment will also provide a rider or operator with the added benefit of participant movement to an end point that is different from the beginning point. Furthermore, by altering the contour of the containerless surface or the direction or speed of flow, differing wave conditions (e.g, spilling, tubing, etc.) can be produced during the course of the ride.

k) to provide a source of flow that is free of oblique waves. In this regard, in one embodiment of the subject invention positions the point of flow source, e.g., aperture, nozzle or weir at one elevation which is connected to a declining surface, which transitions to a horizontal surface, which then transitions to an inclined surface.

l) to provide an apparatus that will enable riders to perform water skimming maneuvers in a format heretofore unavailable except by analogy to participants in the separate and distinct sports of skateboarding and snowboarding, to wit, half-pipe riding. In this regard, the present invention provides a containerless surface for forming a body of water with a stable shape and an inclined surface thereon substantially in the configuration of a longitudinally oriented half-pipe. Such form is hereinafter referred to as the "fluid half-pipe." A corollary improvement to the fluid half-pipe is to provide an apparatus that permits an increased throughput capacity by increasing the depth of the fluid half-pipe in the direction of its length. This increase in depth will have the added benefit of causing a rider to move in the direction of fall and facilitate his course through the ride.

m) to provide a pliable containerless surface capable of distortion or peristaltic movement by an auxiliary motion generating device. Containerless surface distortion will alter flow pressure gradients thus manifesting stationary yet changeable wave characteristics, e.g., spilling waves, tunnel waves, or even differing types of tunnel waves. Sequential undulation or peristaltic movement of a pliable containerless surface will provide a novel traveling wave with varying wave characteristics. Such device has the added benefit of participant movement to an end point that is different from the beginning point with increased rider throughput capacity.

n) to provide a flow of water for all containerless surfaces as described above in either a deep water or sheet flow format. Deep water flows upon containerless surfaces will simulate ocean like surfing conditions and enable a controlled venue for instruction, contests, or general recreation. Sheet flows upon containerless surfaces will increase safety due to reduced water depth; reduced water maintenance due to decrease in volume of water treated; reduced energy costs by minimizing the amount of pumped water; reduce the requisite skill level of participants as the result of easy ride access and improved ride stability due to "ground effects"; and improved ride performance (i.e., lift and speed) due to ground effects.

o) to utilize a uniquely distinct wave forming process, i.e., flow separation, that creates the illusion of a large deep water wave through utilization of advantageous shallow flows.

p) to connect an inclined containerless surface to other attractions, e.g., a "lazy river," "vortex pool, conventional white water rapid ride, conventional wave pool," or "activity pool." Such connection would enable a rider to enjoy in unique combination other successful attractions known to those skilled in the art. Such combination has the significant advantage of added rider capacity and utilization of the kinetic energy of motion of water that exits from the inclined containerless surface, thus serving in a co-generative capacity, e.g., powering riders around the length of a connected "lazy river."

q) to provide a fence that permits ventilation of spilled white water, avoids oblique wave formation, and allows control of rider ingress or egress from all sides of a containerless incline. Such fence could also be used to serve as a dividing mechanism to create lanes to prohibit rider contact and promote safety.

r) to provide a riding vehicle connected to a containerless surface and positioned to hydroplane within the flow. A moveable tether can serve as a conveyance mechanism from a starting position outside the flow to a planing position in the flow. Thereupon, the tether can either continue to serve in a conveyance fashion to controllably transport a rider to the ride terminus outside the flow, or, the tether can be released to allow the rider to control his own destiny. A moveable tether will provide the practical benefit of facilitating rider entry and increasing rider throughput capacity.

s) to provide a slide entry mechanism that safely and rapidly introduces participants into an inclined containerless surface flow.

t) to incorporate a containerless inclined surface with a dam or reservoir as a method for dispersing excessive potential energy of a higher elevation body of water flowing to a lower elevation. Such method could be advantageously used to safely control spill-off and prevent downstream erosion.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The principle teachings of the present invention will be readily understood by those skilled in the art from a review of the detailed description herein and the attached figures, of which:

FIG. 3a is a perspective view drawing which illustrates a containerless incline in combination with a water recycling system;

FIGS. 4a–c are front-elevation, side elevation and perspective views, respectively, of another embodiment of a containerless incline having features ion accordance with the present invention;

FIG. 13a is a schematic drawing of another embodiment of a containerless incline illustrating an extended subequidyne area;

FIG. 13b is a longitudinal cross-section drawing of the incline of FIG. 13a;

FIG. 15a is a schematic drawing of another embodiment of a containerless incline illustrating a tilted containerless incline configuration for increased capacity;

FIG. 16b is a profile view of the containerless incline of FIG. 16a;

DETAILED DESCRIPTION OF THE PREFERRED EMBODIMENTS

Figure 1:
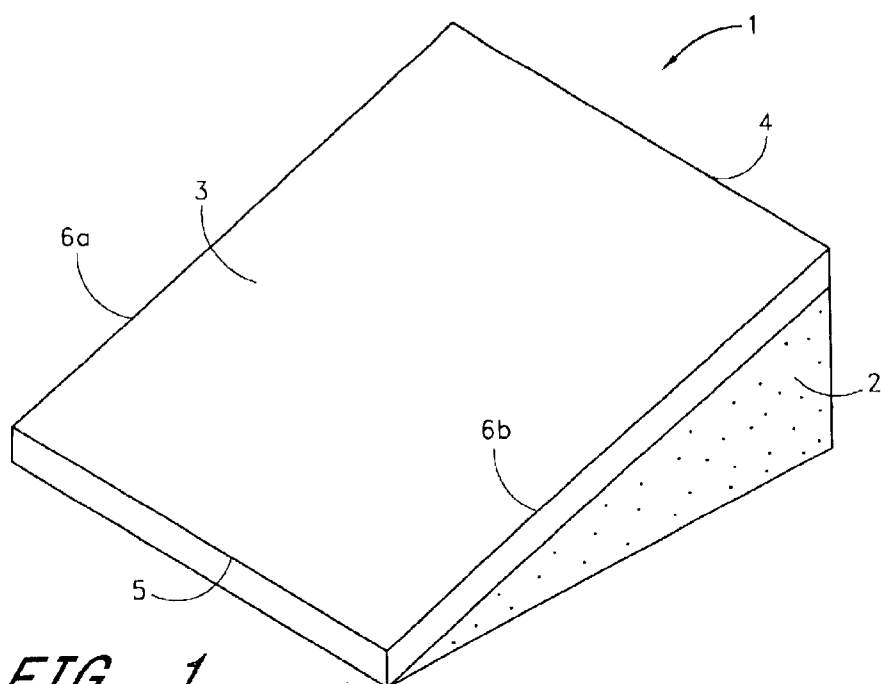
FIG. 1 is a schematic drawing showing one embodiment of a containerless incline of the present invention.

FIG. 1 shows one embodiment of a containerless incline 1 of the present invention. Plan-sectional lines as revealed in FIG. 1 are solely for the purpose of indicating the three-dimensional shape in general, rather than being illustrative of specific frame, plan, and profile sections. In fact, it should be noted that a wide variety of dimensions and configurations for a containerless incline are compatible with the principles of the present invention. Therefore, these principles should-not be construed to be limited to any particular configuration illustrated in the drawings or described herein.

Containerless Incline

Containerless incline 1 is comprised of sub-surface structural support 2, and ride surface 3 which is bounded by a downstream ridge edge (line) 4, an upstream edge 5, and side edges 6a and 6b. Ride surface 3 can be a skin over sub-surface structural support 2, or can be integrated therewith so long as sufficiently smooth. If a skin, ride surface 3 can be fabricated of any of several of well known materials e.g., plastic; foam; thin shell concrete; formed metal; treated wood; fiberglass; tile; reinforced tension fabric; air, foam or water filled plastic or fabric bladders; or any such materials which are sufficiently smooth to minimize friction loss and will stand the surface loads involved.

Sub-surface structural support 2 can be sand/gravel/rock; truss and beam; compacted fill; tension pole; or any other well known method for firmly grounding and structurally supporting ride surface 3 in anticipation of flowing water and riders thereon. The inclined shape of ride surface 3 need not be limited to the sloping inclined plane as illustrated in FIG. 1. Ride surface 3 can gradually vary in curvature to assist in smooth water flow. For example, ride surface 3 can observe: upward concavity in longitudinal section parallel to the direction of water flow; or a longitudinal section comprised of upward concavity transitioning to an upward convexity; or a combination of straight, concave and convex longitudinal sections. Illustrations of these curved surface shapes are presented in succeeding figures.

Although numerous shapes are possible, one element is constant to all containerless incline embodiments, i.e., there must be an inclined portion of sufficient length, width and degree of angle to enable a rider(s) to perform water skimming maneuvers. At a minimum such angle is approximately seven degrees from the horizontal. Steeper angles of incline (with portions having a curvature extending past a 90 degree vertical) can provide more advanced ride characteristics and flow phenomena, to be discussed. At a minimum the length (from upstream edge 5 to downstream ridge edge 4) and width (from side edge 6a to side edge 6b) of containerless incline 1 must be greater than the respective length and width of the intended ride vehicle or body in order to allow water run-off from the ride surface 3. The maximum dimensions of containerless incline 1 are capable of a broad range of values which depend more upon external factors, e.g., site constraints, financial resource, availability of water flow, etc, rather than specific restrictions on the structure itself.

In one case, a containerless incline having an angle of 20 degrees with respect to the horizontal was found to be suitable, to achieve the purposes of the present invention, when a flow of water having a depth of 3 inches and a flow rate of 32 feet per second was flowing thereover. The length and width of such incline was approximately 20 feet by 40 feet, respectively. In this case, the site permitted a river to catch the water run-off from the containerless incline of 6 feet on one side and 25 feet on the other side of the incline. In addition, as explained below in more detail, the water flow around, over, and off of the containerless incline 1 can be utilized for other water ride attractions. In order to achieve flow of the specified velocity over this incline, a water volume of 100,000 gallons per minute was found to be adequate, where the operating elevation of the pressure head was 16.5 feet above the upstream edge 5 of the incline.

Figure 2:
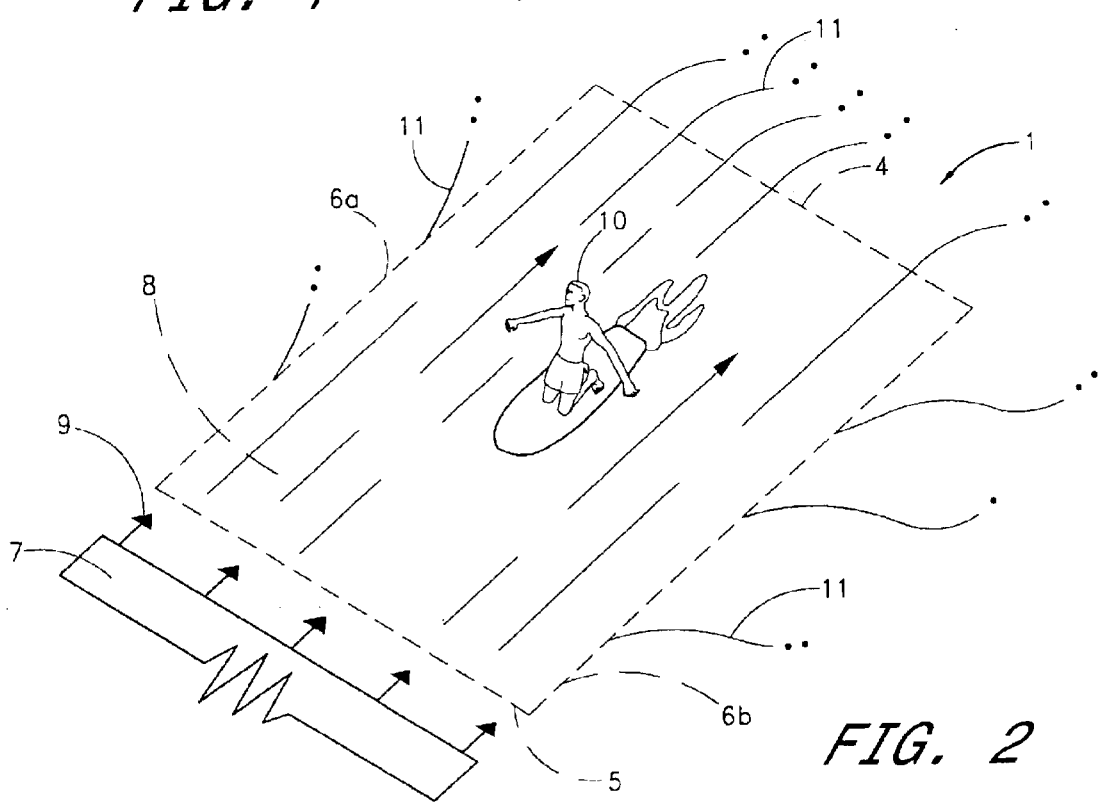
FIG. 2 is a schematic drawing showing typical operation of the containerless incline of FIG. 1.

FIG. 2 shows containerless incline 1 of FIG. 1 in operation. The basic operation of this device requires a suitable flow source 7 (e.g., pump, fast moving stream or elevated dam/reservoir) forming a supercritical sheet flow of water 8 in predominately singular flow direction 9 (as indicated by arrows) over ride surface 3 (whose lateral edges 6 and downstream ridge edge 4 are shown in dashed lines) to form an inclined body of water upon which a rider 10 performs water skimming maneuvers.

Rider 10 controls his position upon supercritical water flow 8 through a balance of forces, e.g., gravity, drag, hydrodynamic lift, buoyancy, and self-induced kinetic motion. Rider 10 takes advantage of the gravitational force and slides down the upcoming flow by maximizing the hydroplaning characteristics of his ride vehicle and removing drag enhancing hands and feet from the water flow. Likewise, Rider 10 can reverse the process and move uphill with the flow by properly positioning his vehicle to reduce planing ability and inserting hands and feet into the flow to increase drag. Non-equilibrium riding maneuvers such as turns, cross-slope motion and oscillating between different elevations on the "wave-like" surface are made possible by the interaction between the respective forces as described above and the use of the rider's kinetic energy.

There is no maximum depth for supercritical flow 8, although shallow flows are preferred with a practical minimum of approximately 2 cm. The preferred relation of flow depth to flow speed can be expressed in terms of a preferred Froude number. A practical regime of Froude numbers for containerless incline 1 is from 2 through 75, with the preferred range between 4 and 25. Flows with Froude numbers greater than 1 and less than 2 are prone to contamination from pulsating motions known as "roll waves" which are actually vortices rather than waves. Sheet water flows are preferred because shallow flows upon a containerless incline 1 will: (a) increase safety by avoiding deep water drowning potential (one can easily walk or stand in a thin sheet flow); (b) reduce water maintenance due to decrease in volume of water treated; (c) reduce energy costs by minimizing the amount of pumped water; (d) reduce the requisite skill level of participants as the result of easy ride access and improved ride stability due to "ground effects"; and (e) improved ride performance (i.e., lift and speed) due to ground effects. Although sheet water flows are preferred, it is contemplated that circumstances do exist that require a deep water environment, e.g., contests where ocean like surfing conditions are mandated, or training or instruction in deep water conditions.

Of particular note is how containerless incline 1 will permit water run-off 11 (as indicated by downward curving lines with dotted ends), to cascade from side edges 6 and over downstream ridge edge 4. As noted above, the "containerless" feature of the present invention is important in achieving the desired sheet flow characteristics. Essentially, the lack of lateral container walls permits an unbounded flow of water up the inclined riding surface 3. So long as the stream lines of the water are coherent and substantially parallel to one another and to the lateral edges 6a and 6b of the riding surface 3, the integrity (i.e., velocity and smooth surface flow characteristics) of the sheeting water flow is maintained. Consequently, a flow which is not side restrained advantageously avoids lateral boundary layer of effects and permits side water run-off, thus, maintaining a smooth flow and unimpaired velocity across the entire sheet of water. Furthermore, as pointed out above, the principles of the present invention apply equally well to an incline surface of various configurations, not necessarily with parallel sides 6a and 6b. Conversely, a side container wall creates a boundary layer effect which increases the static pressure of the water in the area of the container side wall, decreases the velocity of the sheet flow, and results in a disturbed surface flow. With a container or side wall, such boundary layer effect and disturbance is inevitable due to friction forces and the resultant propagation of oblique waves, both of which make difficult the maintenance of desirable parallel and coherent water streamlines.

In addition, the propagation of oblique waves and other turbulent flow is eliminated by the current structure in which a low static pressure is maintained along the lateral edges of the sheet flow. On the other hand, it should be noted that the disadvantages of the boundary layer effect are greatly minimized when the sheet flow is on a downwardly inclined surface. This is because turbulence is less likely to be propagated upstream against the force of gravity. Furthermore, any surface disturbance that may form is more likely to be swept downstream by the greater kinetic energy of the main flow of water when compared to that of the turbulent flow, such kinetic energy resulting from the gravity component of the downward flow.

Moreover, by extending ride surface 3, increasing or decreasing its elevation, adding to its surface area, warping its contour, adding horizontal and declining surfaces and/or by changing the direction, speed and thickness of entering supercritical water flow 8, the diverse sheet flow attractions as herein described will result.

Containerless Incline Within a Water Flow Circuit

As evidenced in FIGS. 1 and 2, no pool or water containment means is required for containerless incline 1. However, where water recycling is preferred, then, FIG. 3a shows a containerless incline 1 situated with ride surface 3 above a lower collection basin 12 enabling water retention and reuse. Lower collection basin 12 is positioned to receive water run-off 11 that overflows side edges 6a and 6b of ride surface 3. In addition, a like collection basin may be situated on the opposite edge of the ride surface 3, as shown in FIG. 3a, in order to collect the run-off water on that side. Pump 13a transports static water 14a from lower collection basin 12 through pipe 15a to a reservoir 16 with operational head higher than the elevation of downstream ridge edge 4. Actual head differential will vary depending upon overall friction losses associated with ride surface 3 boundary layer effects and rider induced turbulence. A preferred minimum head differential is twenty-five percent higher than the elevation of the downstream ridge edge 4.

Nozzle 17 connected to reservoir 16 allows the requisite supercritical flow 8 moving in direction 9 upon containerless incline 1. However, to insure unflooded/non-turbulent operation, the water level 18 of lower collection basin 12 should be equal to or below the lowest elevation of ride surface 3. As an optional energy conservation measure and in order to minimize the cost of pumping, a separate upper collection basin 19 (or series of basins, not shown) can be employed to take advantage of captured potential energy of elevated run-off water 11. To this end, pump 13b transports static water 14b from upper collection basin 19 through pipe 15b to reservoir 16. Depth and breadth of lower collection basin 12 and upper collection basin 19 need be sized to hold sufficient water to start the system and provide rider 10 a comfortably sized area in which to splashdown in the event of a tumble from ride surface 3. A ladder 20 facilitates exiting from lower collection basin 12 and upper collection basin 19.

Figure 3B:
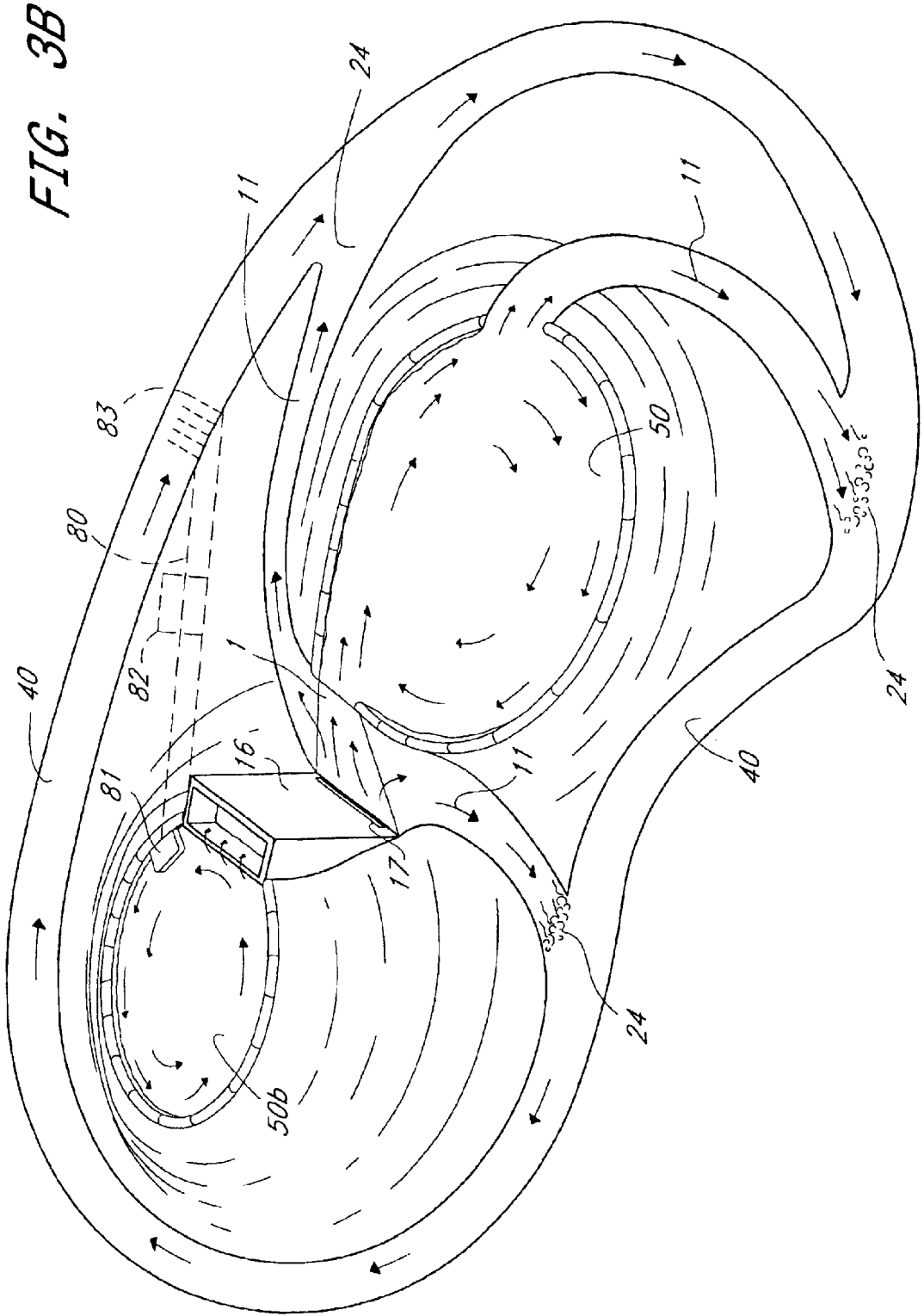
FIG. 3b is a plan view drawing which shows a containerless incline wherein the runoff is used to power a looped river course or a vortex pool.

An axiomatic condition of containerless flow operation is that water runs off the edges of the incline 1. To maximize energy efficiency, recreational enjoyment and provide increased user capacity, FIG. 3b illustrates a preferred orientation of containerless incline 1 to an adjacent circulation pool or trough. Tangential surface orientation enables the kinetic energy of run-off water to efficiently transfer its momentum and to power in circular fashion an associated vortex pool or a looped river course. A looped river course resembles what is known in the art as a "lazy river." A lazy river is a horizontal circuitous pool of water approximately 2 to 10 meters wide, 0.5 to 1.5 meters deep, 100 to 1000 meters in length, and moving at 1 to 2 meters per second. The primary objective of the lazy river is to provide a slow flowing river for floating participants that has a high rider absorbing capacity. The conventional lazy river is powered by pumps that jet water from a multiplicity of piped manifolds located upon its bottom or sides.

Figure 3C:
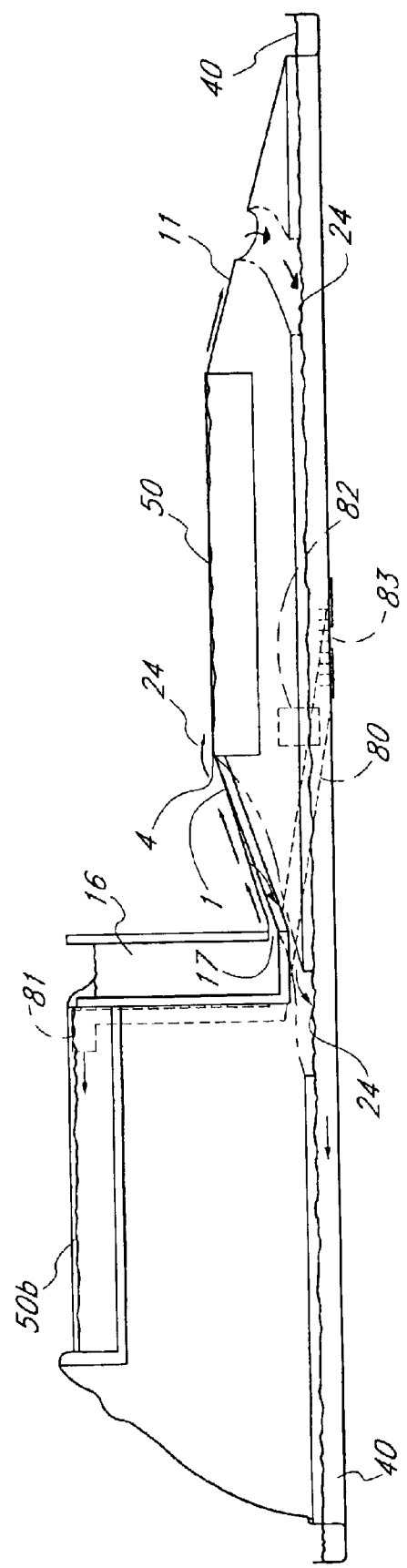
FIG. 3c is a side elevation of the containerless incline of FIG. 3b.

In contrast, FIG. 3b (perspective) and FIG. 3c elevation) shows a looped river course 40, as envisioned by the subject invention, which forgoes the cost of piped manifolds by utilizing run-off water 11 that exits from containerless incline 1 to serve in a co-generative capacity to drive the water in looped river course 40. Large run-off flows from containerless incline 1 can result in strong and varied flow conditions that are highly prized by river riders. Looped river flows can range from negative back eddies to 8+ meters per second. Furthermore, the horizontal orientation (i.e., substantially uniform elevation) of the looped river flow allows for river riders to float in a loop indefinitely.

Another advantage of the embodiment of FIG. 3*b* is the ability to create progressive or moving waves in the looped river 40. Such waves, which exhibit characteristics of natural waves found in a tidal bore going up a river, can be generated by pulsing or cycling the flow issuing from nozzle 17 so that a surge is generated in the flow. Under appropriate conditions, the wave generated by this surge can circle the entire lazy river 40.

To effect the unique synergistic combination of containerless incline 1 and a functional looped river course 40 requires proper orientation of river course 40 with containerless incline 1 viz-a-viz water run off 11, pump suction inlet 80 and pump pipe outlet 81. Maximum drive with minimum energy lost to a hydraulic jump 24 at the convergence of run-off water 11 and water within vortex pool 50 or looped river course 40 is a function of two components: (1) introducing run-off water 11 at the surface elevation of water within vortex pool 50 or looped river course 40, and (2) introducing run-off water 11 at a tangent to the direction of flow within vortex pool 50 or looped river course 40. To achieve continuous circulation of riders upon looped river course 40 requires an open channel of conventional "lazy river" design and at a substantially uniform water level. To properly capitalize upon pump suction as an aid to river circulation, pump suction inlet 80 for pump station 82 should be located upstream and in proximity to the confluence of run-off water 11, with the longest stretch of unpowered water within looped river course 40 (e.g., where the velocity of the flow in the lazy river may be at a minimum). For safety purposes, a floor/side wall grate 83 (see FIG. 3*c*) separates looped river course 40 from pump suction inlet 80. To complete the system circuit, pump station 82 lifts water into reservoir 16, providing water for containerless incline 1 operation.

Run-off water 11 can also serve to power a horizontal vortex pool 50. Vortex pool 50 is a circular pool having preferred dimensions at 10 to 70 meters in diameter with 0.5 to 1.5 meters of depth, and that whirls in circular fashion at a speed of 1 to 10 meters per second. The elevation of the vortex pool 50 can be at or just below the crest or downstream edge of the containerless incline 1. As shown, the elevation of the vortex pool 50 is above that of the looped river course 40 in order to provide a pressure head increased velocity as the water from such vortex pool merges with the river course 40 at a hydraulic jump 24. A properly sized vortex pool could also function in lieu of a river course and vice versa.

A looped river course 40 or vortex pool 50*b* can also be placed at the upper terminus of pump pipe outlet 81, as shown in FIG. 3*c*. Such location would enable utilization of pump velocity head to drive flow circulation. In addition to efficiently utilize available energy, such location would allow reservoir 16 to act as a settling basin, and thus provide a smoother flow as issued from nozzle 17. In this case, the elevation of the vortex pool 50*b* is higher than that of the looped river course 40, and may be at or below (or even above, as shown in FIG. 3*c*) the elevation of the water in the reservoir 16.

FIG. 4*a* (front elevation), FIG. 4*b* (cross-section) and FIG. 4*c* front perspective) shows the preferred configuration for containerless incline 1 that does not utilize a pool or stream for an exiting rider to splash down. FIG. 4*a* shows containerless incline 1 as expanded from the previously described boundaries, i.e., downstream ridge edge 4 and side edge 6*a* and 6*b* (identified by dashed lines in FIG. 4*a*), by a downward sloping transition surfaces 21*a*, 21*b* and 21*c*. Downward sloping transition surfaces 21 are contiguous with ride surface 3 as well as sub-surface support 2, and are preferably made from the same materials.

FIG. 4*c* (front perspective) shows a containerless incline 1 as expanded by downward sloping transition 21 in operation. Supercritical flow 8 issuing from flow source 7 and moving in direction 9 provides a body of water upon which rider 10*a* performs water skimming maneuvers. Rider 10*b* having completed his last maneuver, slides over downward sloping transition 21*b* and towards the shut down/exiting area. In this exiting area, run-off water 11 pours through a shut-down floor 22 until bled dry whereupon rider 10*c* can easily stand and walk away. Shut down floor 22 is aligned with and serves as perimeter for the trailing edge of downward sloping transition 21, and is comprised of a smooth non-slip grate or panel surface perforated with small drain holes, sized to drain run-off water 11, and supported to provide sure footing for exiting riders. As shown in cross-section 4*b*, a pump 23 is positioned below shut-down floor 22 to collect static water 14. Pump 13 transports static water 14 through pipe 15 to flow source 7 wherein supercritical flow 8 reissues. The containerless incline embodiment as shown in FIG. 4 is advantageous in situations where a deep pool or stream is unavailable or undesirable, e.g., non-swimmers.

A unique characteristic for containerless incline 1 is its ability to simulate a multitude of wave forms for a wide range of differentially skilled wave-riders. A beginners wave is noted by its lack of wave face steepness. In general, a novice prefers waves with a front face angle of forty-five degrees or less. At such angle of incline, three types of wave shapes are identified: (1) an unbroken yet rideable wave face; (2) a white water bore; and (3) a spilling wave with smooth unbroken shoulder. By setting the angle of ride surface 3 of containerless incline 1 in a range from 7 to 45 degrees, with a preference at 20 degrees, an ideal simulation of the proper wave face angle for a novice wave can be made.

Simulated White Water Bore

Previously described FIGS. 2–4 illustrate containerless incline 1, targeted toward the novice, that simulates a stationary unbroken yet rideable wave face. Maintenance of this "unbroken" flow profile requires that the kinetic energy of supercritical flow 8 always exceed the potential energy of downstream ridge line 4.

Figure 5:
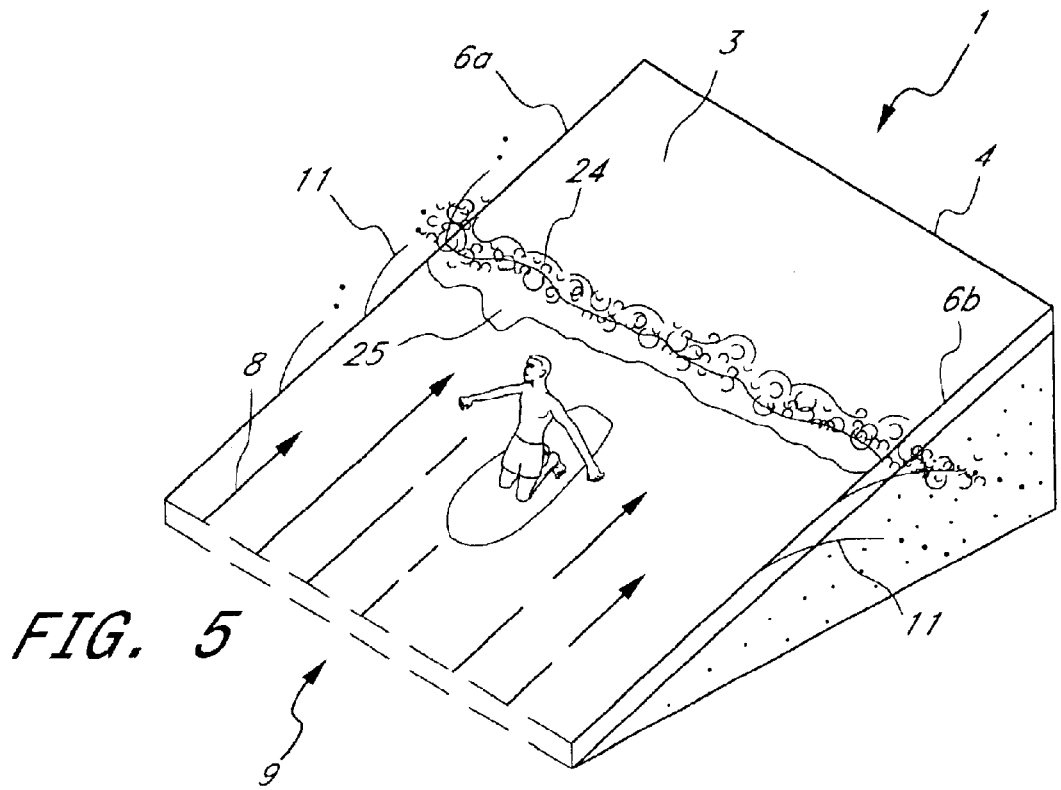
FIG. 5 is a schematic drawing of another embodiment of a containerless incline with a simulated white water bore wave thereon.

FIG. 5 illustrates a containerless incline 1, targeted toward the novice, with flow profile that simulates a stationary white water bore. When the velocity (i.e., kinetic energy) of an upwardly inclined supercritical sheet flow 8, moving in direction 9, is less than gravitational potential energy at downstream ridge line 4, then, sheet flow 8 will form a hydraulic jump 24 prior to reaching downstream ridge line 4. Accordingly, white water 25 will roll downward and to the side as run-off water 11, and, an effect similar to a stationary white water bore will form on the ride surface 3 of containerless incline 1. Maintenance of this hydraulic state requires that the kinetic energy of supercritical flow 8 always be less than the potential energy at downstream ridge line 4. Because containerless incline 1 is without enclosure or other lateral restraints, white water 25 can easily ventilate off the sides 6*a* and 6*b* and avoid supercritical flow submergence.

The relative position of hydraulic jump 24 is determined by the velocity of supercritical flow 8. The higher the velocity, the higher the position of the hydraulic jump 24 upon ride surface 3. Rider 10 performs water skimming maneuvers on supercritical flow 8 and white water 25.

Simulated Spilling Wave

A simulated spilling wave with smooth unbroken shoulder is created on containerless incline 1 by two general methods: (1) a cross-stream velocity gradient; and (2) a cross-stream pressure gradient. The use of either method depends upon overall objectives and constraints of containerless incline structure and available flow characteristics. A cross-stream velocity gradient is the preferred method when the structure of containerless incline 1 is limited to a symmetrical configuration. A cross stream pressure gradient is the preferred method when the initial supercritical flow 8 moving up containerless incline 1 has constant velocity.

Figure 6:
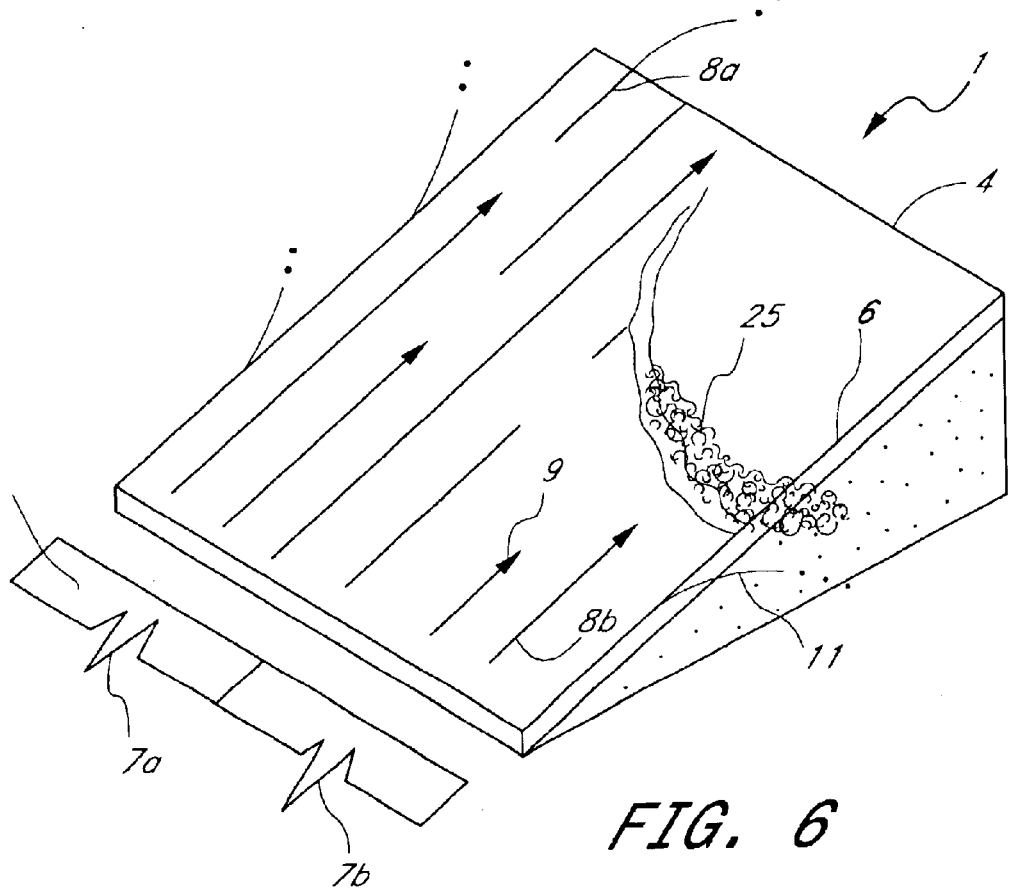
FIG. 6 is a schematic drawing of another embodiment of a containerless incline with a simulated spilling wave with unbroken shoulder thereon.

FIG. 6 depicts a simulated spilling wave with smooth unbroken shoulder accomplished by introducing a cross-stream velocity gradient to a supercritical flow of water 8 that moves in direction 9 up containerless incline 1 with level ridge line 4. The "spilling breaker" effect results from the initial supercritical flow 8 issuing from flow source 7a and 7b at two distinct velocities and manifesting two subsequent coexisting hydraulic states, i.e., a higher velocity supercritical flow 8a over the top of ridge line (associated with flow source 7a) and an adjacent lower velocity supercritical flow. The white water 25 that results from this cross-stream velocity gradient is formed by hydraulic jump as the supercritical flow decelerates to a subcritical flow before reaching ridge line 4 (associated with flow source 7b). White water 25 results from a hydraulic jump located below the ridge line 4. Containerless incline 1 allows spilling white water 25 to ventilate off side 6 as run-off water 11, thus avoiding supercritical flow submersion.

Figure 7:
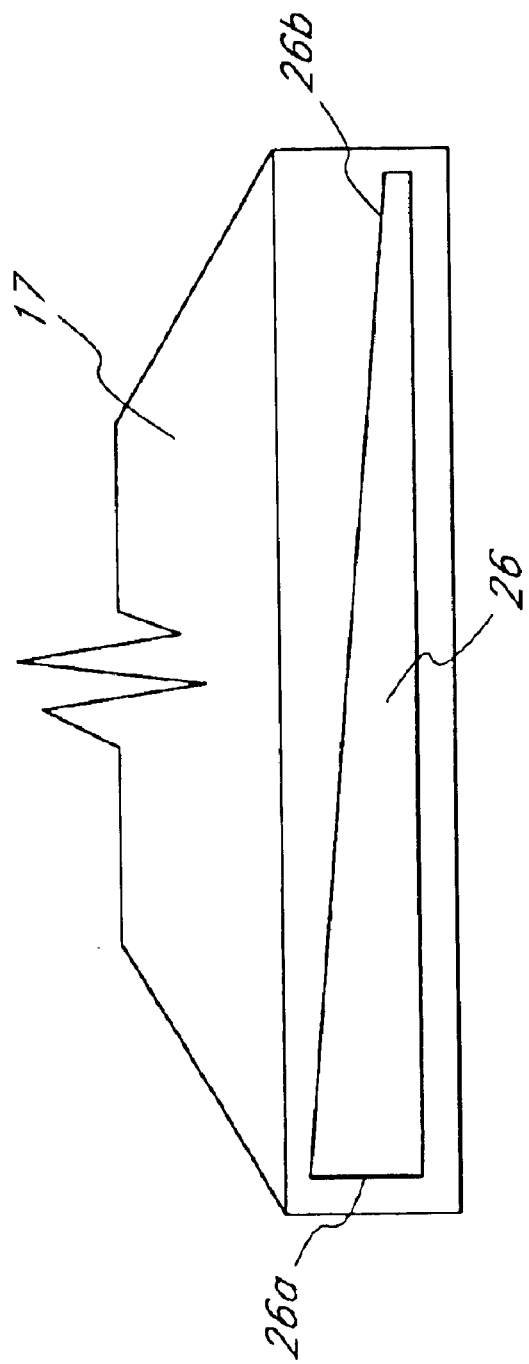
FIG. 7 is a schematic drawing of an asymmetric nozzle configuration that can produce a flow that exhibits a hydrostatic tilt.
Figure 8:
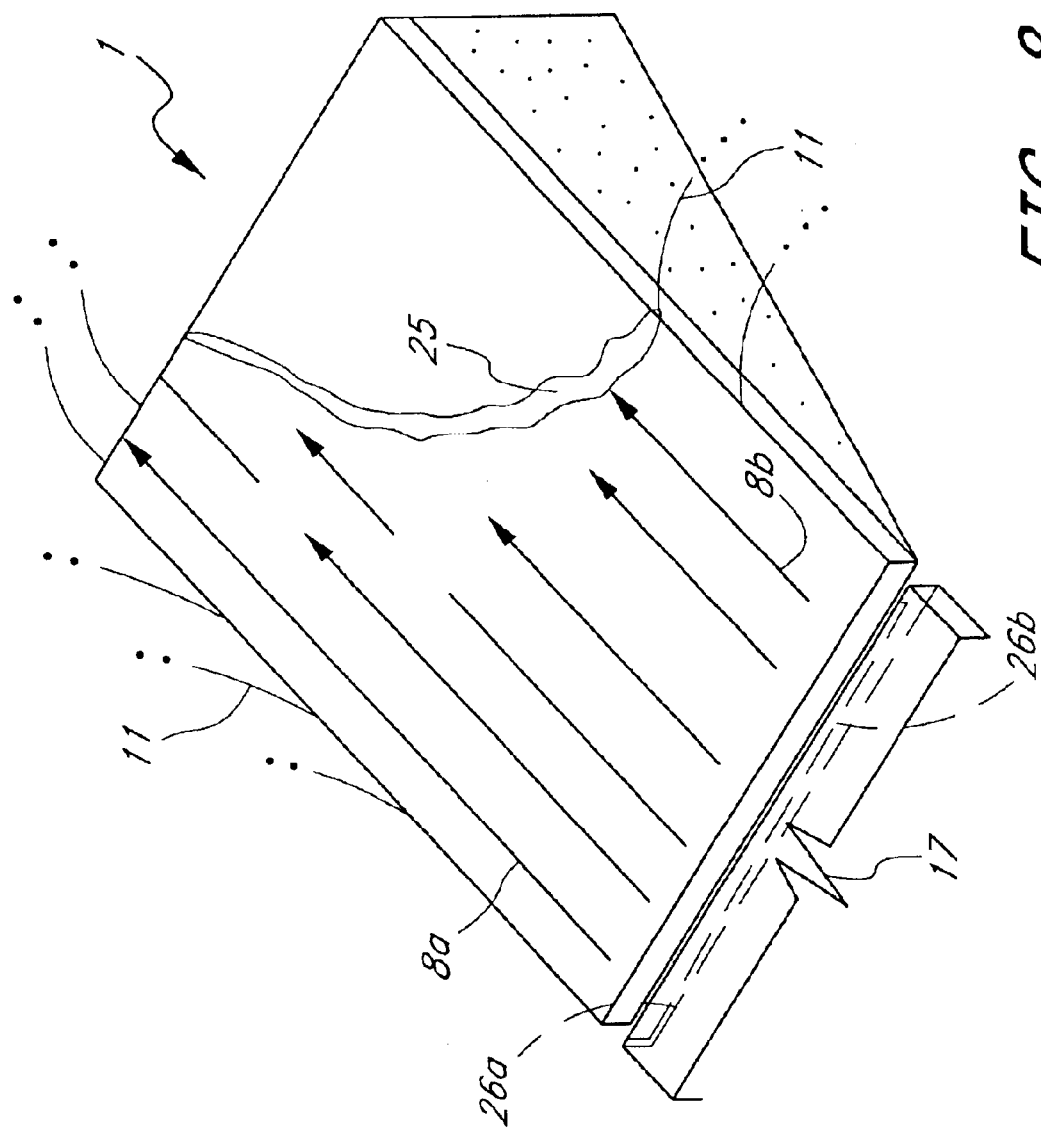
FIG. 8 is a schematic drawing of another embodiment of a containerless incline incorporating the asymmetric nozzle of FIG. 7 and spilling wave with unbroken shoulder.

Cross-stream velocity gradients can be created by either placing multiple flow sources of differing kinetic energy side by side and simultaneously projecting them upslope as shown in FIG. 6, or through proper configuration of a single source (e.g., pump) by way of a specially configured nozzle or plenum. FIG. 7 shows nozzle 17 with an asymmetrical aperture 26 comprised of an asymmetrical aperture wide side 26a and an asymmetrical aperture narrow side 26b, capable of producing flows that exhibit hydrostatic tilt. As shown in FIG. 8, when supercritical flow 8 first issues from asymmetrical aperture 26 (indicated by dashed lines and arrows), it is thicker (e.g., deeper) on one side 8a than the other 8b as the surface of the water is tilted. If supercritical flow 8 is moving over a fixed surface such as containerless incline 1, gravity will immediately interact to "squeeze" the thicker flow 8a and cause the flow to level itself. In the process of this leveling, since a greater mass of water came out asymmetrical aperture wide side 26a, this greater mass will speed up due to the fluid dynamic law of continuity.

Thus, with a proper angle and length of containerless incline 1 two subsequent coexisting hydraulic states will result, i.e., the supercritical flow 8a that issues from wide side 26a will clear downstream ridge line 4 and sustain its supercritical character, while the flow 8b as issued from narrow side 26b will subsequently suffer a hydraulic jump and exhibit white water 25 at a lower elevation on the face of containerless incline 1. Containerless incline 1 allows spilling white water 25 to ventilate off side 6 as run-off water 11 and avoid supercritical flow submersion.

Figure 9:
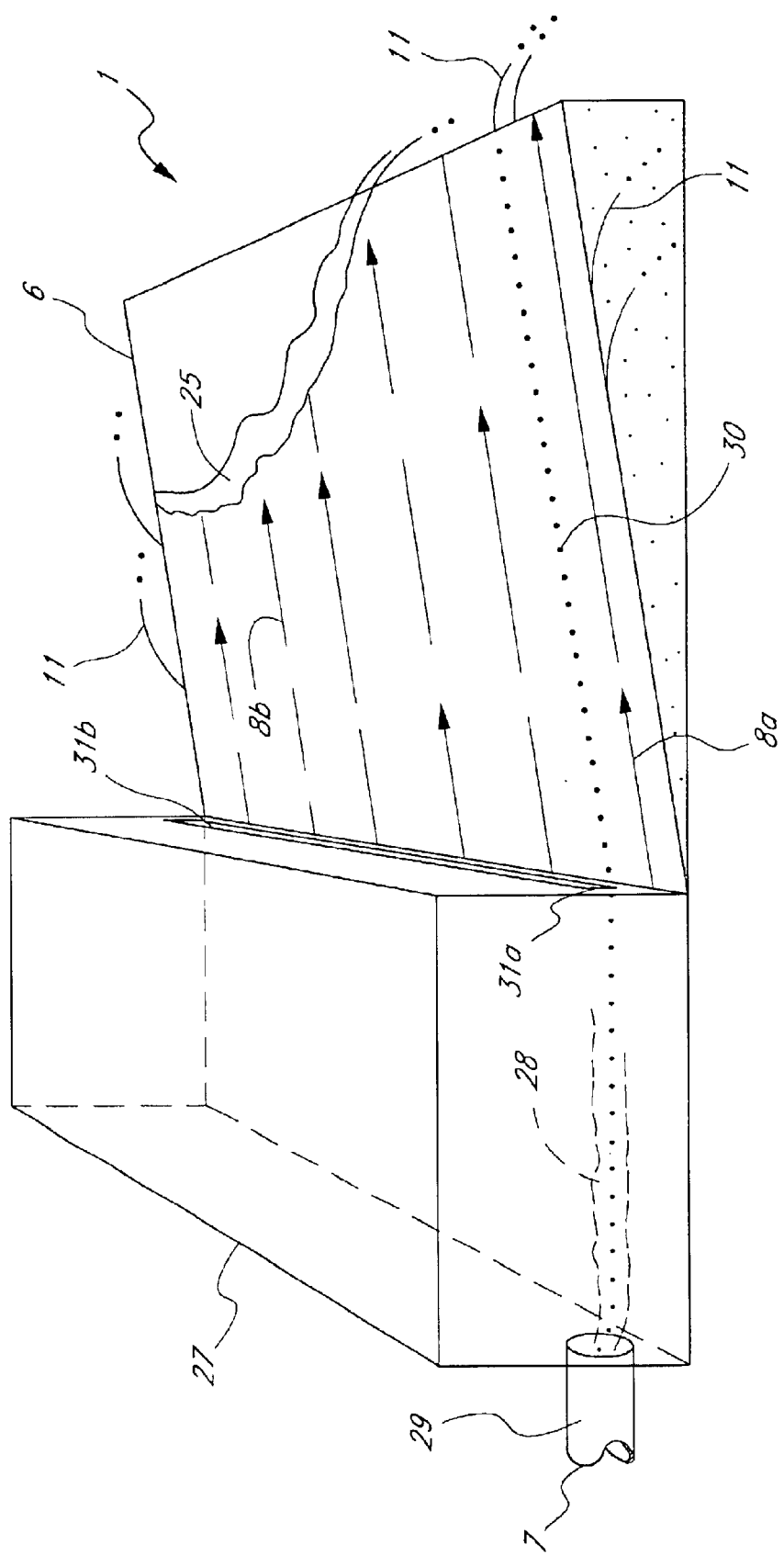
FIG. 9 is a schematic drawing of another embodiment of a containerless incline illustrating the simulation of a spilling wave by a uniform aperture having differential internal flow core pressure.

Cross-stream velocity gradients can also result, as shown in FIG. 9, if single flow source 7 injects water into one side of a plenum 27 with an aperture 31 positioned to open upon containerless incline 1. A high velocity water core 28 exiting directly from the outlet of supply pipe 29 will retain greater in-line integrity (as indicated by dotted line 30) out of an in-line portion 31a of aperture 31, than from a not-in-line portion 31b of aperture 31. Thus, with a proper angle and length of containerless incline 1 two subsequent coexisting hydraulic states will result, i.e., the supercritical flow 8a that issues from in-line aperture portion 31a will clear downstream ridge line 4 and sustain its supercritical character, while the flow 8b as issued from not-in-line aperture portion 31b will subsequently suffer a hydraulic jump and exhibit white water 25 at a lower elevation on the face of containerless incline 1. Containerless incline 1 allows spilling white water 25 to ventilate off side 6 as run-off water 11 and avoid supercritical flow submersion.

Figure 10:
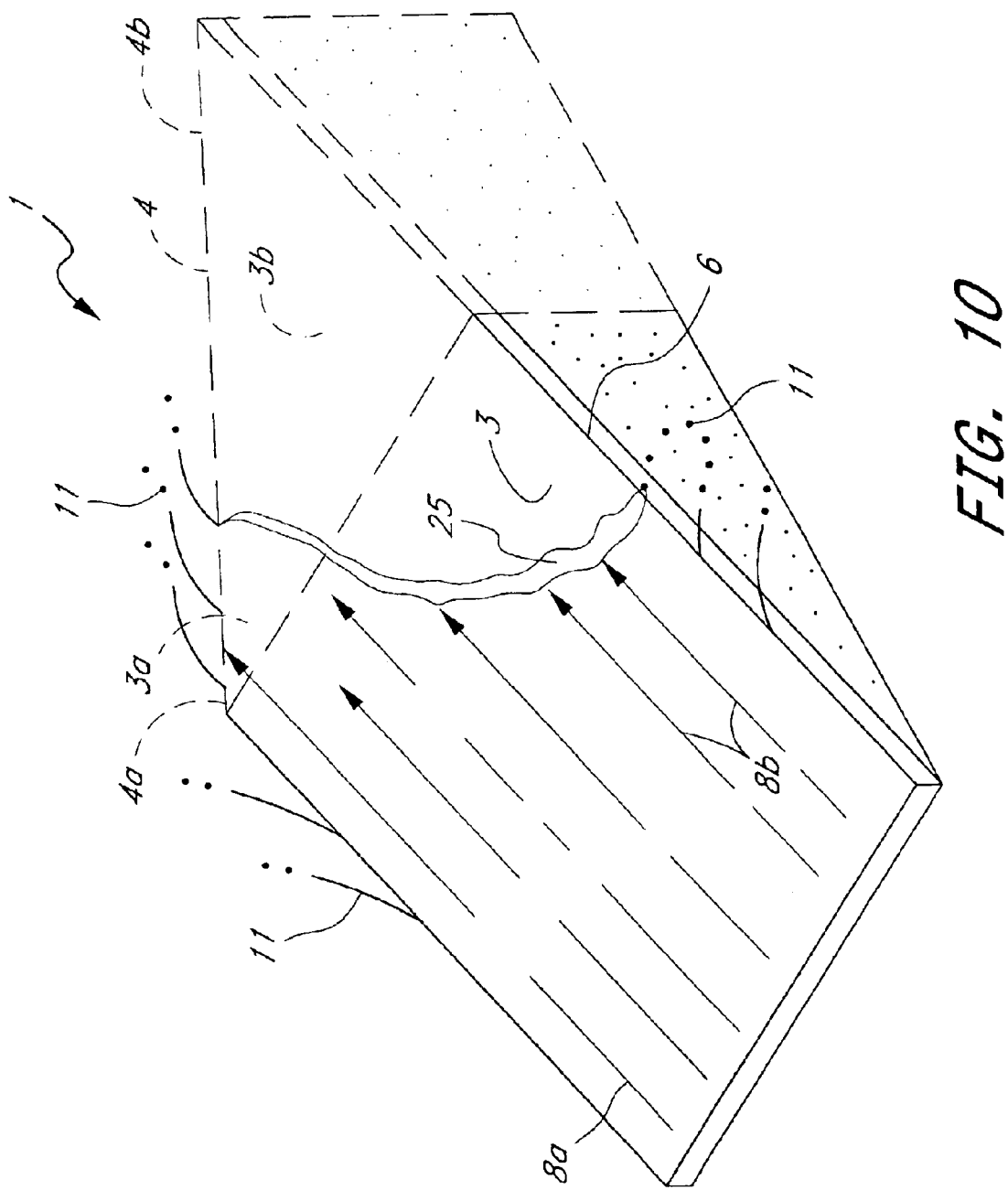
FIG. 10 is a schematic drawing of another embodiment of a containerless incline illustrating an asymmetrically extended containerless incline that simulates a spilling wave with unbroken shoulder.

The second general approach to simulating a spilling wave with smooth unbroken shoulder is to generate a cross stream pressure gradient. Such cross stream pressure gradients can be generated, for example, by sills, depressions, injected water, etc. The preferred technique, in order to avoid penetrations or discontinuity on riding surface 3 of containerless incline 1, is through increased hydrostatic pressure. In this regard, FIG. 10 shows containerless surface 1 asymmetrically extended (as indicated by dashed lines) to form a downstream ridge line 4 of increasing elevation. Thus, with a proper angle and length of containerless incline 1 two subsequent coexisting hydraulic states will result, i.e., the supercritical flow 8a that flows over shortened side 4a of downstream ridge line 4 will clear and sustain its supercritical character, while flow 8b has insufficient kinetic energy to clear extended side 4b of downstream ridge line 4 and will subsequently suffer a hydraulic jump and exhibit white water 25 at a lower elevation on ride surface 3 of containerless incline 1. The same effect can be achieved and/or magnified by causing the extended side 4b to be sloped at a greater angle of inclination than the ride surface 3. Thus, in that case, not only is the extended side 4b longer than the shorter side 4a, it is also at a higher elevation. Containerless incline 1 allows spilling white water 25 to ventilate off side 6 as run-off water 11 and avoid supercritical flow submersion.

Moving Breaking Wave

A corollary to containerless surface asymmetry can be applied, on the one hand, to solve the transient surge problems associated with ride start-up; and, on the other hand, to create an attraction that simulates a moving breaking wave analogous to an ocean wave breaking parallel to the beach. In the start-up situation, due to the gradual build up of water flow associated with pump/motor phase in or valve opening, the initial rush is often of less volume, velocity or pressure than that which issues later. Because this initial start water is pushed by the stronger flow that issues thereafter, such pushing results in a build-up of water (i.e., a "moving" hydraulic jump or transient surge) at the leading edge of the flow. An increase in the upward incline of the riding surface serves only to compound the problem as an increasing volume of supercritical water transitions to subcritical and greater amounts of energy are required to continue pushing this surge in an upward fashion.

If the initial kinetic energy of in-rushing flow is inadequate to push this subcritical build-up over the top of the incline, the transient surge can become so large that it will not be able to clear even when full flow is subsequently reached. Asymmetry assists in clearing transient surges by reducing the threshold energy required for clearing and providing a "toehold" for the clearing process to start.

Figure 11A:
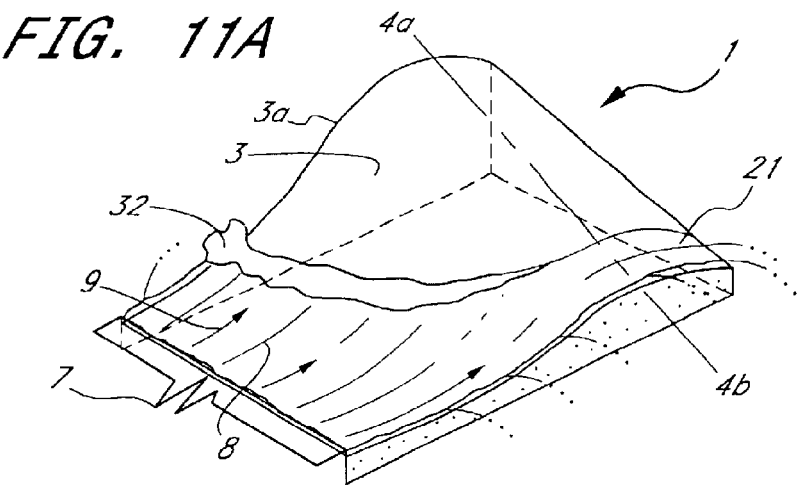
FIGS. 11a–11c are schematic time-lapsed sequences illustrating of a self-clearing containerless incline having features in accordance with the present invention.
Figure 11B:
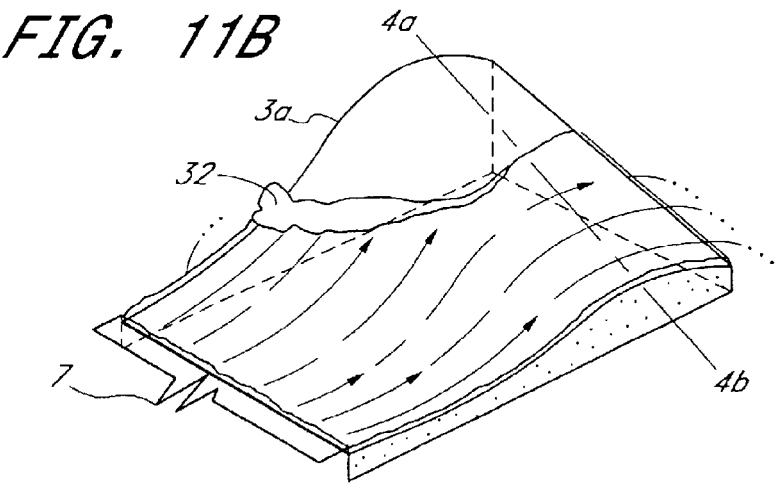
Figure 11C:
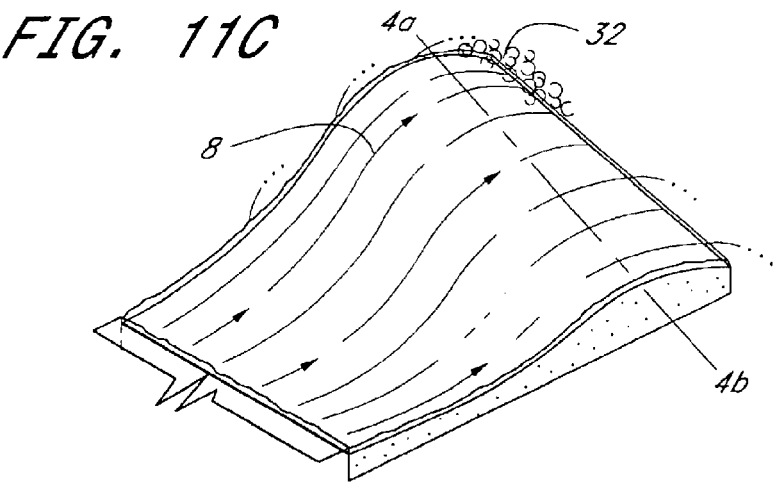

FIGS. 11a, 11b and 11c show in time lapse sequence how the design of an asymmetrical containerless surface 1 operates to solve the problem of a pressure/flow lag during start-up. In FIG. 11a supercritical flow 8 has commenced issue in a direction 9 from water source 7. A transient surge 32 forms as the initial weak start-up flow of water encounters the steeper regions 3a of ride surface 3. However, as the kinetic energy and volume of supercritical flow 8 builds, it flows over low side 4b of downstream ridge line 4 and upon downward sloping transition surface 21. FIG. 11b shows this start procedure moments later wherein the water pressure/flow rate from water source 7 has increased and transient surge 32 has moved further up containerless incline 1; and, in particular, further up the steeper regions 3a. FIG. 11c shows the final stage of start-up wherein transient surge 32 has been pushed over the high side 4a of down stream ridge line 4 and the entire ride surface 3 is covered by supercritical flow 8.

Figure 12A:
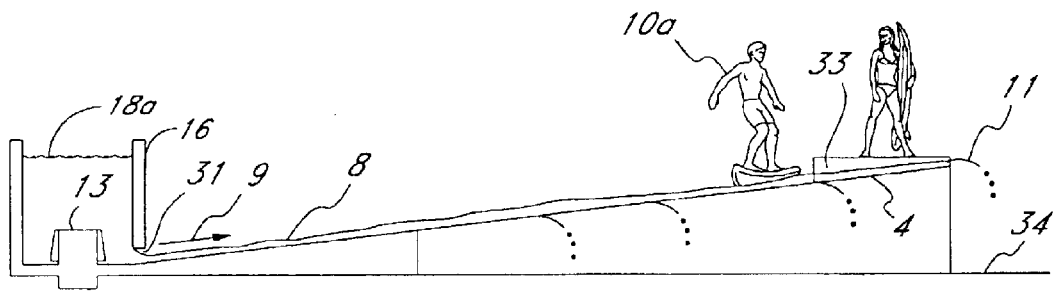
FIGS. 12a and 12a', 12b and 12b', 12c and 12c' are schematic plan/profile views of alternative embodiments of containerless inclines illustrating the effect of differential head used to increase throughput capacity.
Figure 12A:
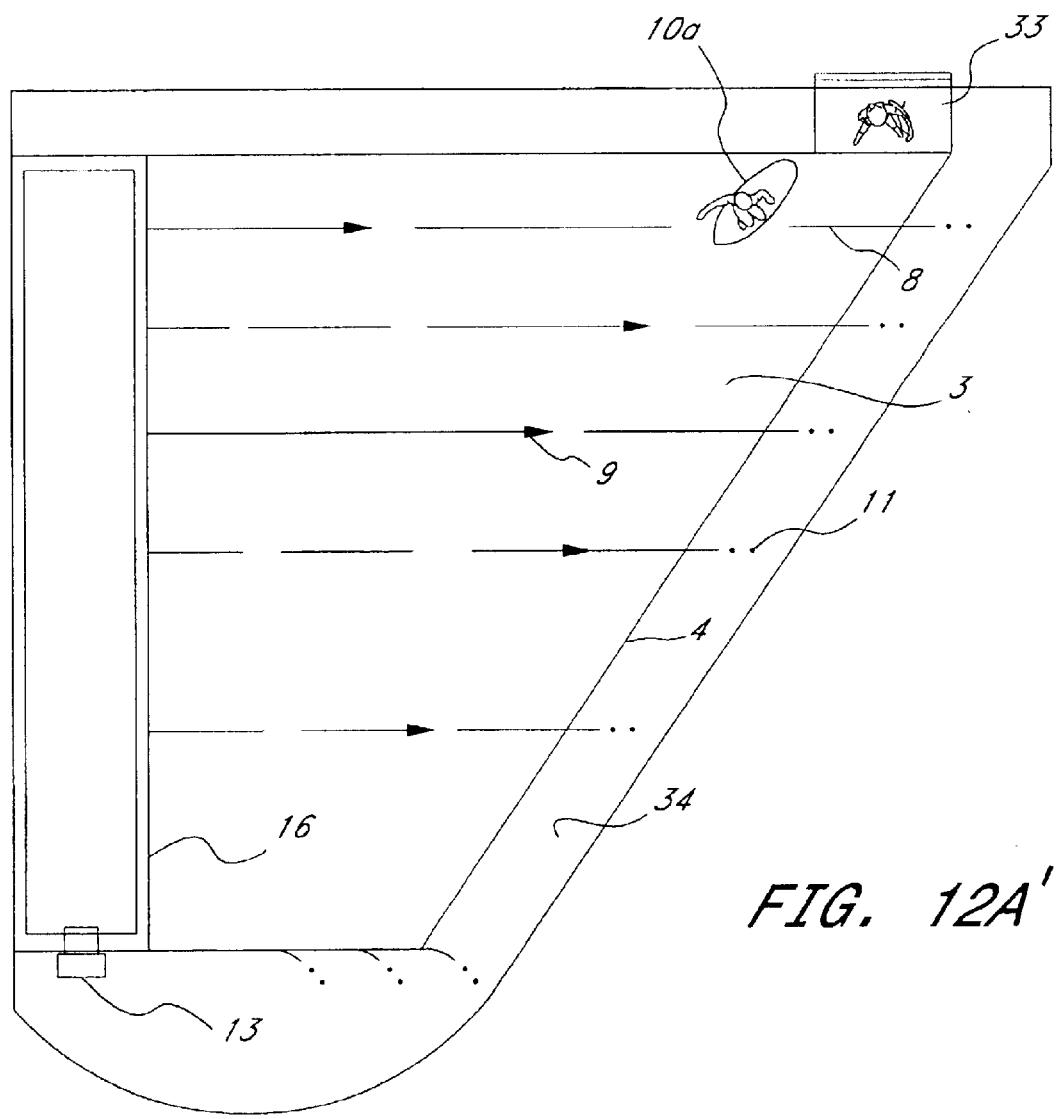

If we reverse this process, as shown in time lapse sequence through FIGS. 12a & 12a', 12b & 12b', and 12c & 12c', an effect that simulates a spilling wave breaking obliquely to a beach occurs. In FIG. 12a (side elevation) and 12a' (top view), supercritical flow 8 has commenced issue in a direction 9 from reservoir 16. The high head of reservoir 16, as indicated by water level 18a, results in a high kinetic energy supercritical flow 8 out of aperture 31 in direction 9 covering ride surface 3 with a sheeting body of water and causing water run-off 11 over the entirety of downstream ridge line 4, which run-off falls into collection basin 34, as shown in FIG. 12a. Shortly after rider 10 embarks from a start platform 33 to perform water skimming maneuvers, pump 13 ceases to fill reservoir 16. Seconds later, FIG. 12b (side elevation) and 12b' (top view) illustrates a reduction in water level 18b with concomitant reduction in kinetic energy of supercritical flow 8. Accordingly, a hydraulic jump with associated white water 25 first forms at high end 4a of downstream ridge line 4, and then, begins to "peel" n a downward fashion towards low end 4b of downstream ridge line 4. Concurrently, rider 10a negotiates to stay Just in front of the "peeling wave," thus simulating a spilling wave breaking obliquely to a beach.

A few seconds later, FIG. 12c (side elevation) and 12c' (top view) shows water level 18c at the bottom of reservoir 16. When the kinetic energy of supercritical flow 8 matches the potential energy at low end 4b of downstream ridge line 4, then, the "peeling" effect stops and the flow takes on the appearance of a diminishing white water bore. Rider 10a completes his ride upon entering collection basin 34; whereupon pump 13 refills reservoir 16 and permits the cycle to repeat for the benefit of rider 10b.

Extended Ride Surfaces

Figure 12C:
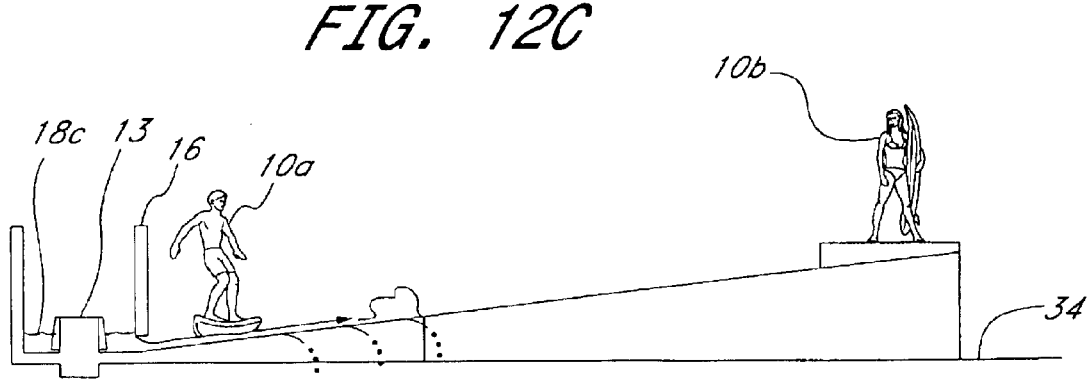
Figure 12C:
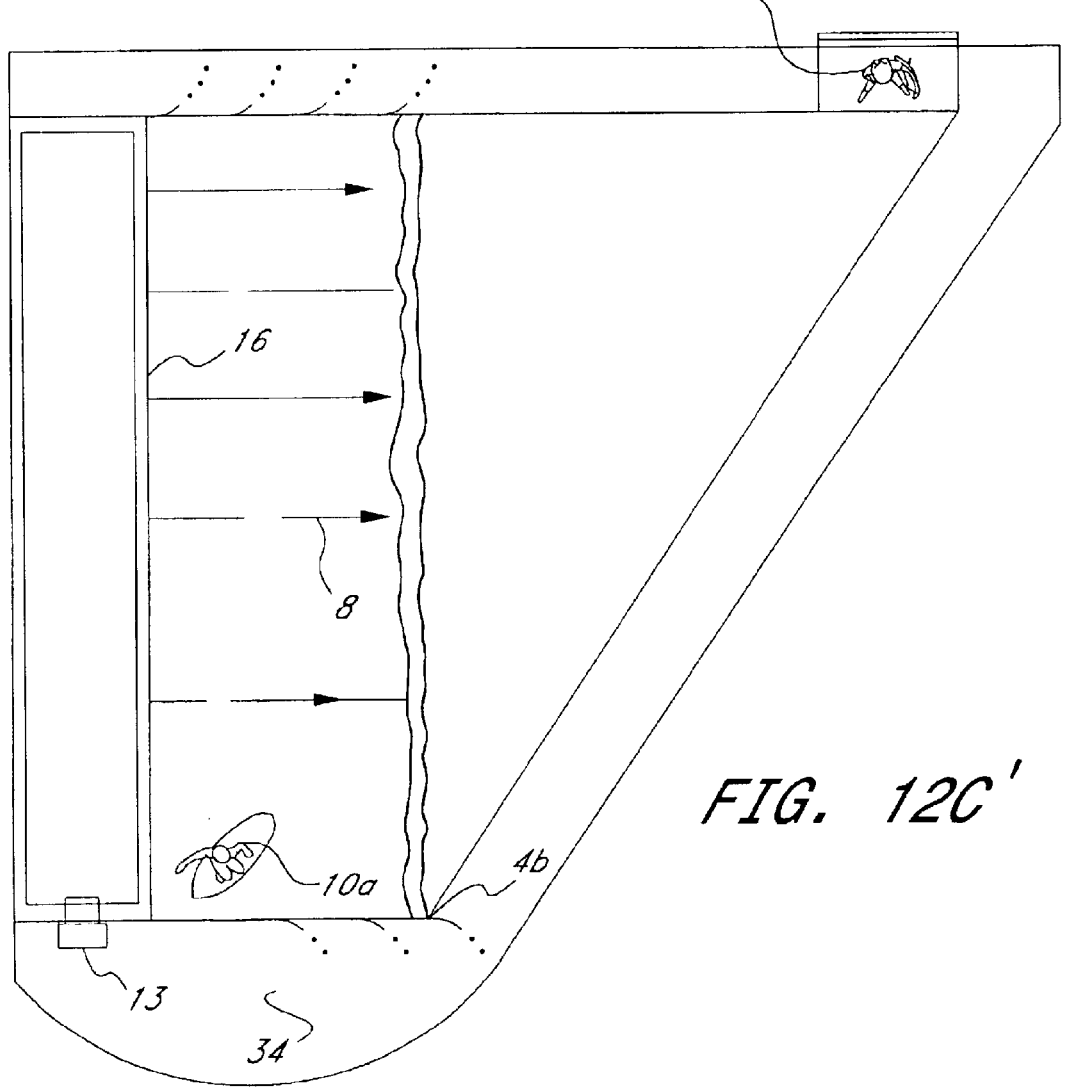

The proximity of rider 10a to reservoir 16 and aperture 31 as shown in FIG. 12c may cause safety concerns to an operator. These same concerns, applicable to all previous figures, can be easily addressed by expanding ride surface 3 in a horizontal upstream direction. Horizontal expansion will provide greater distance between rider 10 and any upstream operating equipment, as well as remove the gravity induced force component which allows the rider to move in the upstream direction. In addition to improved safety, a properly proportioned horizontal expansion of ride surface 3 can result in significantly improved ride performance characteristics, i.e., the acceleration process.

In this regard, turning to FIG. 13a, we see a generalized diagram for a horizontal expansion of containerless incline 1. With the addition of this horizontal sub-region generally normal to the force of gravity and hereafter described as a sub-equidyne area 35, extended ride surface 3 can be conceptually divided into three regions of inclinar function, i.e., a supra-equidyne area 36 which transitions (as represented by a dashed line 37) to an equilibrium zone 38, which in turn transitions (as represented by a dotted line 39) to sub-equidyne area 35.

Super critical water flow (not shown) moves in direction 9 to produce a conforming flow over sub-equidyne area 35, equilibrium zone 38, and supra-equidyne area 36 to form an inclined body of water upon which a rider (not shown) can ride and perform surfing or water skimming maneuvers that would not be available but for a proper combination of aforementioned sub-regions.

The functional significance of these sub-regions is such that, through proper physical proportion, they enable a rider to increase his speed and perform water skimming maneuvers that could not be performed "but for" their proper combination. To further explain how a properly dimensioned riding surface can enhance performance water skimming maneuvers, the art of wave-riding requires further discussion. Essential to the performance of modern surfing and skimming maneuvers are the elements of oscillation, speed, and proper area proportion in the "wave" surface that one rides upon. Each of these three elements is discussed in more detail below.

1. Oscillation

The heart and soul of modem surfing is the opportunity for the rider to enjoy substantial oscillation between the supra-critical and sub-critical flow areas. As one gains expertise, the area of equilibrium is only perceived as a transition area that one necessarily passes through in route to supra and sub critical areas. Oscillatory motion has the added advantage of allowing a rider to increase his speed.

2. Speed

Speed is an essential ingredient to accomplish modem surf maneuvers. Without sufficient speed, one cannot "launch" into a maneuver. The method and means for increasing one's speed on a properly shaped wave face can be made clear by analogy to the increase of speed on a playground swing as examined in SCIENTIFIC AMERICAN, March 1989, p. 106–109. That is, just as one can increase the velocity and resultant height that can be achieved by "pumping" a swing, a surfer can increase his/her velocity and height on the wave by an analogous pumping maneuver.

On a swing, if one is crouching at the highest point of a swing to the rear, one's energy can be characterized as entirely potential energy. As one descends, the energy is gradually transformed into kinetic energy and one gains speed. When one reaches the lowest point, one's energy is entirely kinetic energy and one is moving at peak speed. As one begins to ascend on the arc, the transformation is reversed: one slows down and then stops momentarily at the top of the arc. Whether one goes higher (and faster) during the course of a swing depends on what one has done during such swing. If one continues to crouch, the upward motion is a mirror image of the downward motion, and one's center of mass ends up just as high as when one began the forward swing (excluding friction). If, instead, one stands when one is at the lowest point (i.e., "pumping" the swing), then one would swing higher and faster.

The importance of sub-equidyne area 35 in the context of the previous discussion of swing dynamics, is that sub-equidyne area 35 is by its nature the lowest point on containerless incline 1 and on a wave. Standing/extending at this low point results in a larger increase of speed than if one stood at any other point on the riding surface. This increase in speed and total kinetic energy is due to two different mechanistic principals, both of which may be utilized by a rider on ride surface 3 or a wave.

By standing at the lowest point in the oscillatory path, the center of gravity of the rider is raised allowing a greater vertical excursion up the slope than the original descent. Crouching at the top of the path and alternately standing at the bottom allows an increase in vertical excursion and restoration of energy lost to fluid drag.

Additionally, the other mechanism, increasing the kinetic energy, is due to the increase in angular rotation. As the rider in his path rotates around a point located up the wave face, extension/standing at the low point increases his angular velocity, much in the same manner as a skater by drawing in his/her arms increases his/her rotational speed due to the conservation of momentum (i.e. increases the moment of inertia). However, kinetic energy increases due to the work of standing against the centrifugal force and because kinetic energy is proportional to the square of angular velocity, this increase in kinetic energy is equivalent to an increase in speed.

It should be pointed out that the analogy to swing dynamics is only by way of example or illustration. The oscillatory maneuvers of a surfer represent more complex mechanical and kinetic movements. However, it is believed that the analogy is helpful in illustrating the advantages of the present invention, as discussed below.

3. Proper Area Proportion

Containerless incline 1, as illustrated in FIG. 13a, combines, in proper proportion, the sub-equidyne 35, equilibrium 38 and supra-equidyne 36 areas so as to enable a rider to oscillate, attain the requisite speed and have available the requisite transition area for performance of modern day surfing and skimming maneuvers.

FIG. 13b illustrates a cross-section of 13a, with sub-equidyne area 35, equilibrium zone 38, and supra-equidyne area 36. The physical dimensions and relationship of sub-equidyne 35, equilibrium 38, and supra-equidyne 36 areas are described below.

The preferred size for the length of the sub-equidyne area 35, measured in the direction of flow 9, is, at a minimum, one and one half to four times the vertical rise (as measured from the lowest point of sub-equidyne 35 to the top-most point of supra-equidyne 36) of containerless incline 1. A large proportional length would apply to low-elevation containerless incline 1 (e.g., 1 meter) and small proportional length to high-elevation containerless incline 1 (e.g., 6 meters).

A preferred shape for equilibrium zone 38 can be defined in cross-section (taken in the direction of flow) by a portion of a changing-curve., e.g., an ellipse; parabola; hyperbola; or spiral. If a changing curve, the configuration of equilibrium zone 38 is substantially arcuate (i.e., the ascending water encounters a decreasing radius or a "closing" curve as it ascends the face of containerless incline 1). The radius of said closing curve being at its smallest approximating the radius of supra-equidyne 36 leading edge, and, at its longest, tangential to the horizontal. For purposes of simplicity and scale (but not by way of limitation), the uphill length of equilibrium zone 38 can generally be defined by a distance approximately equal to the length of the rider's flow skimming vehicle, i.e., approximately three to ten feet.

A preferred shape for supra-equidyne area 36 can be defined in cross-section (taken in the direction of flow) by a portion of a changing curve., e.g., an ellipse; parabola; hyperbola; or spiral. If a changing curve, the configuration of supra-equidyne area 36 is initially arcuate (i.e., the ascending water encounters a decreasing radius as it ascends the face of the flow forming means). The radius of said closing curve is at its longest always less than the radius of the longest arc of equilibrium zone 38, and, at its smallest of sufficient size that a rider could still fit inside a resulting "tunnel wave" (to be discussed). At a minimum, the length of supra-equidyne area 36 in the direction of flow 9 must be sufficient to allow a rider to accelerate in a counterflow direction. At a maximum, the length of supra-equidyne area 36 in the direction of flow 9 is limited by the available head of an upwardly sheeting flow.

Figure 14:
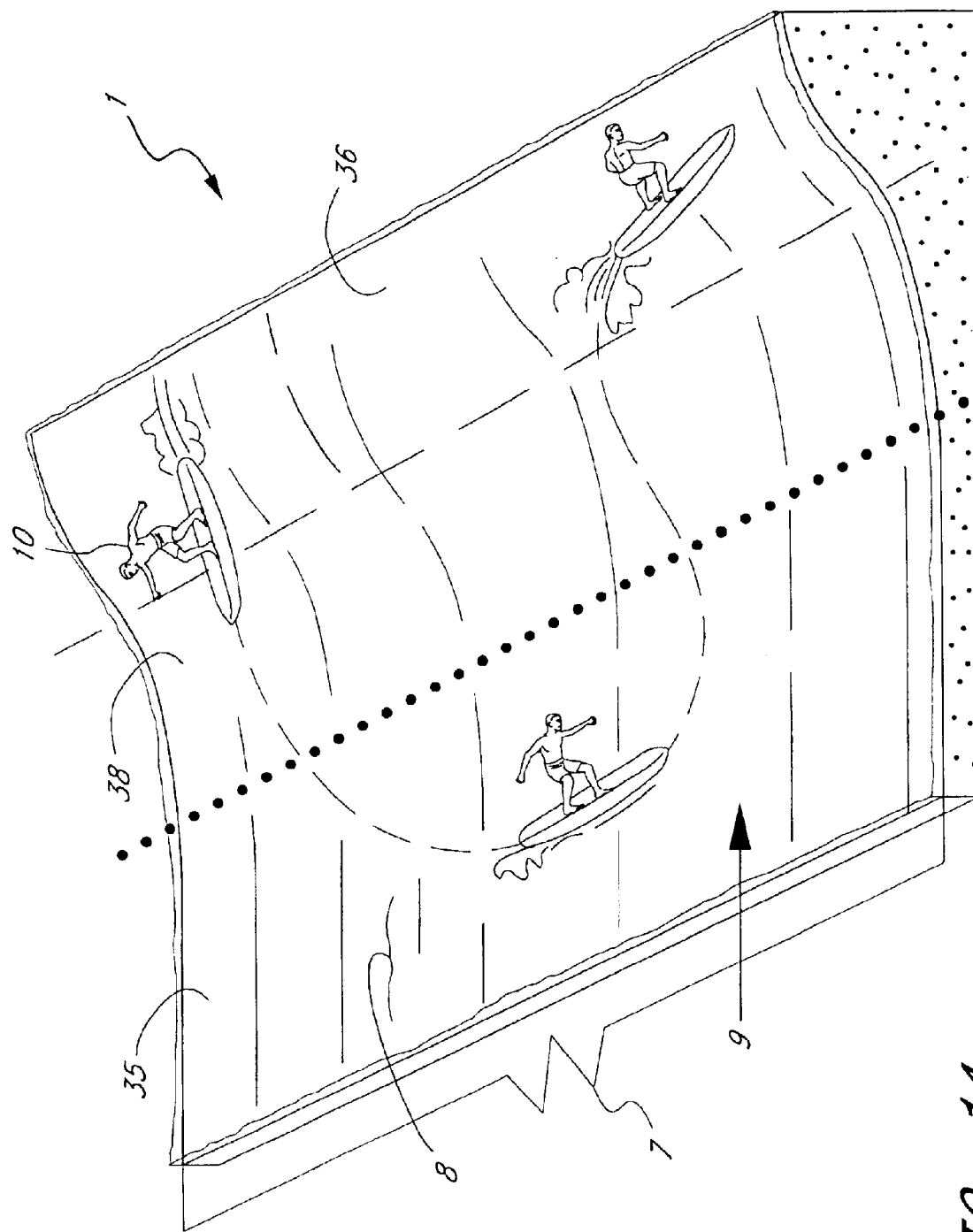
FIG. 14 is a schematic drawing of another embodiment of a containerless incline illustrating a rider in the process of accelerating during a turn as a result of an extended containerless incline.

Turning to FIG. 14 there is illustrated rider 10 in various stages of a surfing maneuver on containerless incline as improved by a properly proportioned sub-equidyne 35, equilibrium 38 and supra-equidyne 36 areas. Rider 10 is in a crouched position on supra-equidyne area 36 and gathering speed as he moves downward over a conformed sheet of super-critical water flow 8 which originates from water source 7 and moves in direction 9. Upon reaching the low point at sub-equidyne area 35, rider 10 extends his body and simultaneously carves a turn to return to supra-equidyne area 36. As a consequence of such maneuvering, rider 10 will witness an increase in speed to assist in the performance of additional surfing maneuvers. The process by which a surfing or water skimming rider can actively maneuver to increase his speed is referred to as the acceleration process.

A practical modification to sub-equidyne area 35 and equilibrium zone 38 of ride surface 3 is to laterally (i.e., side to side) tilt these areas in a direction perpendicular to the direction of flow 9. Such tilt, when applied to containerless incline 1 increases throughput capacity as the result of rider movement in the direction of the tilt due to the added vector component of gravity force ascribed to the weight of the rider in that direction. At a minimum, such tilt must be sufficient to encourage rider movement in the direction of tilt. At a maximum, this direction of tilt must still allow water skimming maneuvers.

Ride capacity is a function of the number of riders that can ride containerless incline 1 over any given period of time. Since in practical application the size of containerless incline 1 will be limited, throughput capacity is enhanced by limiting the amount of time for a given rider. Consequently, by tilting ride surface 3 gravity will assist in moving a rider from the start point to the finish point. For general application, the preferred tilt is 1 in 20.

Figure 15B:
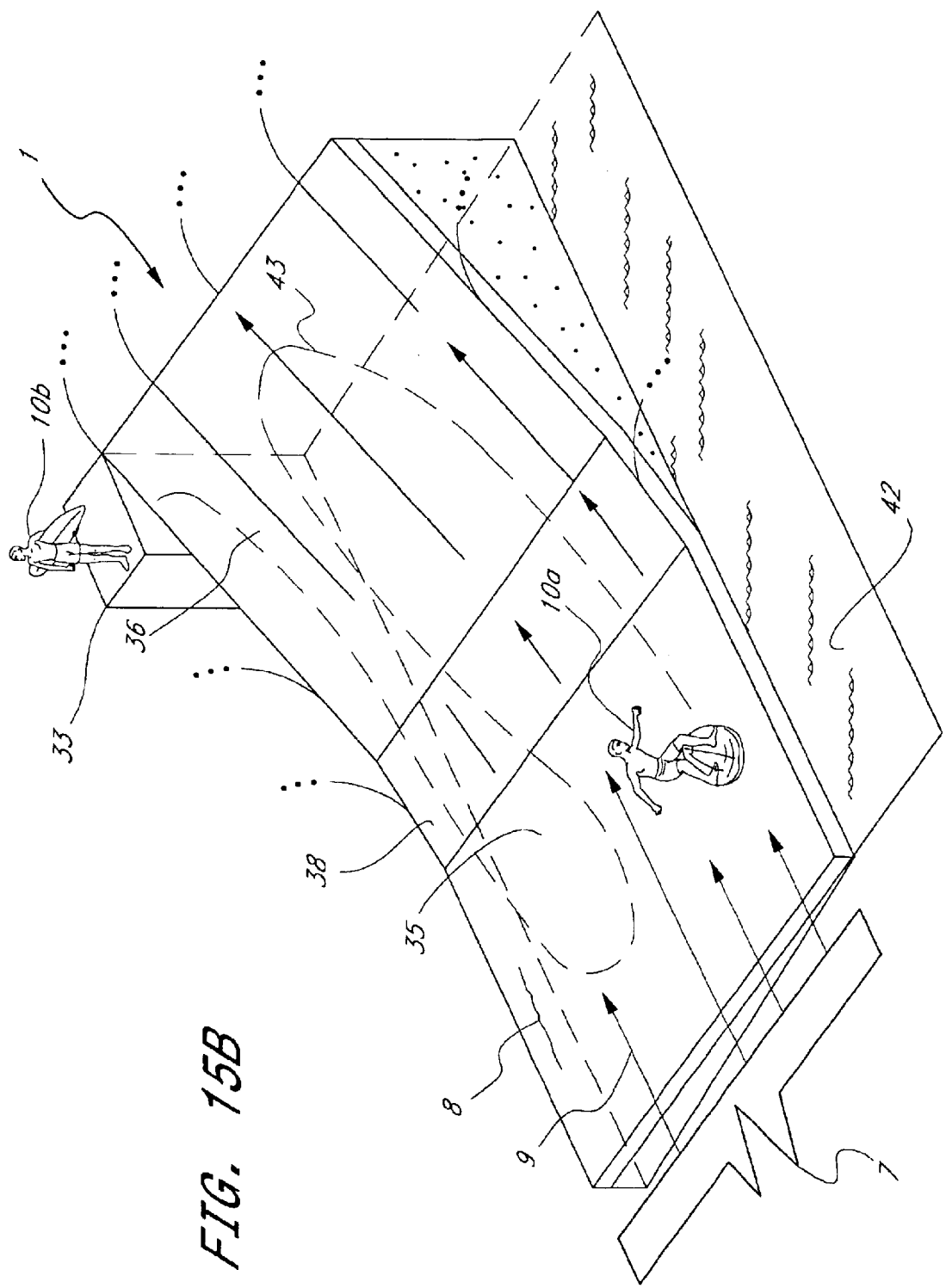
FIG. 15b is a schematic drawing of the tilted containerless incline of FIG. 15a in operation.

FIG. 15a shows containerless incline 1 with sub-equidyne area 35 tilted in a direction 41 which is perpendicular to the direction of flow 9. FIG. 15b shows supercritical water 8 as issued from source 7 moving in direction 9 over sub-equidyne area 35 (tilted), equilibrium zone 38 and supra-equidyne area 36. As rider 10a oscillates in an up-and-down fashion upon containerless incline 1 he simultaneously moves from start platform 33 to a termination pool 42 in a serpentine path 43 as the result of sub-equidyne 35 tilt. Shortly thereafter, rider 10b can enter containerless incline 1, thus demonstrating improved throughput capacity. In addition to improved throughput capacity, a tilt to sub-equidyne area 35 will assist in water draining from containerless incline 1 upon shutdown.

Combination Waves

Containerless incline 1 can also be used to simulate wave and breaker shapes that are ideal for the intermediate to advanced wave-rider. A more advanced wave is noted for its face shape and steepness. In general, an accomplished wave-rider prefers waves with a front face angle greater than forty-five degrees. At such angles of incline, a steeper version of two of the previously discussed wave shapes are identified: (1) an unbroken yet rideable wave face; and (2) a spilling wave with smooth unbroken shoulder. More significantly, and with proper conditions, a most prized third wave shape can also be simulated, i.e., a flow that progressively transitions from the horizontal past the vertical and curls forward to form a tube or tunnel within which the wave rider seeks to ride. Ideally the tunnel opens to an unbroken wave shoulder of decreasing steepness. An experienced rider performs his maneuvers from tunnel to shoulder and back again.

Figure 16A:
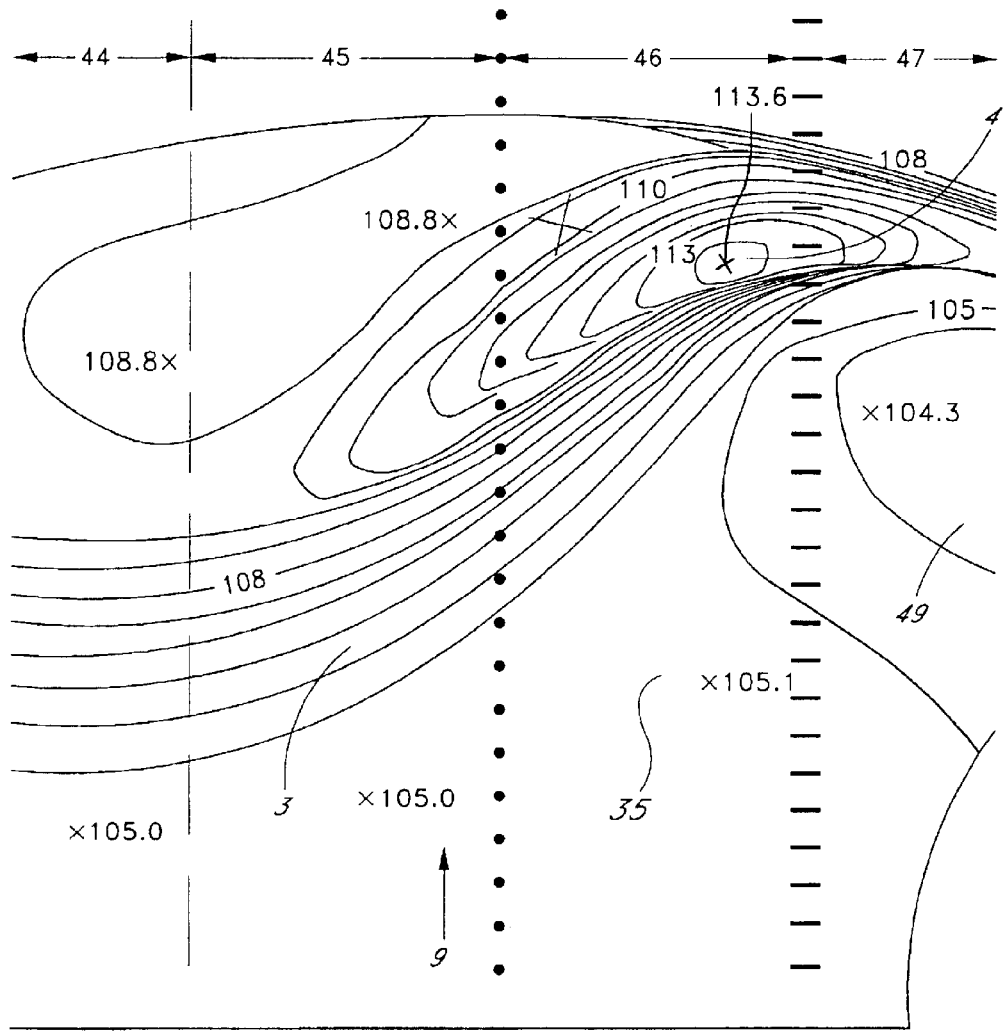
FIG. 16a is a top plan view of another embodiment of a containerless incline illustrating a preferred topographic contour of one embodiment of a three dimensional contoured containerless inclined surface that produces a body of water that simulates those types of waves desired by intermediate to advanced wave-riders, i.e., a tunnel wave with unbroken yet rideable shoulder.
Figure 16B:
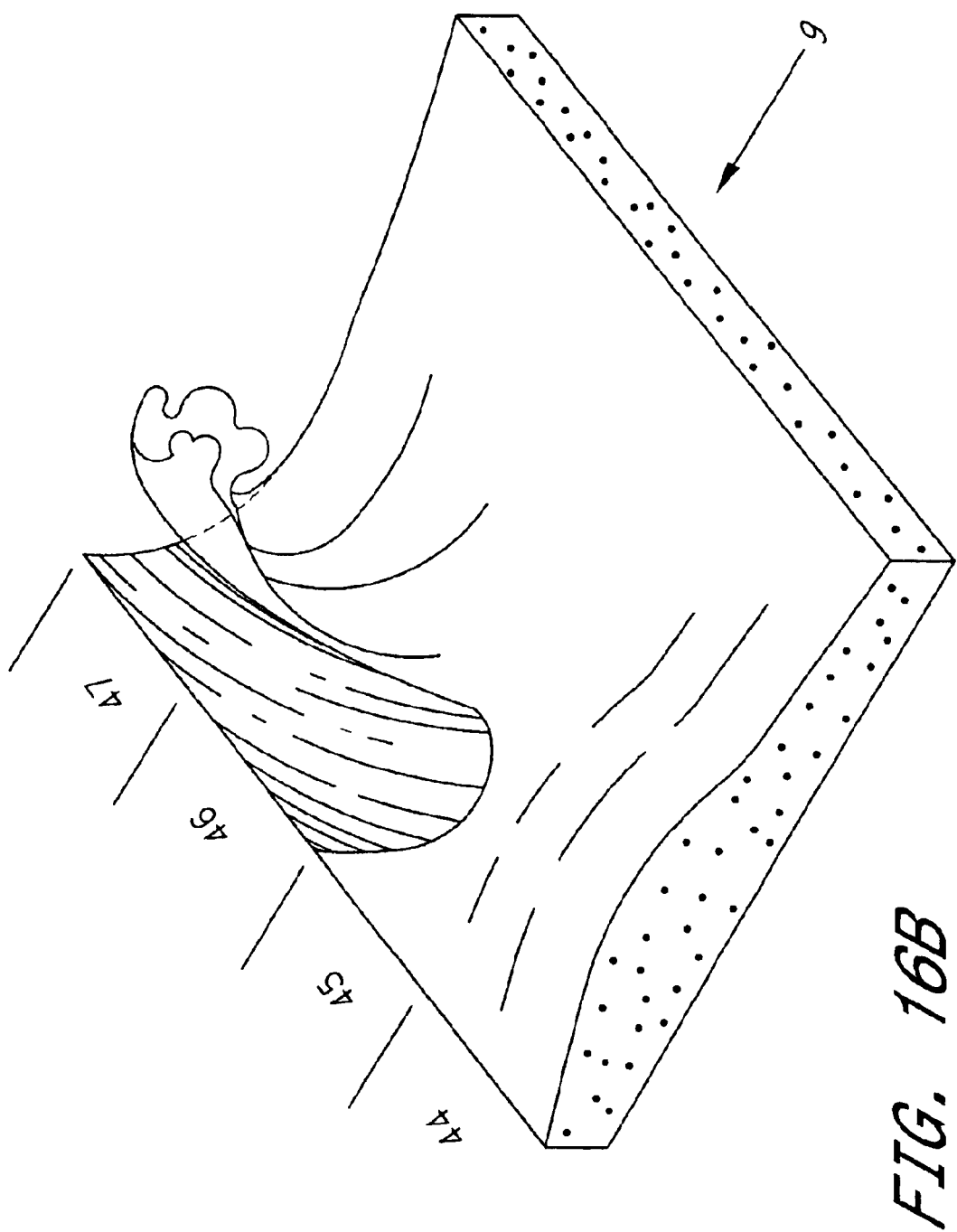

FIG. 16a (topographic contour in feet) and FIG. 16b (perspective) show a basic shape for containerless incline 1 that allows a supercritically separating flow to form a tube or tunnel that opens onto an unbroken shoulder. A unique characteristic to this basic shape is its ability to enable this separating stream tunnel to form over a wide range of flow velocities and thicknesses over a containerless incline that is not required to curve past the vertical. The basic shape shown in the perspective view of FIG. 16b includes the shoulder 44, an elbow 45, a pit 46 and a tail 47 which as subsequently described form a tunnel wave as shown.

Referring now to the topographic contour as shown in FIG. 16a, with flow direction 9 identified, four distinct subregions on ride surface 3 define the basic inclined shape: a shoulder 44 (that area left of dashed vertical line), an elbow 45 (that area between dashed vertical line and vertical dotted line), a pit 46 (that area between vertical dotted line and vertical hash line), and a tail 47 (to the right of vertical hash line).

Shoulder 44 is similar in configuration to previously described ride surface shapes for unbroken yet rideable wave faces, (e.g., FIGS. 2, 3 and 4). In transitioning to elbow 45 ride surface 3 begins bending in smooth curvilinear fashion in a downstream direction. Concurrent with its downstream sweep, ride surface 3 begins to increase in steepness with downstream ridge line 4 simultaneously increasing in elevation. At its maximum angle of sweep, elbow 36 transitions to pit 37 whereupon ride surface 3 continues to increase to its maximum steepness and concavity and ridge line 4 increases to its maximum elevation. The topographic contour map as shown in FIG. 16a describes the preferred relationships of shoulder 35 to elbow 36 to pit 37. Swale 49 serves to ventilate subcritical spilling white water during start-up, as well as the white water that appears when the lip of the tunnel reconnects. Swale 49 is formed by a smooth sculpted depression in sub-equidyne area 35.

Figure 16C:
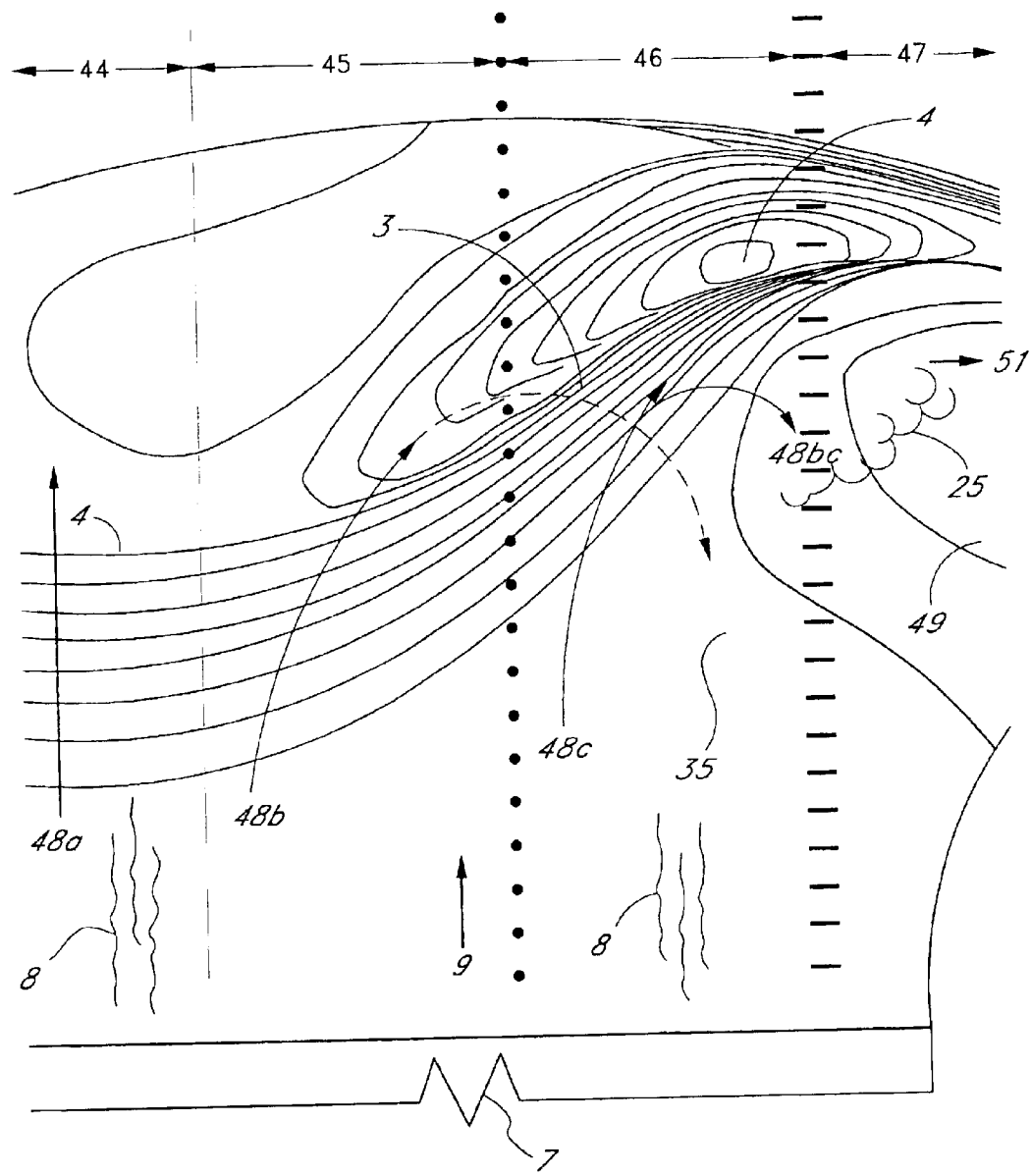
FIG. 16c is a schematic flow diagram of the containerless incline of FIG. 16a illustrating streamline trajectories of a flow simulating a tunnel wave with unbroken yet rideable shoulder.

Streamline characteristics as illustrated in FIG. 16c require a suitable flow source 7 (e.g., pump, fast moving stream or elevated dam/reservoir) providing a supercritical sheet flow of water 8 in initial flow direction 9 (as indicated by arrow). The hydraulic characteristics of the flow and their synergistic interaction is best described by reference to each respective sub-region.

In shoulder area 44, since the sole source of outside pressure is due to gravity, the uniform rate of surface incline results in flow 8 taking a predominately two dimensional straight trajectory up riding surface 3 and over downstream ridge line 4 as indicated by a streamline 48a. In elbow sub-region 45, a backwards sweep creates a low pressure area towards the backswept side. As flow 8 rises in elevation upon elbow 45, to avoid increasing hydrostatic pressure, flow 8 begins to turn toward the area of lower pressure as indicated by streamline 48b. Now flow 8 is no longer two dimensional, it becomes three dimensional due to this cross stream pressure gradient.

The trajectory of flow 8 as indicated by streamline 48b is parabolically inclined. If hypothetically extended (indicated by continued dashed curve), the last half of this parabola is directed downslope and angled away from the riding surface 3.

In pit area 46, a swale 49 in sub-equidyne area 35 combined with an increasing steepness of ride surface 3 results in a parabolic trajectory that moves up straighter and closes more tightly as illustrated in streamline 48c. Consequently, and as a result of distinct inclined parabolic trajectories, streamlines 48b and 48c will converge. As the result of the momentum exchange of the convergence, both flows change direction away from ride surface 3. This leads to flow separation resulting in the desired stationary tunnel opening to unbroken shoulder upon which a rider 10 performs water skimming maneuvers. As supercritical flow 8 separates from ride surface 3, its new direction of flow, as indicated by streamline 48bc, is transverse to the original direction of flow 9. When streamline 48bc reattaches from the flow 9, white water 25 appears and forms a tail race 51 as guided by tail area 47.

Figure 17:
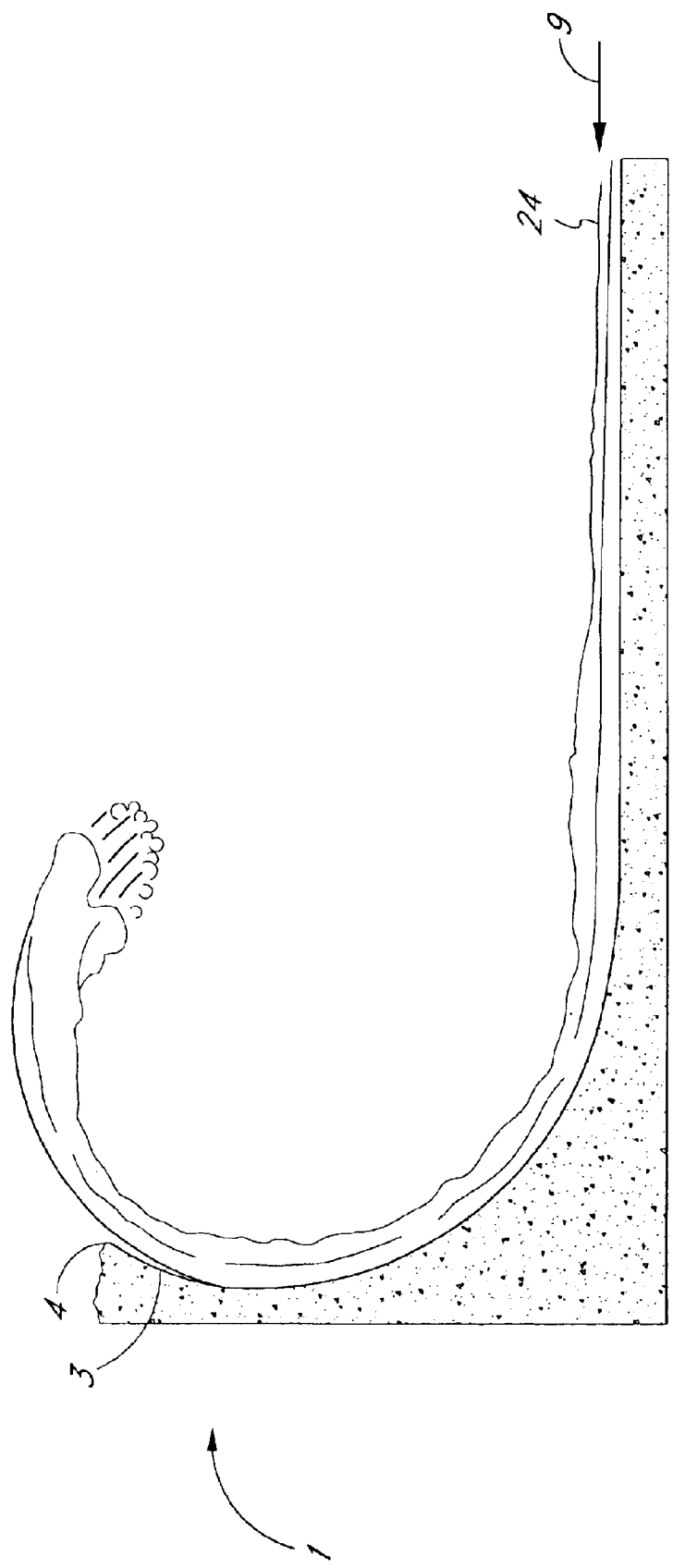
FIG. 17 is a cross-section view of another embodiment of a containerless incline that will permit conforming tunnel waves.

A prerequisite to stream tunnel formation is that supercritical flow 8 must have at least sufficient velocity to clear downstream ridge line 4 on shoulder area 44. Increases to the velocity of supercritical flow 8 will result in an increase in tunnel diameter, i.e., an increase in apparent wave size. Where increases in flow velocity are not the limiting factor, maximum tunnel diameter is predominately determined by the degree of inclination in the supra-equidyne area of pit 46. If the inclination only approaches the vertical, then maximum size is achieved when supercritical flow 8 upon convergence no longer separates, i.e., it becomes a conforming flow. If ride surface 3 inclination exceeds the vertical and curls back on itself, as shown in section in FIG. 17, tunnel formation can still result from a conforming flow. The embodiment shown in FIG. 17 advantageously allows stream tunnel formation in situations where the supercritical flow 8 velocity head is significantly higher than the highest vertical point of downstream ridge line 4.

Figure 16D:
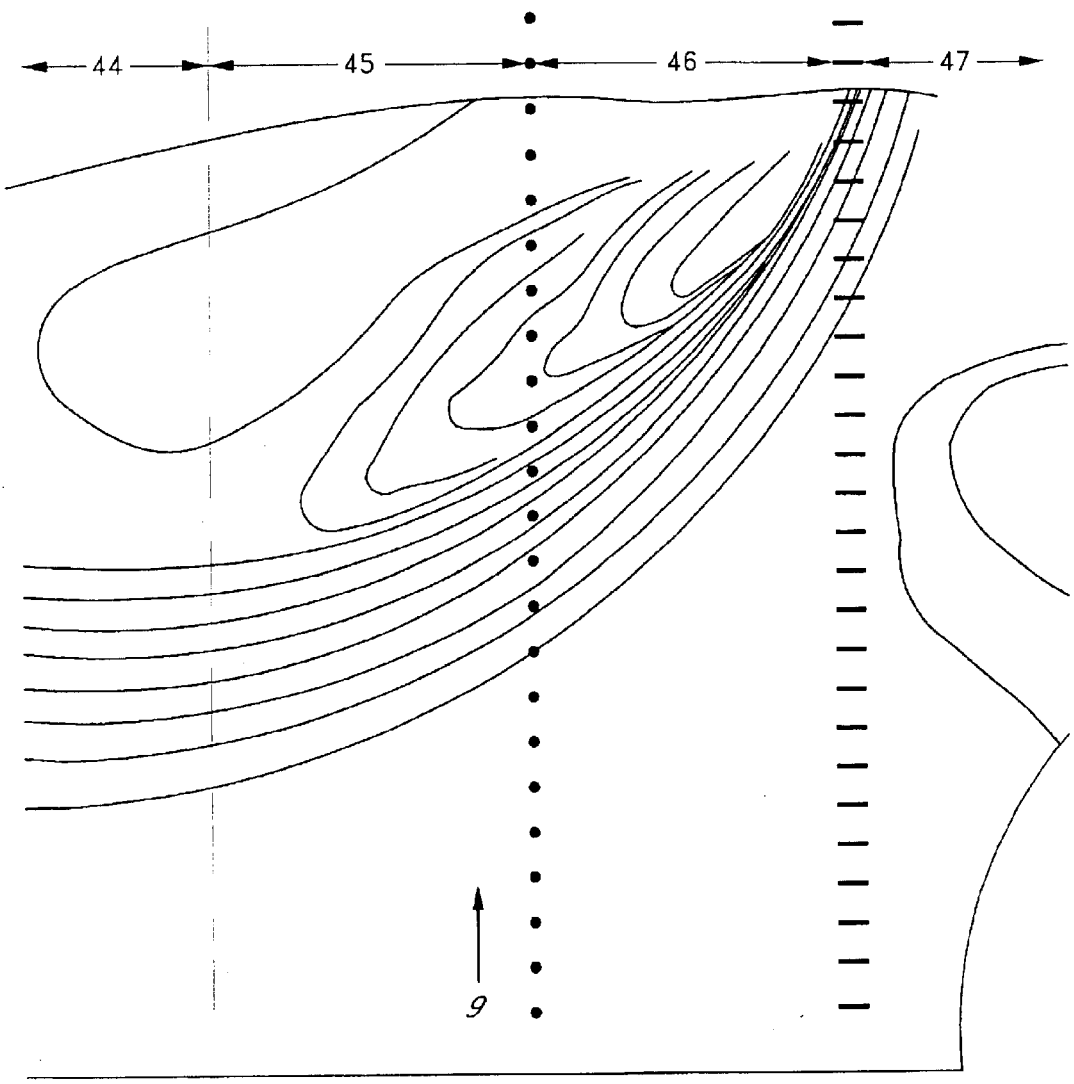
FIG. 16d is a top plan view of another embodiment of a containerless incline illustrating the topography of a containerless incline with minimal deflection that still permits tunnel wave formation.

Within a given range, modification to the orientation of elbow 45, pit 46 and tail 47 are permissible to accommodate site constraints and achieve certain stream tunnel effects. This is especially important when a secondary use is required of tail race 51, e.g., powering a loop river course as previously discussed. Shifts in orientation of the respective sub-regions (i.e., shoulder 44, elbow 45, pit 46 and tail 47) throughout a given range can result in an increase or decrease in streamline 48b and 48c convergence. Too little streamline convergence, avoids separation and resultant tunnel formation. Excessive streamline convergence results in supercritical flow deceleration, hydraulic jump formation, and associated white water 25. However, there are circumstances in which it may be desirable to judiciously induce such effect. The practical consequence of a supercritical separation augmented by local hydraulic jumps is that different types of "wave-like" shapes can be created, e.g., varying combinations of spilling and tunnel flows. Visually these flows appear distinct, and from a riders perspective they can be ridden differently utilizing different maneuvers. For example, a "snowball" effect inside a stream tunnel as induced by hydraulic jump formation in tail 47 which creates a snowball of white water in pit 46, yet still wrapped by a tunnel wave can be used to provide added push to a rider, e.g., bodysurfer, in the direction of the "shoulder." The orientation as shown in FIGS. 16a and 16c tend toward the range of maximum streamline convergence. The orientation as shown in FIG. 16d tends toward the range of minimum permissible streamline convergence.

In addition, the various wave shapes can be achieved by altering other parameters, such as the dimensions, orientation and arrangement of the shoulder 44, elbow 45, pit 46 and tail 47. The reciprocal to actual physical rearrangement of shoulder 44, elbow 45, pit 46 and tail 47 is to alter the direction of flow 9. The same minimum/maximum angular relationship applies. Likewise, a re-orientation of backwards sweep can create a left or mirror image of the previously shown right breaking flow.

Figure 18A:
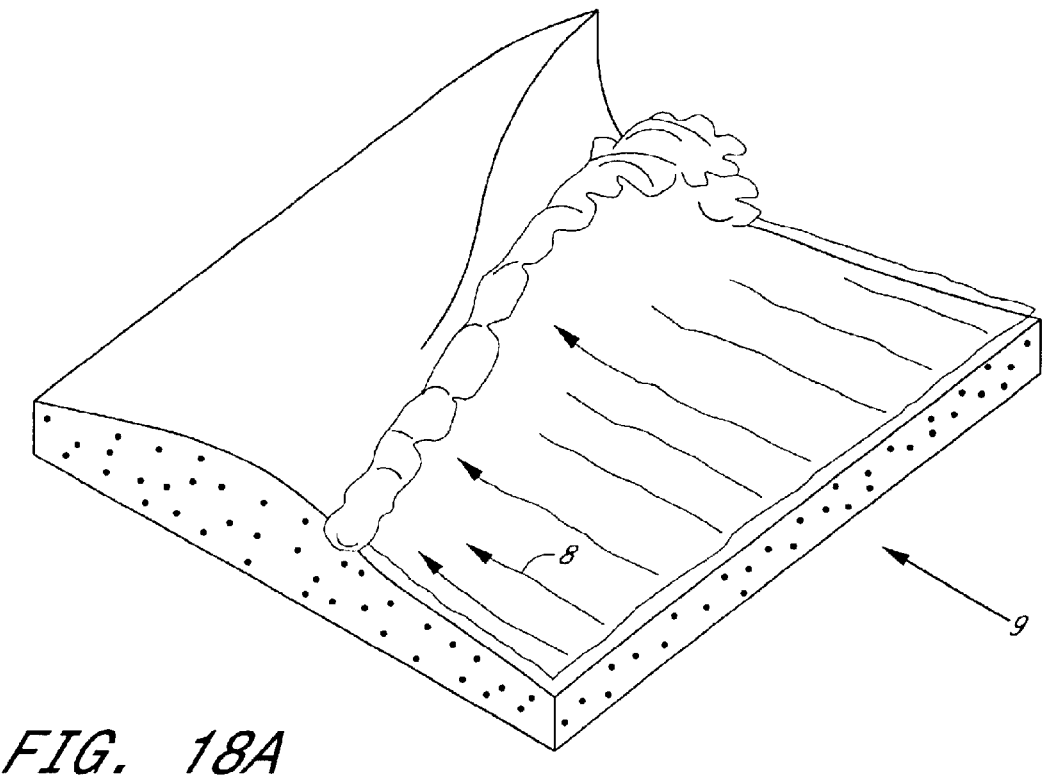
FIGS. 18a, 18b, 18c are three profile views of a containerless incline undergoing the wave transformation process.
Figure 18B:
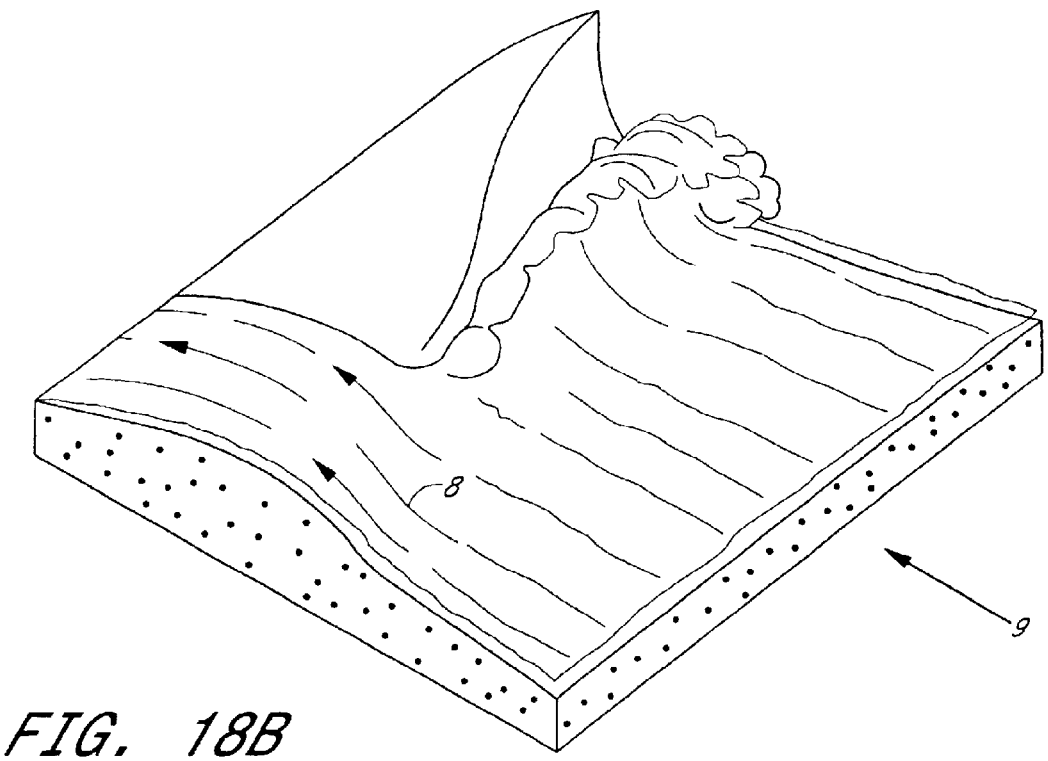
Figure 18C:
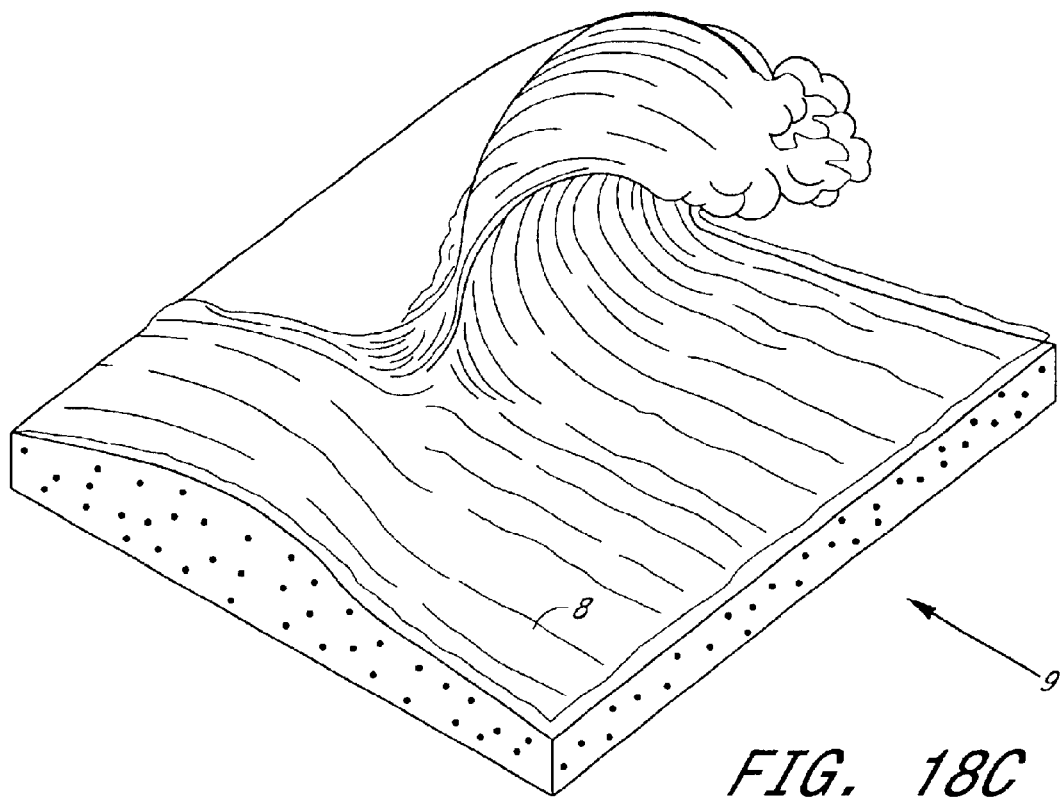

FIG. 18a, FIG. 18b, FIG. 18c, FIG. 18d, FIG. 18e and FIG. 18f illustrate a unique feature of containerless incline 1 as configured in FIG. 16, i.e., its unique flow forming ability. That is, the wave shape can permit (by way of a progressive increase of the velocity of the water flow) the transformation of super-critical water flow 8 that originates from a water source (not shown) in direction 9 to a stationary white water bore along the entire forming means (as illustrated in FIG. 18a); to a stationary spilling wave with unbroken shoulder (as illustrated in FIG. 18b); to a stationary stream tunnel with unbroken shoulder (as illustrated in FIG. 18c). This progressive wave simulation forming method may be referred to as the "flow transformation process."

Figure 18D:
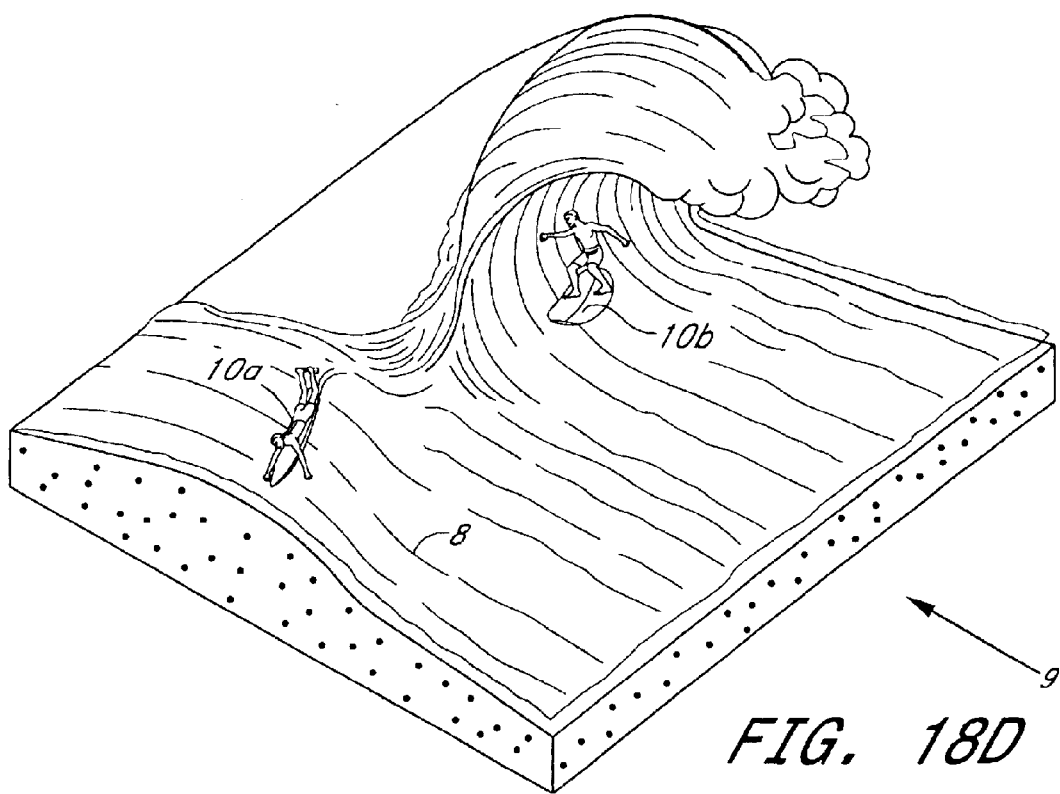
FIGS. 18d, 18e, 18f are three profile views of a containerless incline undergoing the wave transformation process with riders.
Figure 18E:
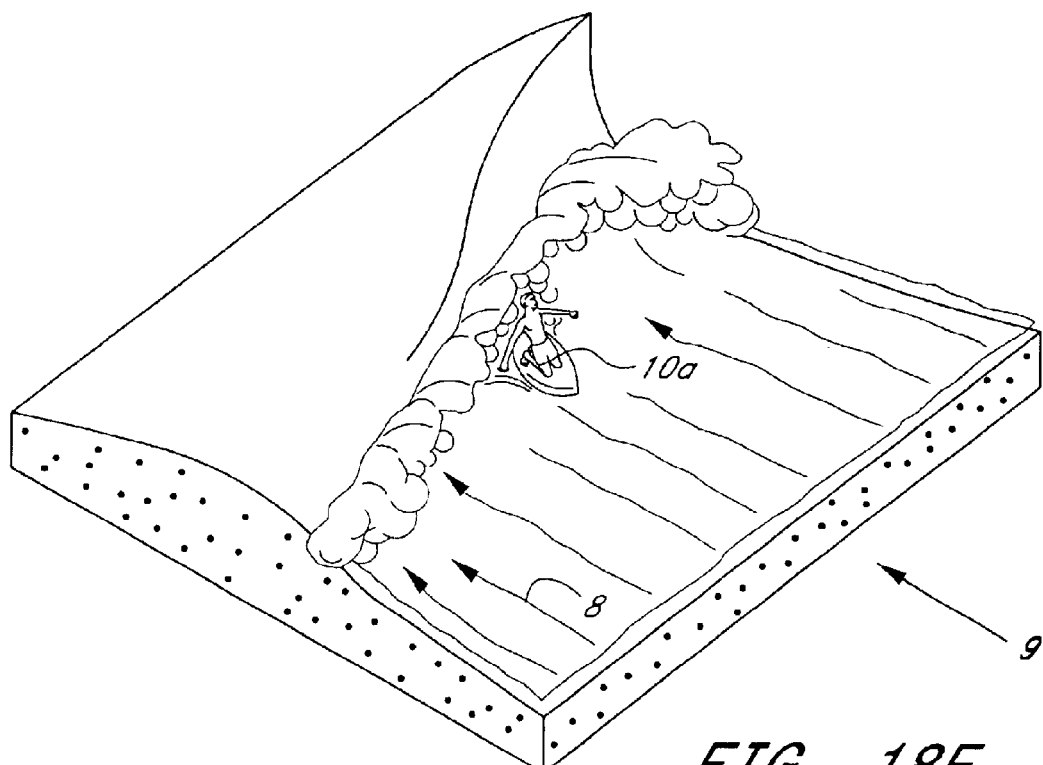
Figure 18F:
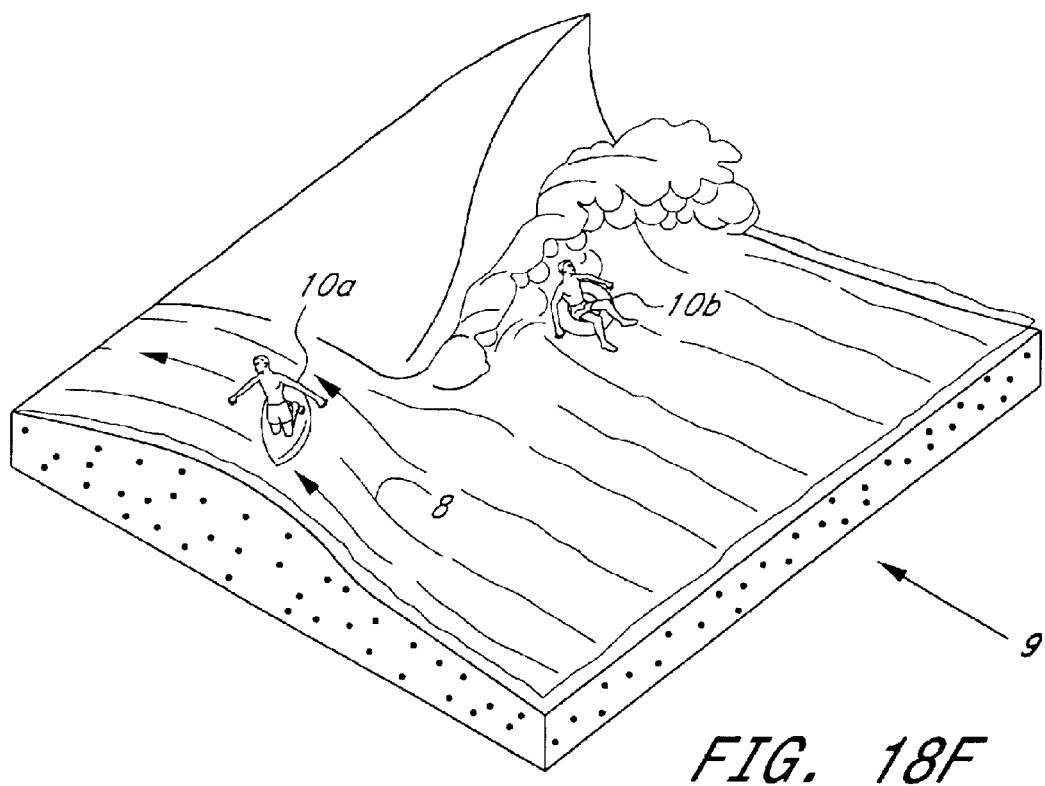

As shown in FIGS. 18d, 18e and 18f, the flow transformation process has the advantage of enabling rider(s) 10a or 10b to sequentially enjoy (or an operator to progressively provide) a multiplicity of simulated wave types, e.g, white water bore, unbroken, spilling or tunnel, upon a single properly configured containerless incline 1, and all within a relatively short time span. For example, the water flow can be pulsed or sequenced rhythmically to provide the various waveforms shown in FIGS. 18d–18f, thereby simulating the variable waves experienced at the ocean shore. Changes in velocity of water flow can be achieved by any well known combination of gate controlled adjustable head reservoirs or by direct pump volume and velocity control by way of variable speed motors, electrical adjustable speed drive systems or gear/clutch mechanisms.

Moving Water Swaths

Figure 19A:
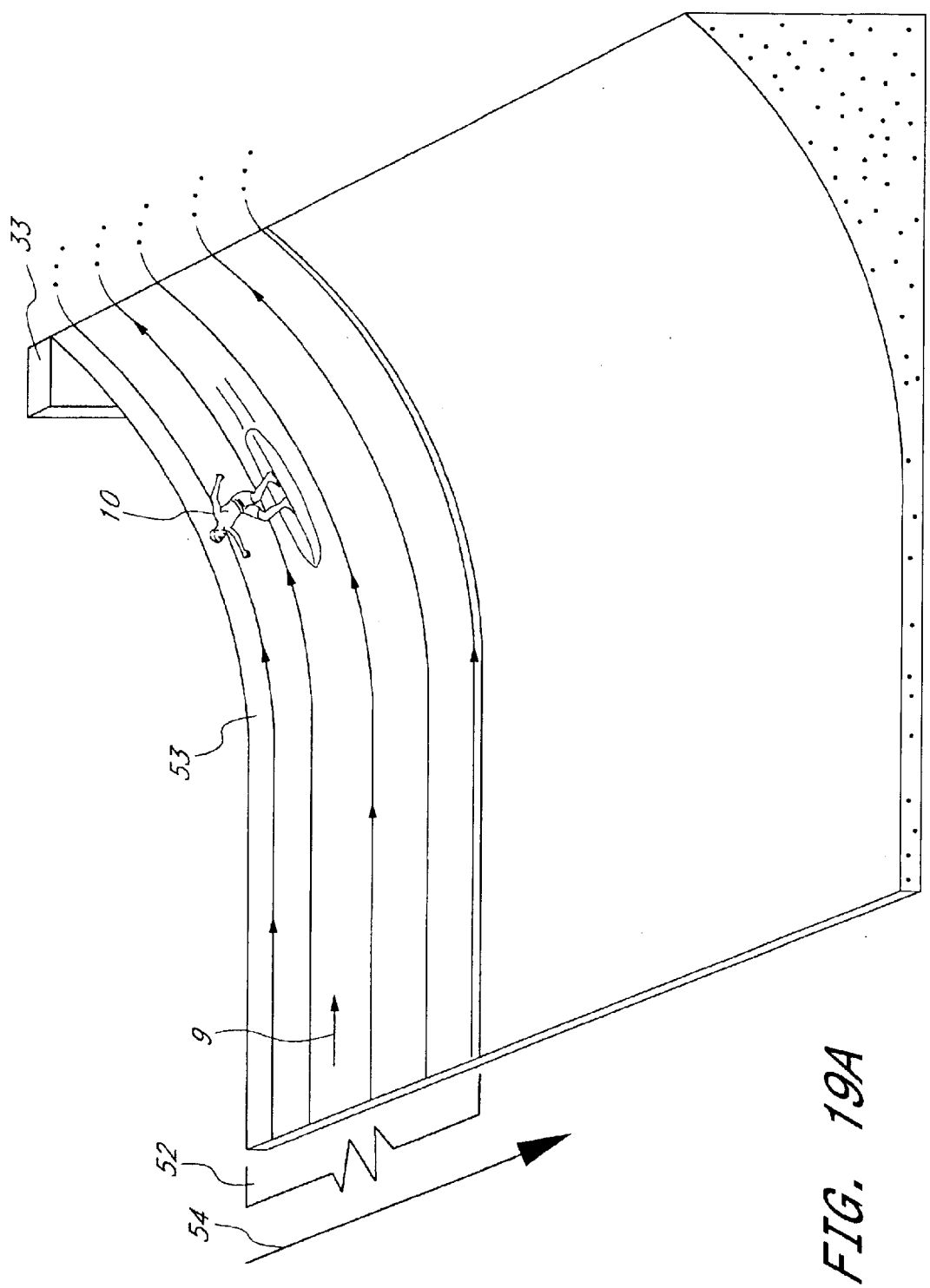
FIGS. 19a, 19b, 19c is a schematic drawing of another embodiment of a containerless incline having a moving swath.
Figure 19B:
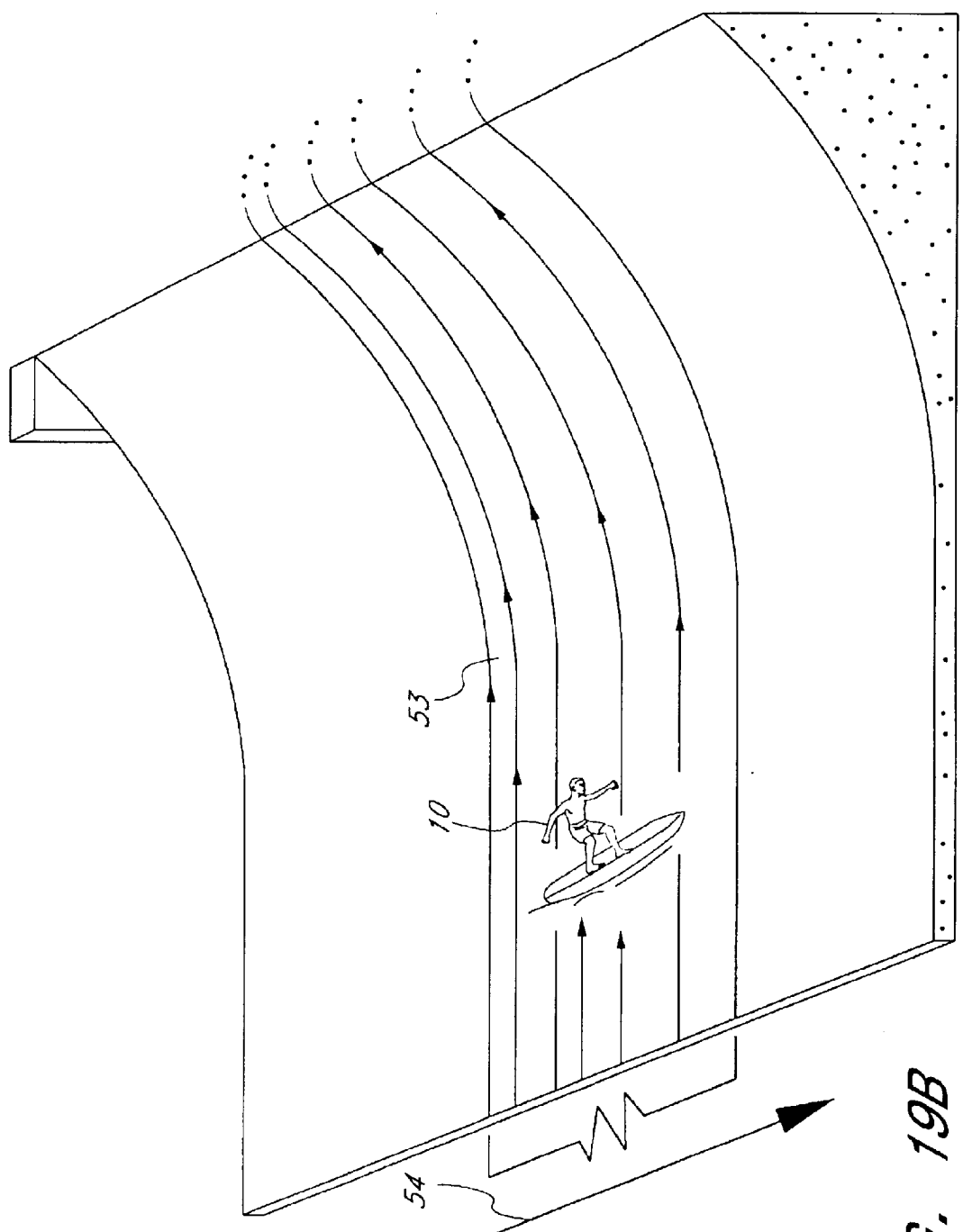
Figure 19C:
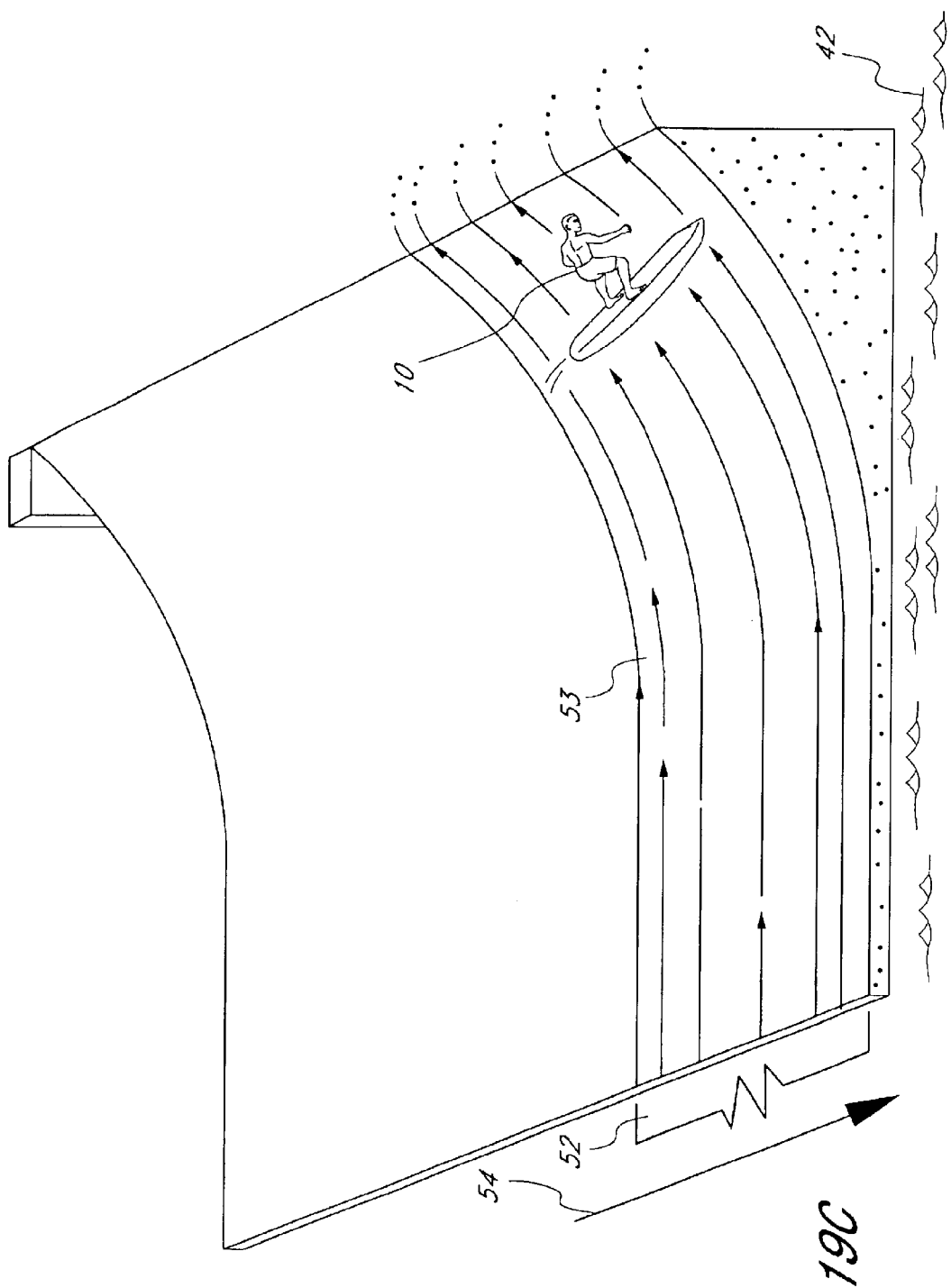

Another viable option to increase throughput capacity on containerless incline 1 is shown in timed sequence in FIGS. 19a, 19b and FIG. 19c as a moving aperture 52 that produces a moving water swath 53. Moving water swath 53 has a sideways component or direction of travel (as indicated by arrow 54), in addition to the previously described direction of flow 9. Sideways component of motion 54 preferably moves at the rate of 1 to 5 meters per second. As shown in FIG. 17a, rider 10 enters the moving water swath 53 from start platform 33 and attempts to match his speed with the sideways component of motion 54 while simultaneously performing water skimming maneuvers. A few seconds later, rider 10, as illustrated in FIG. 19b, has synchronized his lateral motion with the sideways component of motion 54 of moving water swath 53 and performs a turning maneuver in accordance with the acceleration process. Seconds later, in FIG. 19c, rider 10 has moved to the top of moving water swath 53 and begins to cutback down towards termination pool 42. Moving aperture 52 can result from either a moving nozzle, moving weir, sequentially opening single aperture or sequentially opening multiple aperture (not shown). Other benefits to moving swath technology include its ability to minimize the perimeter flow of water that goes unused by a rider and the optional park design benefit of moving a rider from one point to another.

Figure 20:
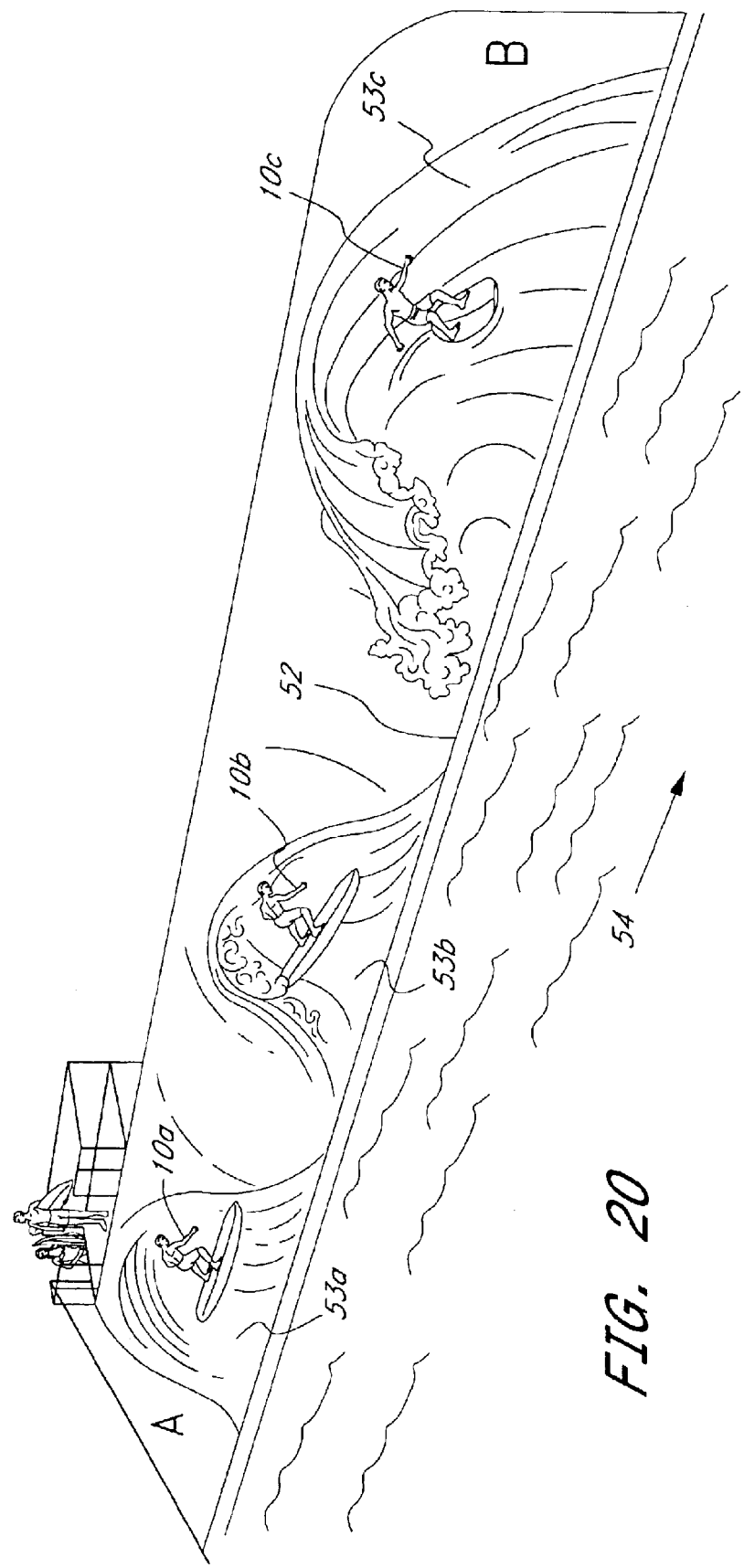
FIG. 20 is a schematic drawing of another embodiment of a containerless incline having multiple moving swaths and a variety of wave types.

In terms of wave simulation, FIG. 19 illustrates the unbroken yet rideable wave face preferred by beginners. All other simulated wave types (e.g., a white water bore; a spilling wave with smooth unbroken shoulder; or a stream tunnel with smooth unbroken shoulder), are easily accomplished by modifying the surface inclination of containerless incline 1 and/or the direction and velocity of water flow as previously discussed. In this regard, FIG. 20 shows riders 10a, 10b and 10c simultaneously riding moving water swaths 53a, 53b and 53c respectively all with sideways component of motion 54 as issued from moving aperture 52. Progressive changes in water velocity and ride surface shape in conformance with previously discussed principals permit rider 10a to perform water skimming maneuvers upon an unbroken shoulder, rider 10b upon a spilling wave with unbroken shoulder, and 10c upon a stream tunnel with unbroken shoulder. It should be noted that moving swath technology allows the simulated wave shape to transport energy from point A to point B and allow the phase of the wave to change from point A to point B. Thus, there is no longer a stationary pattern, but rather a mean transport of momentum going in the direction of aperture movement.

Figure 21:
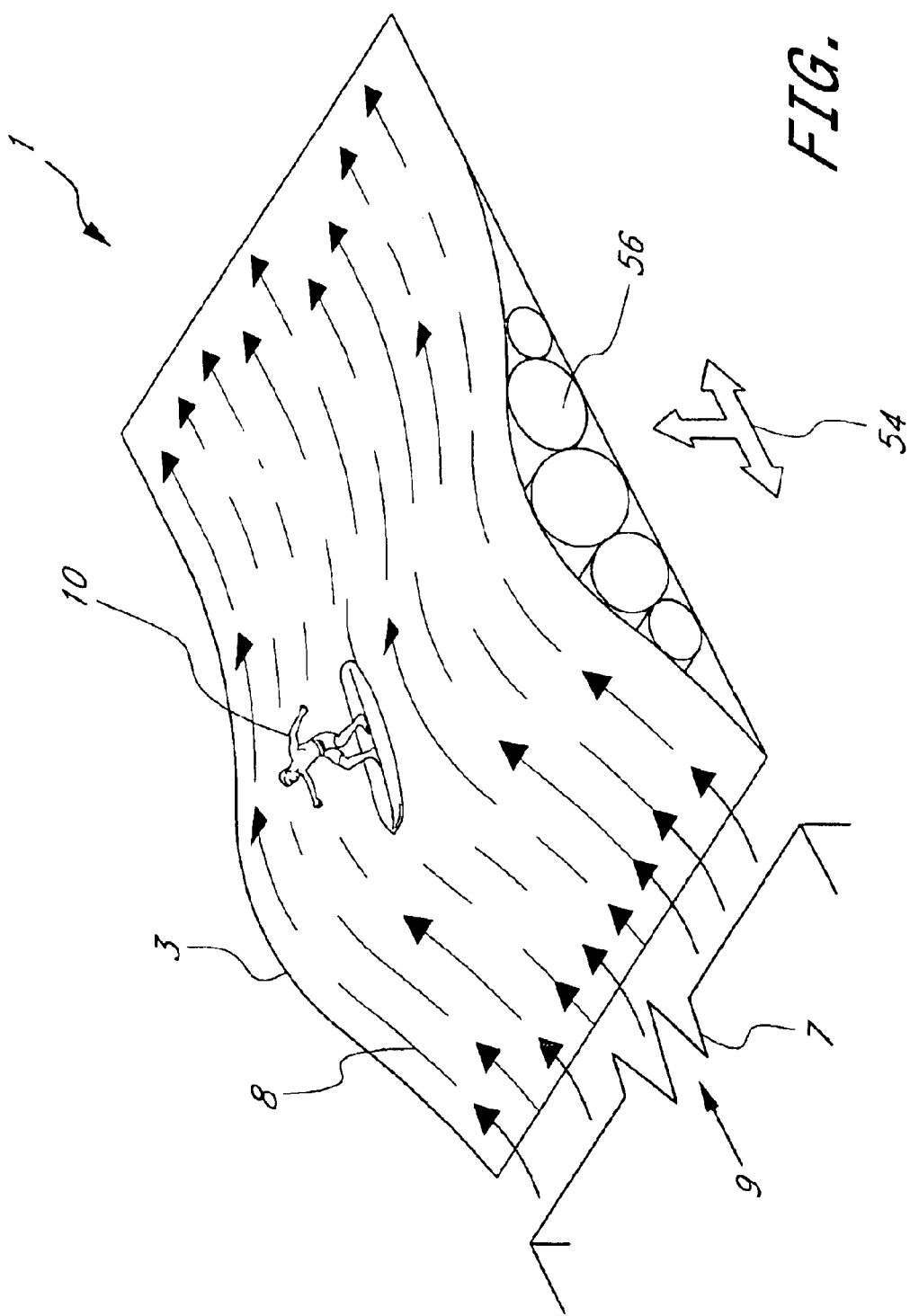
FIG. 21 is a schematic drawing of another embodiment of a containerless incline having a flexible ride surface capable of peristaltic movement.

Ride surface movement can also cause a mean transport of momentum and a non-stationary flow pattern. FIG. 21 shows containerless incline 1 with a suitable flow source 7 providing super critical sheet flow of water in an initial flow direction 9 (as indicated by arrow) and over a pliable ride surface 3 that sequentially undulates in a peristaltic manner by a sub-surface auxiliary motion generating device 56. Sub-surface motion generating device 56 causes pliable ride surface 3 to rise or fall by pneumatic/hydraulic bladders that sequentially inflate and deflate resulting in a component of motion 54 in multiple directions, as indicated by arrows 54. Rider 10 performs water skimming maneuvers on the upwardly inclined sheet flow as augmented by the undulating ride surface. Other methods commonly available also include a mechanically powered wedge or roller.

Containerless surface distortion will alter flow pressure gradients thus manifesting changeable wave-like characteristics, e.g., spilling flows, waves, stream tunnel, or even differing types of tunnel effects. Sequential undulation or peristaltic movement of a pliable containerless surface will provide a novel traveling incline with varying flows characteristics. At a minimum, the range of pliable containerless surface movement could include that necessary to modify and redirect only a portion of a given stream, e.g., where the tail 47 and pit 46 of FIG. 16d are shifted counter to direction of flow 9 to induce a hydraulic jump with associated spilling flow. At a maximum, the entire incline can travel parallel or transverse to the direction of flow. Such device has the added benefit of rider 10 movement to an end point that is different from the beginning point with increased rider throughput capacity. Additionally, sub-surface auxiliary motion generating device 56 can be locked in one position to also serve in stationary flow use.

Prevention of Oblique Wave

To this point, the flow upon containerless incline 1 has been described as issuing at either an incline or horizontally. When the source for such flow is from a pump or dam/reservoir with associated aperture, e.g., nozzle, there is a significant likelihood that oblique (i.e. non-coherent streamflow lines) waves will form at an angle to the flow from boundary layer disturbance associated with the aperture enclosure. Oblique waves not only impair a rider in his performance of water skimming maneuvers, but they may grow and lead to choking of an entire flow.

Figure 22:
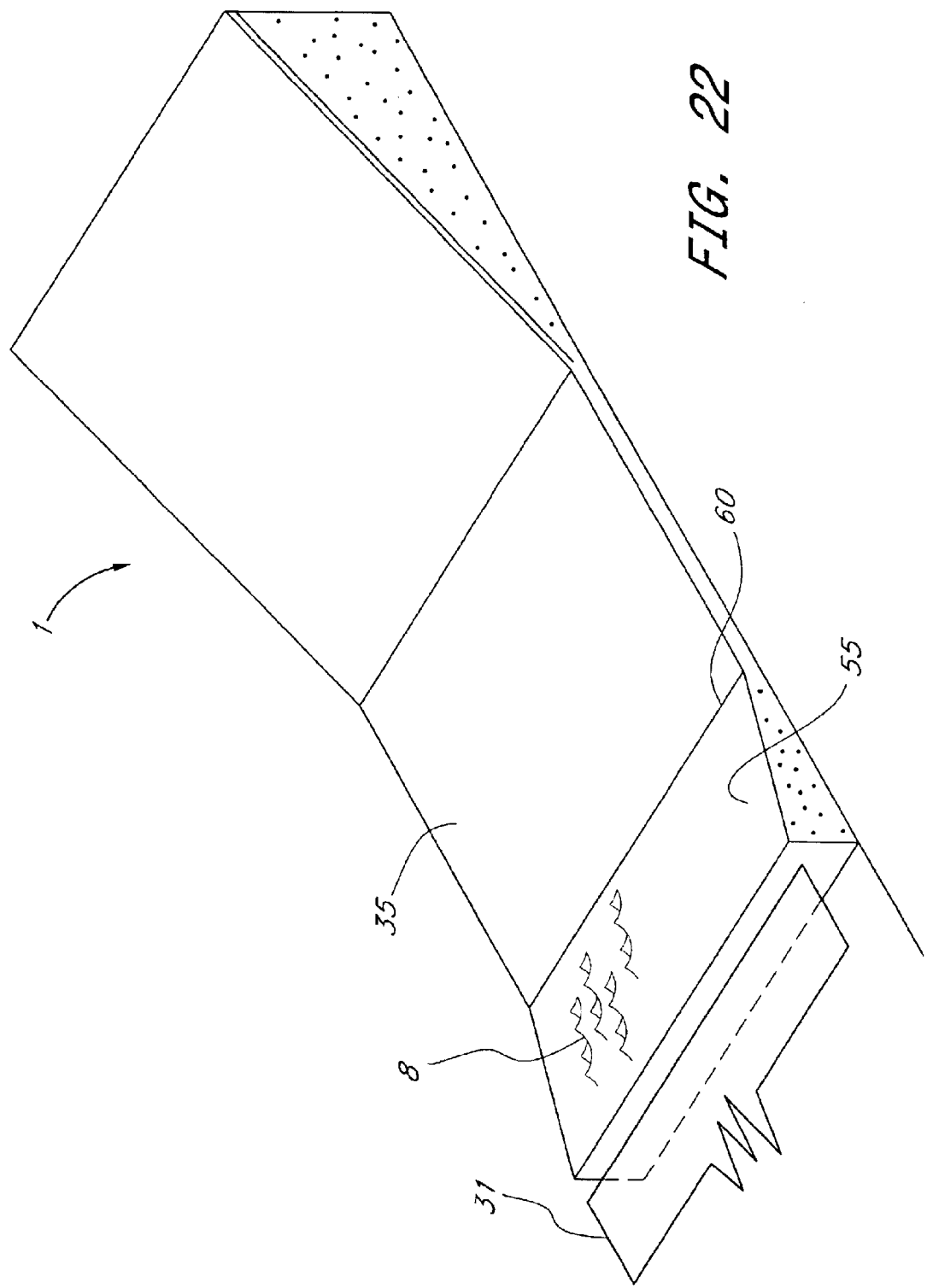
FIG. 22 is a schematic drawing of another embodiment of a containerless incline illustrating preferred positioning of a source of water flow to minimize oblique wave formation.

A solution to oblique wave formation is shown in FIG. 22 where an angular extension of containerless incline 1 creates a downhill ramp 55 upon which aperture 31 issues super-critical flow 8. This extension from an upstream edge 60 of sub-equidyne area 35 creates a downhill ramp 55 of sufficient decline to inhibit oblique wave formation (i.e., the oblique waves are swept downstream). At a minimum, the vertical component for downhill ramp 55 is approximately 0.5 meter with a preferred angle of declination of 20 to 40 degrees. The ramp smoothly transitions to the sub-equidyne area 35. Contrary to horizontal or inclined surfaces on containerless incline 1, it is permissible for downhill ramp 55 to utilize side walls, since oblique waves do not have sufficient energy to propagate both against the current and uphill. The advantage to having sidewalls when the flow goes downhill is that the integrity of the flow can be maintained while avoiding lateral spread which dilutes the flow's momentum.

In addition to avoiding the oblique wave problem, as just discussed, further extension in the upstream direction of downhill ramp 55 of containerless incline 1 will enable riders to perform surfing and water skimming maneuvers in a format heretofore unavailable except by analogy to participants in the separate and distinct sports of skateboarding and snowboarding, to wit, half-pipe riding. In common parlance, the name "half-pipe" arose from the observation that the ride surface is substantially in the configuration of half of a pipe with the split opening of this half-pipe facing in an upwards direction.

Figure 23:
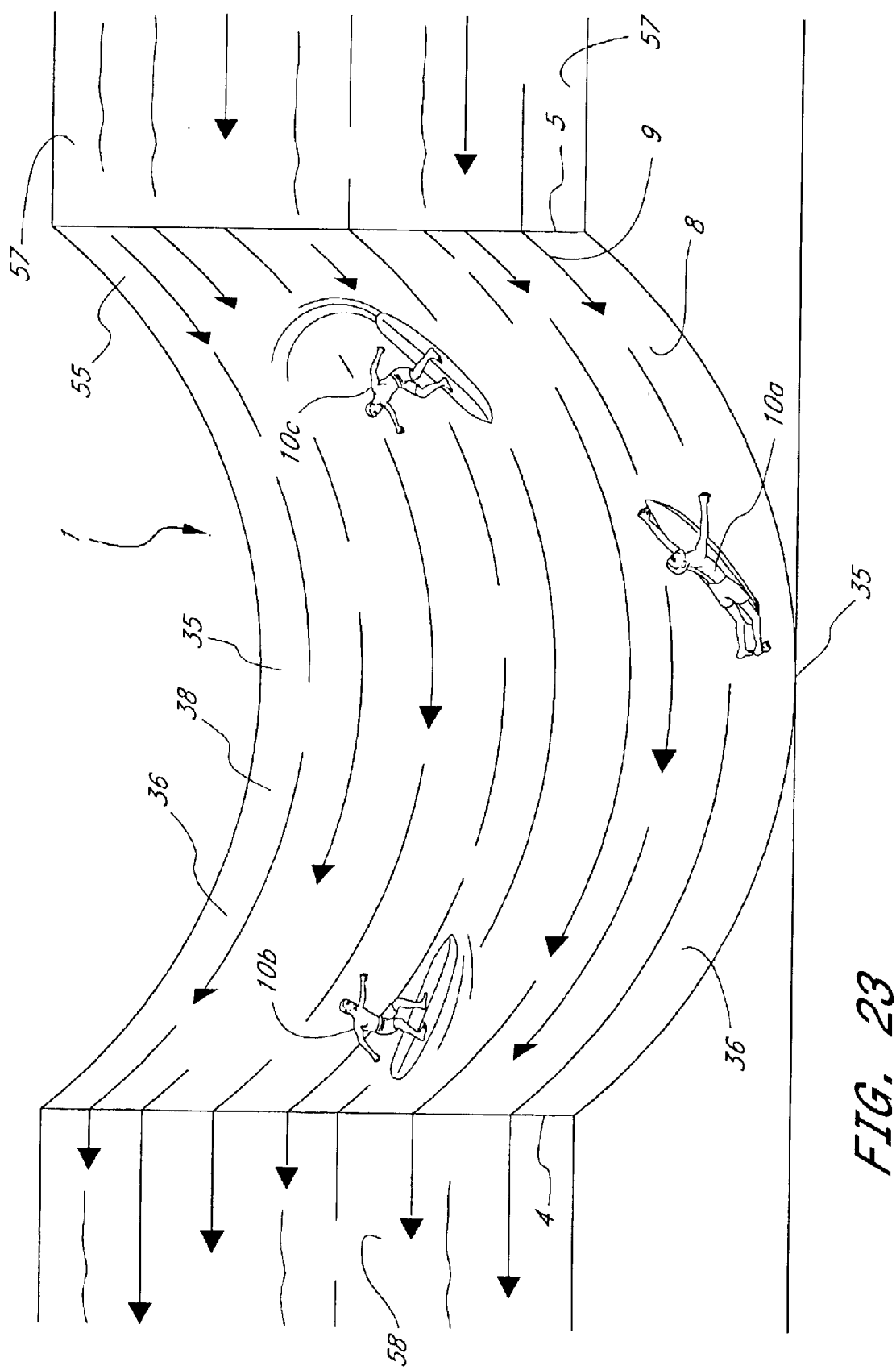
FIG. 23 is a schematic drawing of another embodiment of a containerless incline illustrating in profile view a novel fluid half-pipe configuration.

In deference to the concept of a fluid half-pipe, FIG. 23 shows containerless incline 1 fully extended to allow a rider to also maneuver upon downhill ramp 55. At full extension, a source pool 57 supplies a flow of water that turns to supercritical flow of water 8 shortly after overflowing upstream edge 5 of containerless incline 1, whereupon it flows down downhill ramp 55, in a direction 9, across an appropriate sub-equidyne area 35, equilibrium zone 38, supra-equidyne area 36, up and over downstream ridge edge 4, and into an appropriate receiving pool 58. A rider 10$a$ enters flow 8 at any appropriate point, e.g., sub-equidyne area 35, wherein as a result of his initial forward momentum of entry, the excessive drag of his water-skimming vehicle, and the added drag of the riders weight-induced trim adjustments to his riding vehicle, said rider (now 10$b$) is upwardly carried to supra-equidyne area 36 near downstream ridge edge 4. At this point, as a result of the force of gravity in excess of the drag force associated with the riding vehicle and the riders weight-induced trim adjustments to reduce drag, rider (now 10$c$) hydro-planes down through equilibrium zone 38, across the sub-equidyne area 35, and performs a turn on downhill ramp 55 to return to supraequidyne area 36 and repeat the cycle.

An extension of containerless incline 1 in the shape of a fluid half-pipe will offer its participants a consistent environment in which to perform known surfing and water skimming maneuvers. Due to the combination of up-side-flow, flat and down-side-flow, a unique environment is created in which new maneuvers unachievable on existing wave surfaces can be performed.

It is preferred that the width (measured in the direction of supercritical water flow 8) of a containerless incline 1 shaped as a fluid half pipe remain constant for the duration of its length; however, variations in width with resultant variations in cross-sectional flow shape are possible. The limitations on minimum and maximum width is a function of ones ability to perform water skimming maneuvers. With insufficient width, a rider would be unable to negotiate the transition from supra-equidyne area 36 to downhill ramp 55 or vice versa. If too wide, a rider would not be able to reach or utilize downhill ramp 55 and perform fluid half pipe water skimming maneuvers. Width is also functionally related to the vertical rise from sub-equidyne area 35 to downstream ridge edge 4. A preferred ratio of height to width is 1 to 5, with an outside range of 1 to 2 at a minimum and 1 to 10 at a maximum.

A preferred embodiment for the length of the half-pipe shaped containerless incline 1 is at a minimum a length sufficiently wide to perform water skimming maneuvers thereon, and at a maximum a function of desire and/or budget.

A preferred embodiment for the cross-sectional shape of sub-equidyne area 35 and inclined ride surface 3 has been previously shown in FIG. 13$b$. Caution must be taken in the design of supra-equidyne area 36 to insure proper water flow up and over downstream ridge edge 4. Excessive steepness or height above operational dynamics of supercritical flow 8 may result in untimely or improperly located spilling or stream tunneling and an excessive build up of turbulent white water in the sub-equidyne area 35 which may culminate in complete deterioration of supercritical flow 8. However, since advanced riders, in order to maximize speed and perform certain maneuvers, e.g., aerials, prefer a steep supra critical area 36 that approaches or exceeds vertical. Thus, it is preferred that spilling or tunnel wave formation (if any) be limited to adjacent areas, and that the downstream middle half of containerless incline 1 have a cross section substantially as that illustrated in FIG. 13$b$ and that the upstream middle half have a cross section substantially a mirror image of FIG. 13$b$ except as modified per discussions herein.

Figure 24A:
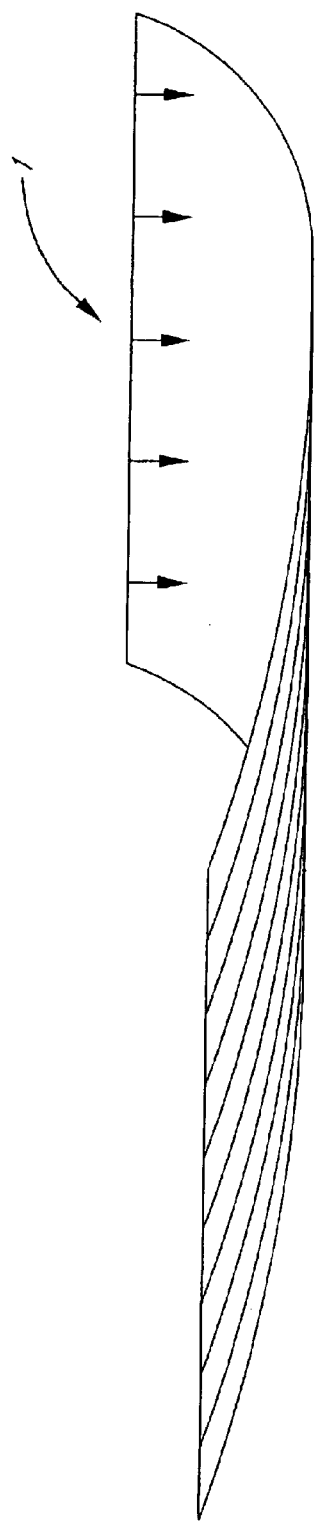
FIG. 24a is a schematic drawing of another embodiment of a containerless incline with fluid half pipe configuration.
Figure 24B:
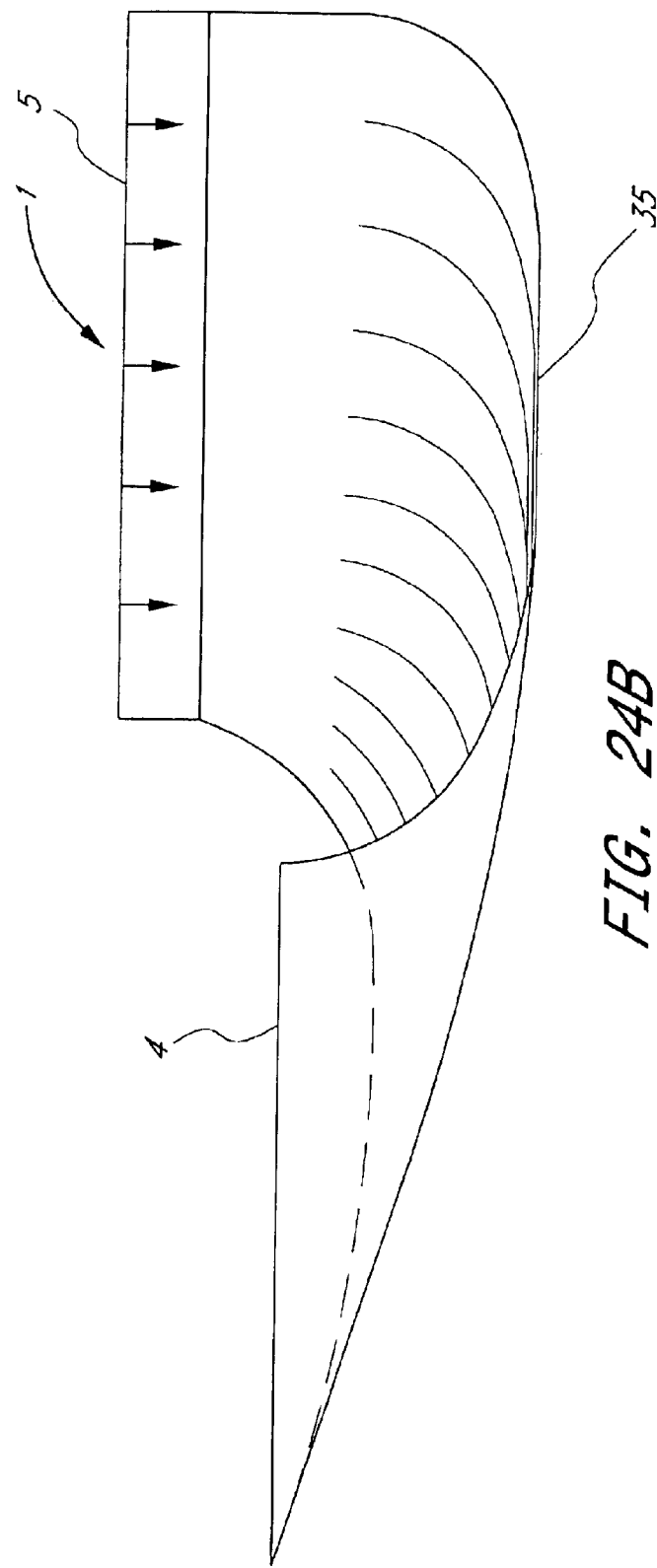
FIG. 24b is a schematic drawing of another embodiment of a containerless incline with fluid half pipe configuration and a modified flow forming bottom to assist in capacity and rider through-put.

In profile, a standard configuration for half-pipe shaped containerless incline 1 is illustrated in FIG. 24$a$. In this standard configuration the cross-sectional elevation, taken longitudinally in the direction of flow, remains constant for the length of the half-pipe. FIG. 24$b$ illustrates an asymmetrical configuration, wherein, downstream ridge edge 4 and upstream edge 5 remain at constant elevations and the width between respective edges 4 and 5 remains constant, however, the distance between respective edges 4 and 5 and sub-equidyne area 35 continues to increase at a constant rate of fall. The object of this particular asymmetrical embodiment is to increase throughput capacity for this half-pipe shape as the result of rider movement in the direction of fall due to the added vector component of gravity force ascribed to the weight of the rider in the direction of fall.

Generally, the elevation of upstream edge 5 will exceed its line-of-flow position on downstream ridge line 4. This differential in elevation will insure that supercritical flow 8 will have sufficient dynamic head to overcome all internal and external friction that may be encountered in its circuit down, across, up, and over containerless incline 1. The preferred ratio by which the elevation of upstream edge 5 exceeds downstream ridge line 4 is 2 to 1 with an outside range from a minimum of ten to nine to a maximum of ten to one. It is also preferred that the respective upstream edge 5 and downstream ridge edge 4 remain at constant elevations along the length of the half-pipe. Variations in elevation are possible, however, source pool 57 water dynamics, receiving pool 58 water dynamics, and maintenance of line of flow dynamic head must be taken into account.

Figure 25:
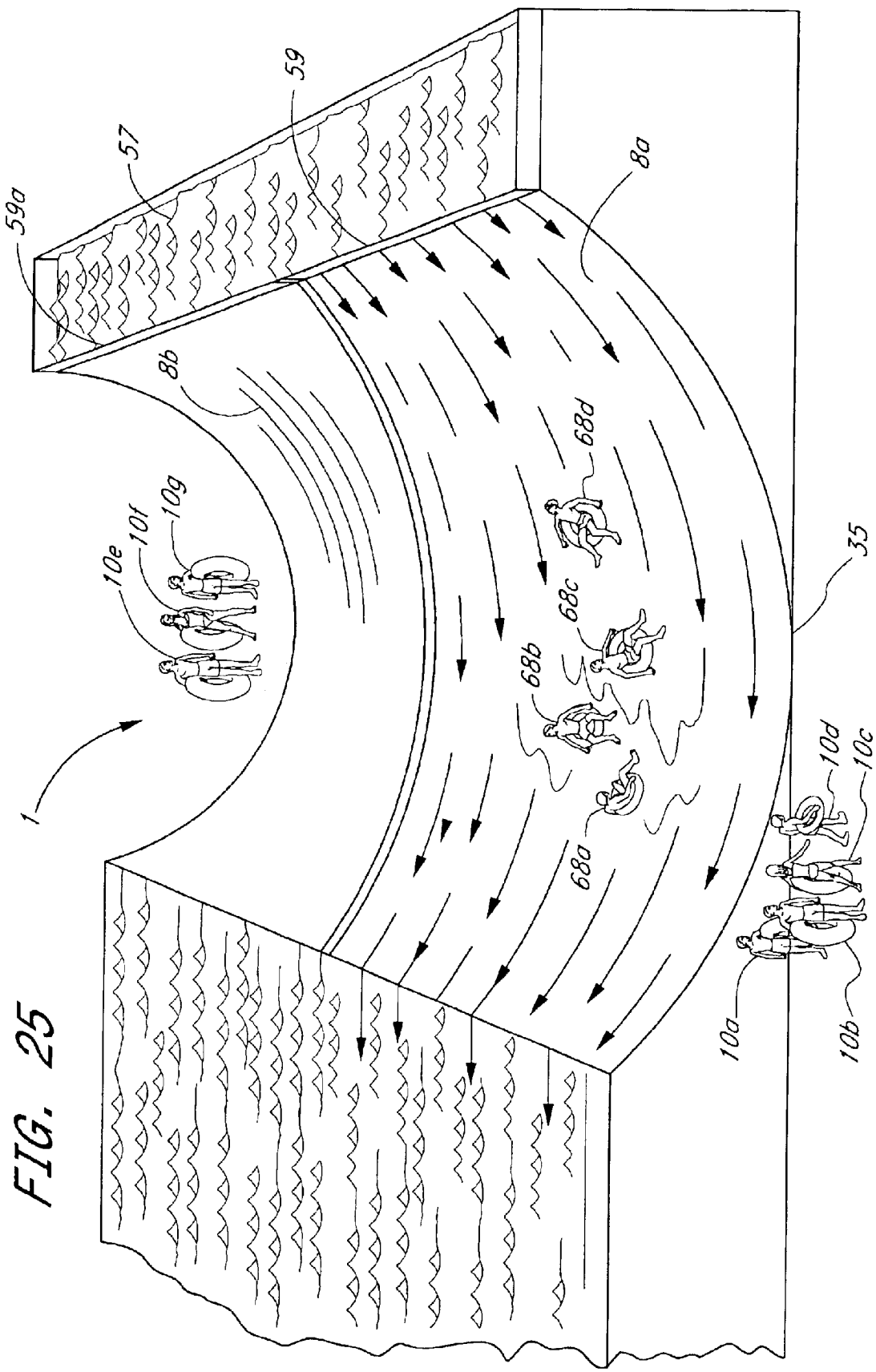
FIG. 25 is a schematic drawing of another embodiment of a containerless incline with fluid half pipe illustrating an improvement to the fluid half pipe to assist in increased through-put capacity.

Variations in the breadth and longitudinal movement of the body of water that flows upon the half-pipe can result in enhancements to rider through-put capacity. FIG. 25 depicts a half-pipe configured containerless incline 1 with a bifurcated dam 59. Supercritical water flow 8$a$ is situated on one half of containerless incline 1. Source pool 57 which supplies supercritical flow 8$a$ is limited by dam 59$a$ to just one-half of containerless incline 1. Riders 10$a$, 10$b$, 10$c$ and 10$d$ enter the flow at any appropriate point, e.g., the sub-equidyne area 35 and perform water skimming maneuvers thereon. After an elapsed period of time, e.g., several minutes, a dam 59$b$ is positioned to block supercritical flow 8a, whereupon the water cease to flow and riders 10a, 10b, 10c and 10d can easily exit. Simultaneous with, or shortly after the blockage by dam 59b, dam 59a opens and supercritical flow 8b commences. Riders 10e, 10f and 10g enter the flow and commence to perform water skimming maneuvers for their allotted time span, whereupon dam 59a is re-positioned and the cycle is set to repeat.

Modifications to the general half-pipe containerless incline 1 can also be in accordance with the principles discussed above, e.g., moving swaths or pressurized flows issuing upon downhill ramp 55, all of which are contemplated pursuant to the previous description of containerless incline 1.

Additional Features

Several peripheral features to containerless incline 1 include: (1) an entry slide system; (2) an entry tow system; (3) attached ride vehicles; (4) fence partitions; and (5) connected synergistic attractions.

Figure 26:
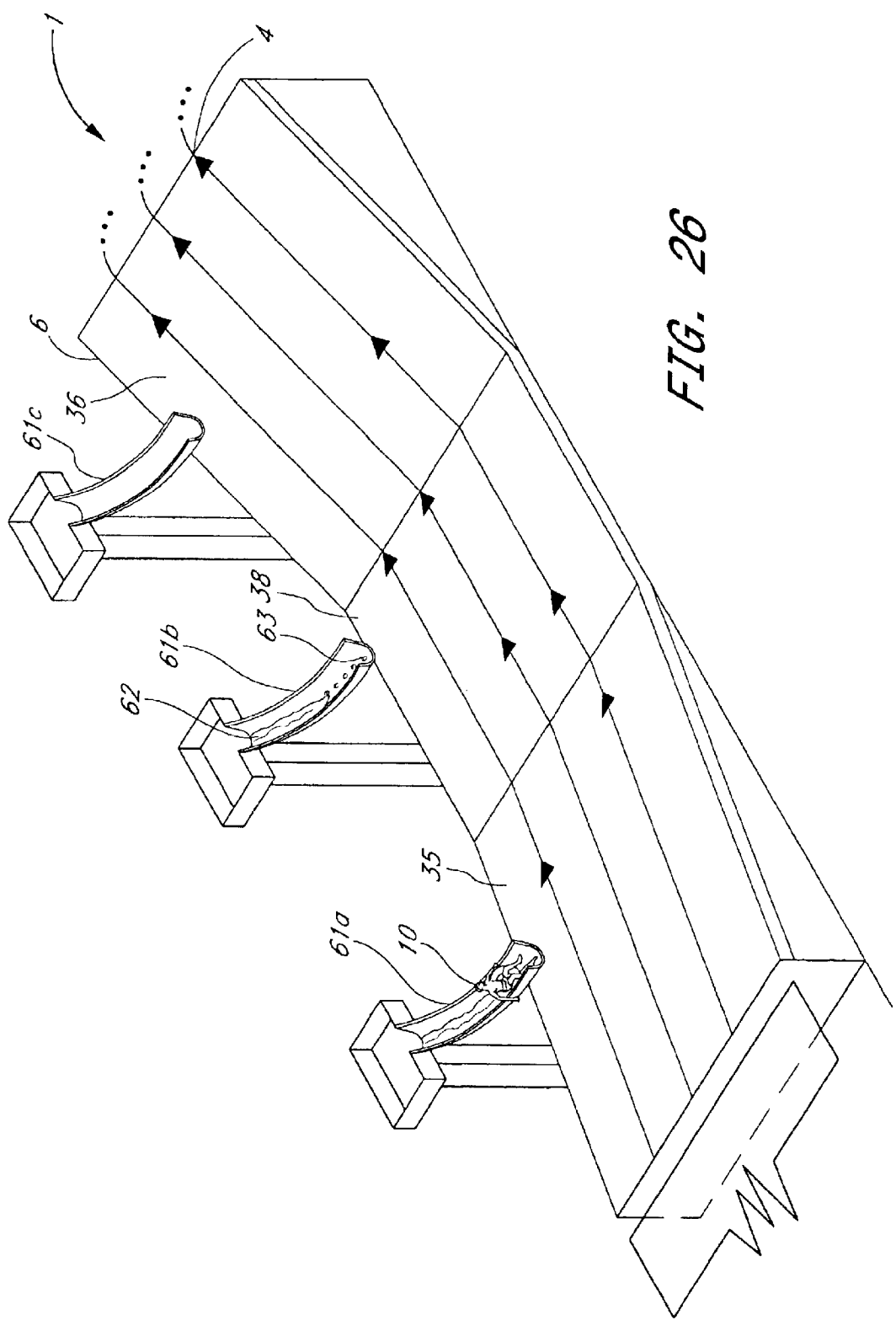
FIG. 26 is a schematic drawing of another embodiment of a containerless incline with a slide system for allowing riders to slide onto the containerless incline.

The entry system to containerless incline 1 is key in providing maximum throughput capacity. As yet, the only entry system discussed for containerless incline 1 is the start platform 33 as referenced in FIGS. 12a, 15b and 17a. Start platform 33 is positioned adjacent containerless incline 1 with its level platform floor at the same approximate elevation as some portion of incline on ride surface 3. An alternative method for containerless incline 1 entry is illustrated in FIG. 26. Slides 61a, 61b and 61c are positioned adjacent to sub-equidyne area 35, equilibrium zone 35 and supra-equidyne zone 38, respectively, of containerless incline 1. Rider 10 slides down slide 61 and onto supercritical flow 8 whereupon rider 10 performs water skimming maneuvers. To minimize flow 8 disturbance, it is preferred that minimal slide lubricate water 62 be poured into slide 61. In the alternative, a ventilation grate 63 can be installed to drain excess slide lubricant water 62. Slide 61 may be positioned anywhere along edge 6; however, the preferred location is as illustrated in FIG. 26. To provide maximum ride comfort for rider 10 transitioning from slide 61 to containerless incline 1, it is preferred that the elevation and final trajectory of slide 61 provide for rider 10 to enter at the surface elevation of supercritical flow 8 and predominately parallel to its plane of flow. Slide 61 can be fabricated out of fiberglass, concrete, concrete covered foam, reinforced fabric, metal, or any other smooth and structurally stable surface suitable for the intended purpose. Slide 61 can be configured to handle multiple riders.

Figure 27:
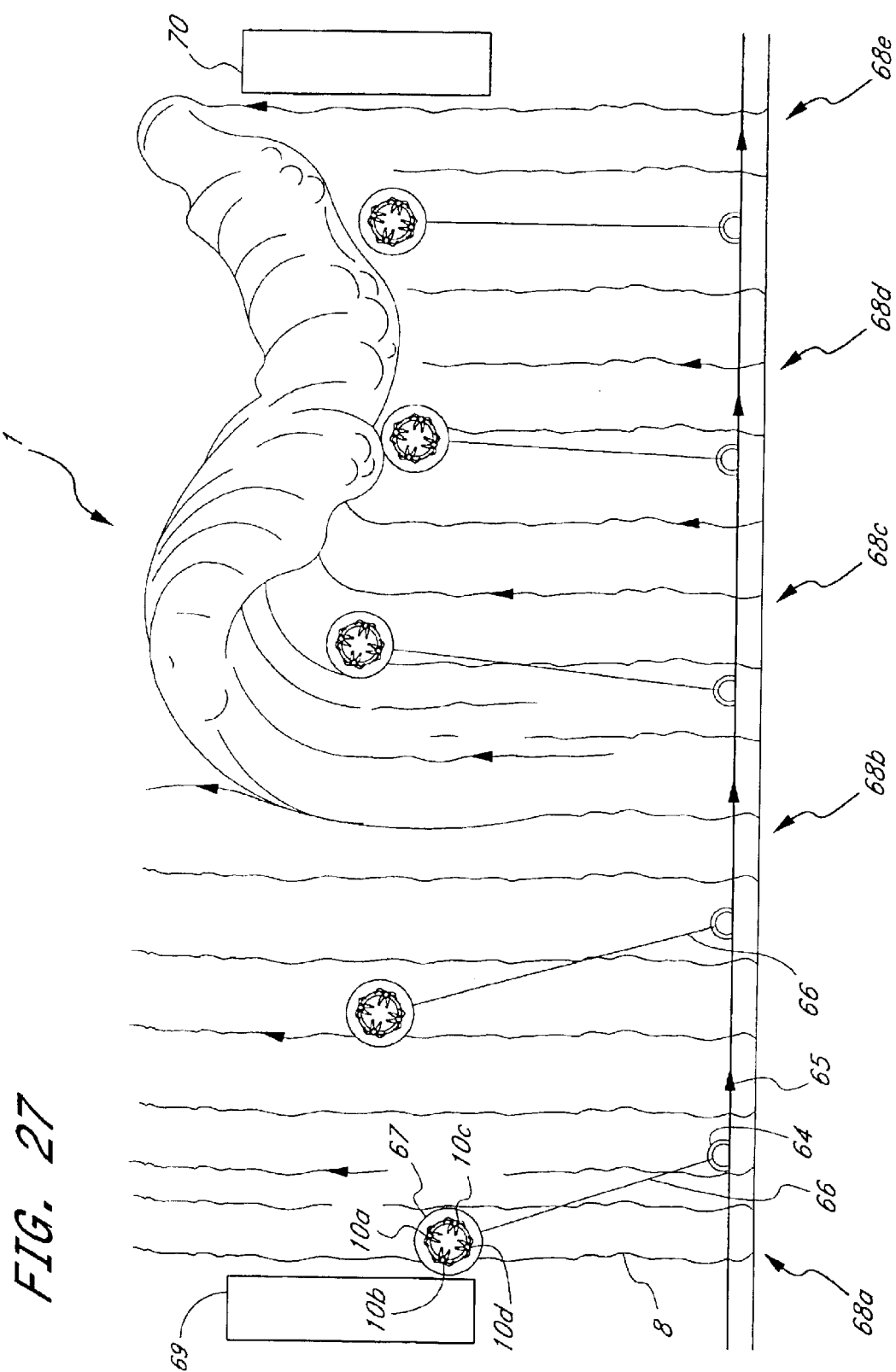
FIG. 27 is a schematic drawing of another embodiment of a containerless incline illustrating a tether load system.

Another class of entry system for containerless incline 1 is provided by tow. FIG. 27 illustrates in plan view containerless incline 1 with supercritical water 8 formed into the shape of a stationary tunnel wave with unbroken shoulder. Controllable tow drive 64 moves in direction 65 and pulls tow rope 66 which is connected to ride vehicle 67 within which riders 10a, 10b, 10c and 10d are seated. Upon entering supercritical flow 8, riders 10 are able to exert some control over their position through the performance of water skimming maneuvers. Controllable tow drive 64 moves at a preferred slow velocity of 0.5 to 2 meters a second. Over a course of time, as indicated by positions 68a, 68b, 68c, 68d and 68e, tow drive 64 pulls tow rope 66, ride vehicle 67 and riders 10a, 10b, 10c and 10d from start area 69 to exit area 70. It is preferred that controllable tow drive 64 allow in and out movement to best position rider 10 and vehicle 67 on the wave shape, e.g., in the tube. Optionally, once rider 10 and vehicle 67 are towed into supercritical flow 8, tow rope 66 could be released and riders 10 would be allowed to perform untethered water skimming maneuvers.

Figure 28:
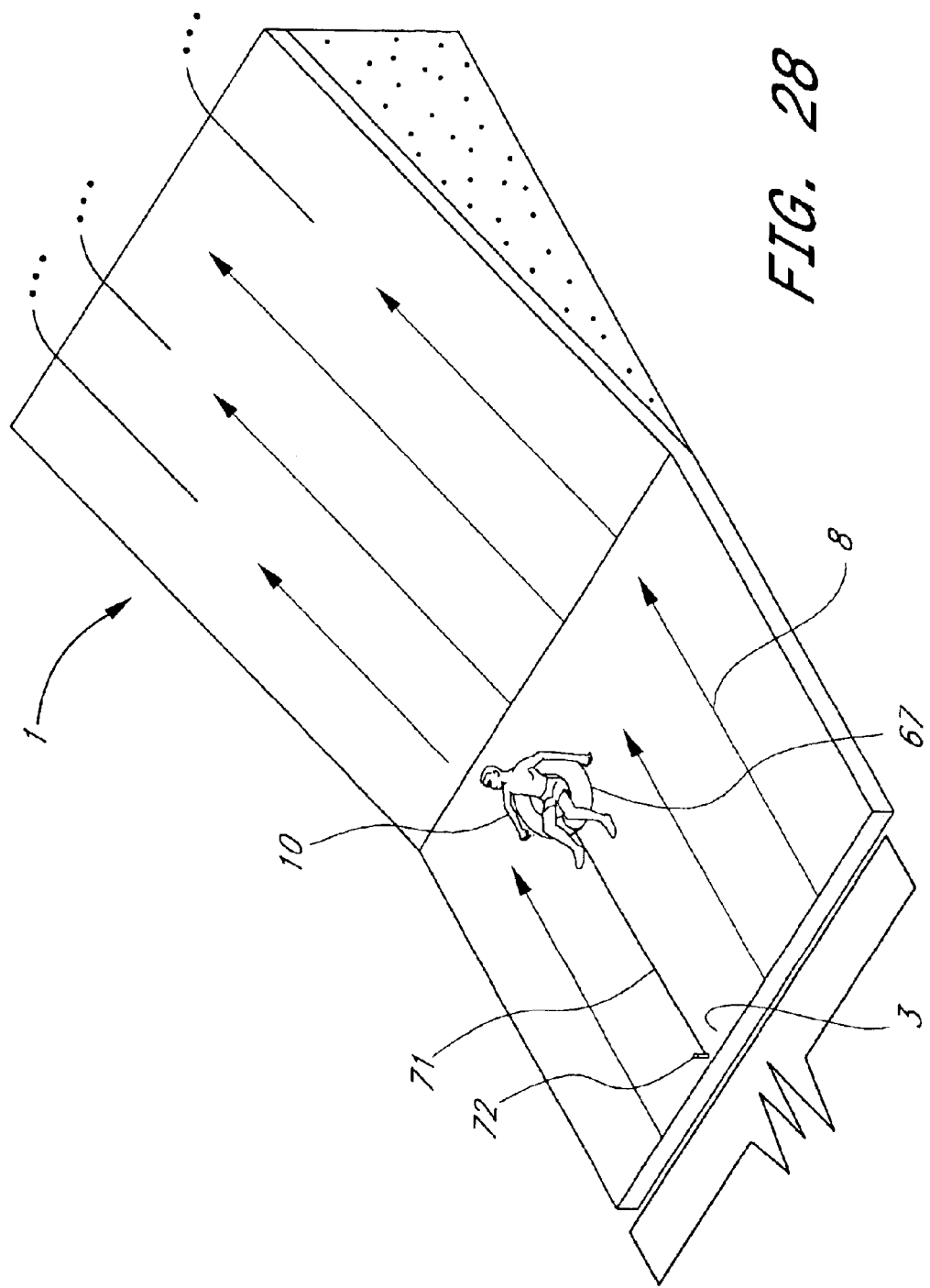
FIG. 28 is a schematic drawing of another embodiment of a containerless incline illustrating a ride vehicle connected by a tether line to a pinion attached to the ride surface.

Another tethering system is shown in FIG. 28 where vehicle 67 is connected by tether 71 to a pinion 72 attached to ride surface 3 of containerless incline 1. When the flow is off, participants can walk over dry ride surface 3 and become seated in there respective vehicles. When supercritical flow 8 is resumed, as illustrated in FIG. 28, a rider can perform water skimming maneuvers for an allotted time, whereafter flow 8 ceases, rider 10 exits and the cycle repeats.

Figure 29:
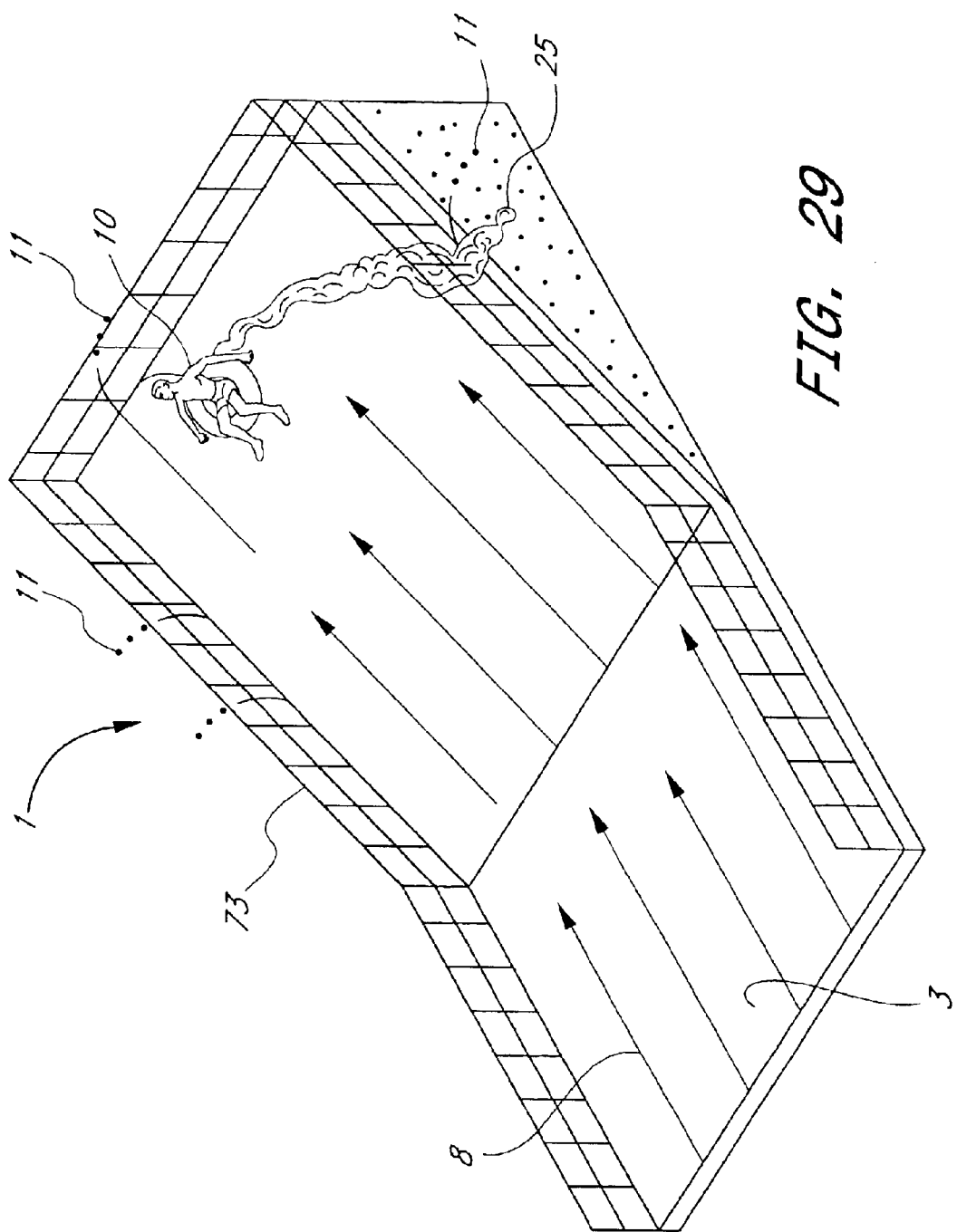
FIG. 29 is a schematic drawing of another embodiment of a containerless incline including a novel flow fence.

A flow fence 73 as shown in FIG. 29 is used in containerless incline 1 to restrict rider 10 from a specified area, and yet still allow either supercritical flow 8, white water 25, or run-off water 11 to pass underneath. Thus, flow fence 73 does not restrain water, it only restrains riders and vehicles. Flow fence 73 is preferably comprised of a parallel rail or series of rails. If more than one rail, sufficient space must be provided to avoid catching a riders hand or foot. Padded rope, metal, wood, fiberglass or any other non-abrasive padded material would be suitable for flow fence 73 fabrication. It is preferred that flow fence be cantilevered above the water flow; however, minimal drag fence posts are possible. Flow fence 73 could also be used to serve as a dividing mechanism to create a number of lanes upon ride surface 3 to prohibit rider contact.

Figure 30:
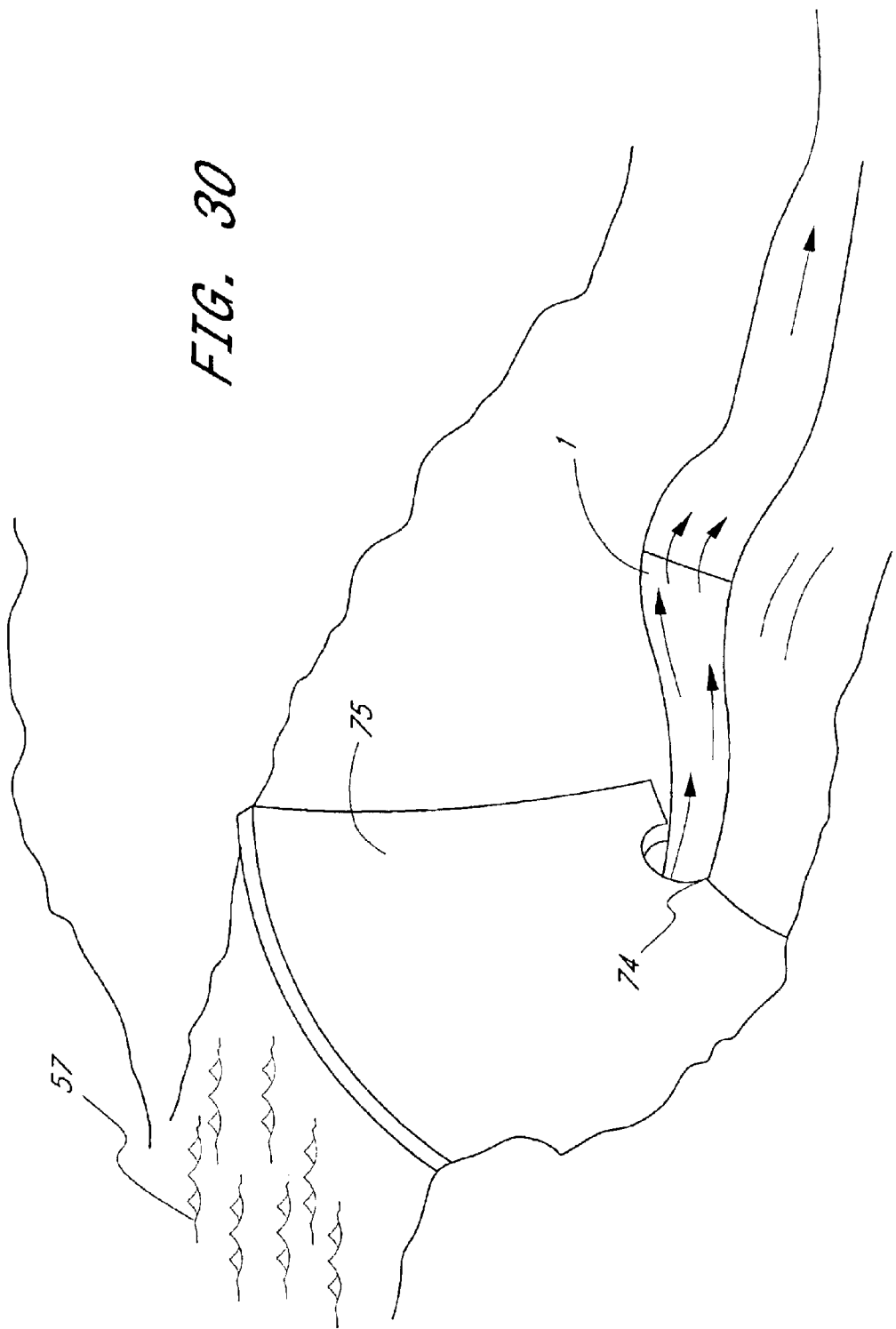
FIG. 30 is a schematic drawing of another embodiment of a containerless incline wherein the containerless incline is connected to the tail race of a dam.

Synergistic attractions or structures can be connected with containerless incline 1 to take advantage of the kinetic energy of motion of that water which is provided to or exits from containerless incline 1. Regarding connections to the upstream side, FIG. 30 shows containerless incline 1 connected to a tail race 74 of a dam 75. Such connection provides a minimal operating expense source pool 57 of water for containerless incline 1 as well as providing an energy disbursing/downstream erosion control system for the dam operator. Errosion control is achieved by containerless incline 1 disbursing the kinetic energy of tail race 74 before it encounters a fragile stream bed further downstream.

Figure 31:
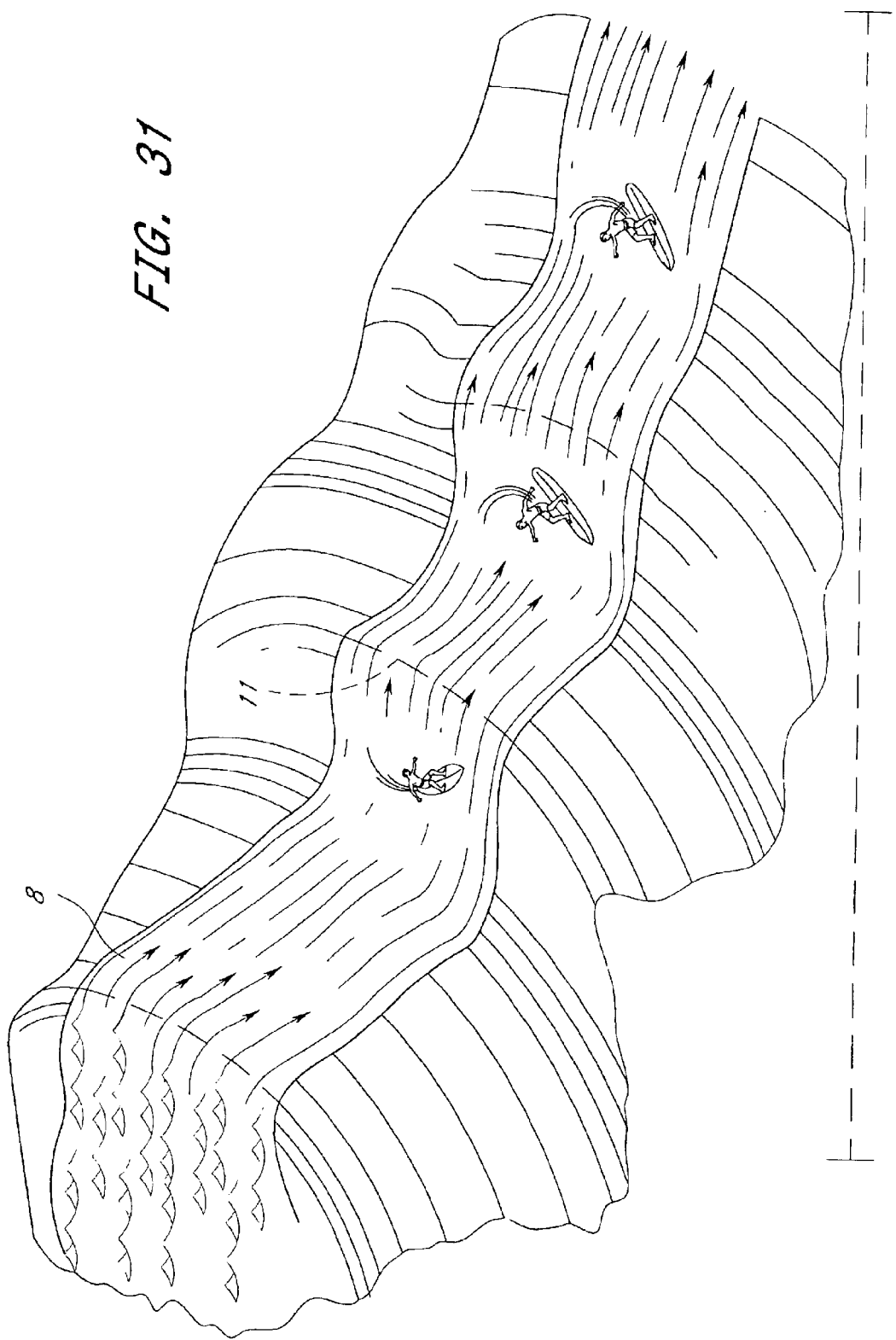
FIG. 31 is a schematic drawing of another embodiment of a containerless incline wherein multiple containerless incline half-pipes are interconnected.
Figure 32:
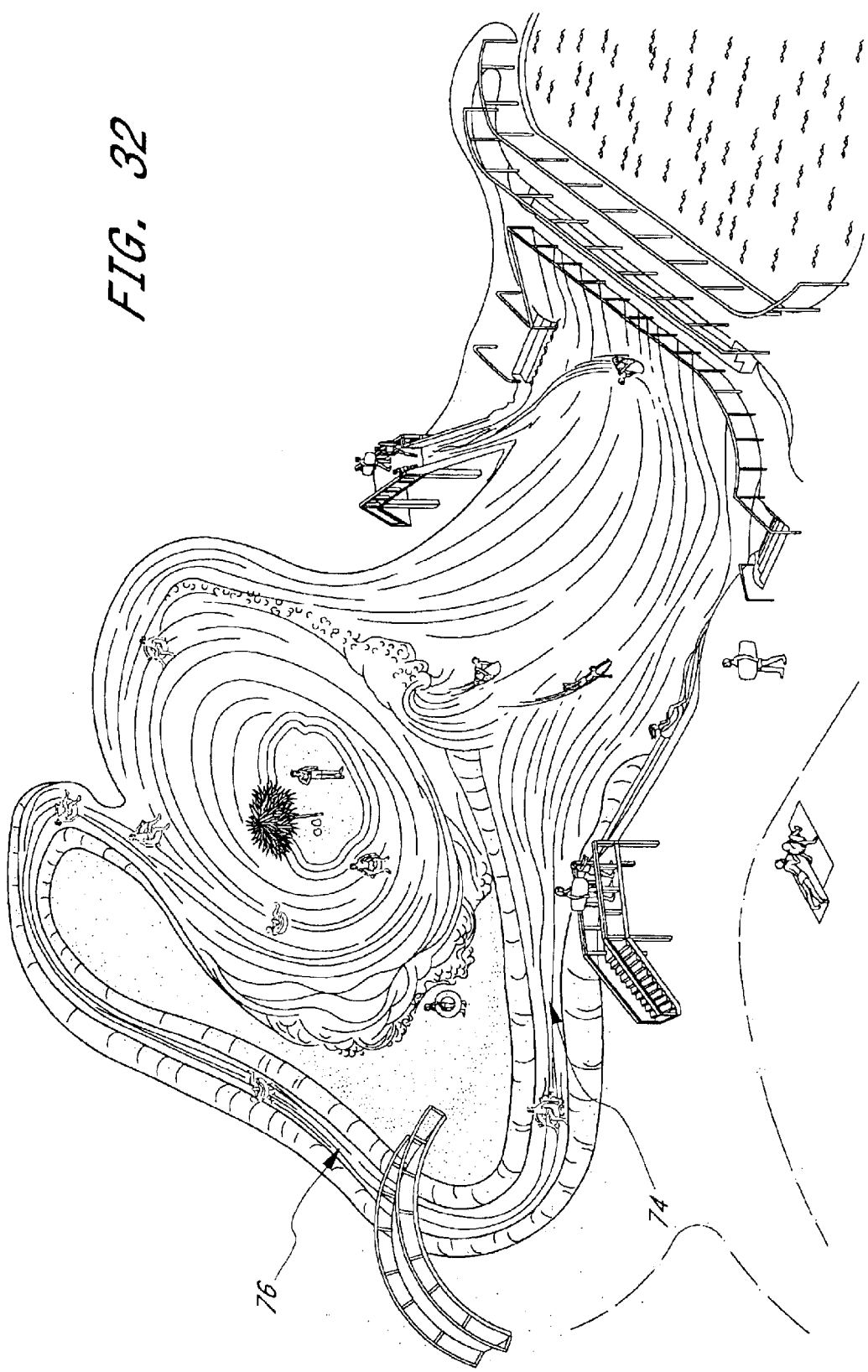
FIG. 32 is a schematic drawing of another embodiment of a containerless incline connected to a white water river course.

Connecting the tail race 74 of containerless incline I to other half-pipe shapes in series will also enable the remaining kinetic energy of supercritical flow 8 or run-off water 11 that exits from containerless surface 1 to serve in a co-generative capacity by supplying water for a succeeding containerless incline, as shown in FIG. 31. FIG. 32 shows tail race 74 of containerless incline 1 connected to a white water river course 76.

It should also be pointed out, in connection with the invention described above, that similar flow characteristics can be achieved for aesthetic purposes such as a fountain or other water sculpture. As merely one example, the forms or shapes shown and described in connection with FIGS. 16a–16d and FIG. 17 can be utilized to create attractive water fountains. As described above, these forms and flow parameters can be varied to achieve a variety of wave or water shapes when the flow separates. In addition, an attractive variable fountain can be created by randomly modifying the flow parameters against a wave shape or form. This feature heightens the excitement and interest generated by a non-static fountain.

In particular, a fountain generated in accordance with the principles of the present invention can utilize the containerless incline structure described particularly in connection with FIGS. 1–2. Moreover, the downwardly inclined ramp 55 (FIG. 22) and the half pipe configurations (FIG. 23) can also be utilized to generate unique water fountain shapes. Similarly, the moving swaths embodiment as depicted in FIGS. 19 and 20 provide advantageous structure for similar water fountain shapes.

As will be recognized by those skilled in the art, certain modifications and changes can be made without departing form the spirit or intent of the present invention. For example, the proportions given do not have to be geometrically precise; approximations are sufficient. The same is true of limits in angles, radii and ratios. The temperature and density of the water will have some difference; although the range of temperatures in which surfer/riders would be comfortable is fairly limited.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A water ride attraction for supporting a rider performing water skimming maneuvers, comprising:
   an inclined riding surface adapted to receive and support the rider thereon, the riding surface having a lateral edge;
   a water supply mechanism for providing a substantially supercritical high speed sheet flow of water which flows generally upward upon the inclined riding surface so that the flow generally conforms thereto, the high speed sheet flow having a Froude number between about 2–75, and a portion of the flow of water spills over the lateral edge;
   wherein the riding surface is shaped so as to form at least a portion of the high speed sheet flow of water into a wave shape.

2. The water ride attraction of claim 1, wherein the high speed sheet flow of water has a Froude number between about 4–25.

3. The water ride attraction of claim 1, wherein the riding surface is configured so that the rider can ride the flow of water spilling over the lateral edge.

4. The water ride attraction of claim 3 additionally comprising an exit area adjacent the lateral edge.

5. The water ride attraction of claim 4, wherein the exit area comprises a pool.

6. A water ride for supporting a rider performing water skimming maneuvers, comprising:
   a riding surface having an inclined slope, the riding surface being adapted to receive and support the rider thereon; and
   a water supply mechanism for providing a substantially supercritical flow of water which flows generally upward upon the inclined slope so that the flow generally conforms thereto, the riding surface having at least one lateral edge and being configured so that a portion of the flow of water spills over the at least one lateral edge.

7. The water ride of claim 6, wherein the riding surface is configured so that the rider can perform skimming maneuvers upon the flow of water, and the rider can skim across the at least one lateral edge so as to exit the riding surface.

8. The water ride of claim 7 additionally comprising a rider exit area adjacent the at least one lateral edge.

9. The water ride of claim 8 additionally comprising a transition surface between the riding surface and the rider exit area.

10. The water ride of claim 9, wherein the exit area is positioned at a level at or below the lowest elevation of the riding surface.

11. The water ride of claim 10, wherein the exit area comprises a pool.

12. The water ride of claim 10, wherein the exit area comprises a shut-down floor comprising a plurality of drain holes.

13. The water ride of claim 7, wherein at least a portion of the flow of water that spills over the at least one lateral edge is directed back to the water supply mechanism.

14. The water ride of claim 6, wherein the riding surface is characterized by having no containment walls along the at least one lateral edge.

15. The water ride of claim 6, wherein the at least one lateral edge extends generally in the same direction as the flow of water.

16. The water ride of claim 6, wherein the flow of water comprises a high speed sheet flow of water.

17. The water ride of claim 16, wherein the sheet flow of water has a Froude number between about 2–75.

18. The water ride of claim 17, wherein the sheet flow of water has a Froude number between about 4–25.

19. The water ride of claim 6, wherein the riding surface is shaped so as to form the flow of water into a wave shape.

20. A water ride attraction, comprising:
    a riding surface having a generally inclined portion, the riding surface having at least one lateral edge; and
    a water outlet for directing a flow of water onto the inclined portion so that the flow of water flows generally upward onto the inclined portion of the riding surface, wherein a rider may ride on the flow of water and perform water skimming maneuvers thereon;
    wherein the riding surface is configured so that a portion of the flow of water flows over the at least one lateral edge off of the riding surface and downwardly therefrom.

21. The water ride of claim 20, comprising a source of water under pressure.

22. The water ride of claim 21, wherein the water ride is configured so that the flow of water on the riding surface has a sub-equidyne area, an equilibrium area, and a super-equidyne area.

23. The water ride of claim 21, wherein the riding surface comprises a second lateral edge.

24. The water ride of claim 23, wherein a portion of the flow of water flows over the second lateral edge off of the riding surface and downwardly therefrom.

25. The water ride of claim 23, wherein the water ride is configured so that the flow of water forms a hydraulic jump on the inclined portion of the riding surface, and white water from the hydraulic jump flows over the lateral edges of the riding surface and downwardly off the riding surface.

26. The water ride of claim 23, wherein the lateral edges are substantially parallel to one another.

27. The water ride of claim 23, wherein the lateral edges are not parallel to one another.

28. The water ride of claim 20, wherein the riding surface is configured so that rider ingress can be obtained by passing across the at least one lateral edge.

29. The water ride of claim 20, wherein the riding surface is configured so that rider egress can be obtained by passing across the at least one lateral edge.

30. The water ride of claim 20, wherein the flow of water comprises a high speed sheet flow of water.

31. The water ride of claim 30, wherein the sheet flow of water has a Froude number between about 2–75.

32. The water ride of claim 31, wherein the sheet flow of water has a Froude number between about 4–25.

33. The water ride of claim 20, wherein the riding surface is shaped so as to form the flow of water into a wave shape.

34. A water ride attraction, comprising:

an inclined riding surface adapted to receive and support a rider, the riding surface having a lateral edge;

an exit area adjacent the lateral edge, the exit area having an outlet for removing water therefrom; and a sheet flow of water which flows generally upward onto the riding surface, the flow generally conforming to the shape of the riding surface, and a portion of the flow of water flowing across the lateral edge of the riding surface and into the exit area;

wherein the riding surface and sheet flow of water are configured so that a rider can perform skimming maneuvers on the flow of water, and the rider can ride across the lateral edge of the riding surface and into the exit area.

35. The water ride of claim 34, wherein the exit area is arranged at a level at or below the lowest elevation of the ride surface.

36. The water ride of claim 35 additionally comprising a transition surface between the ride surface and the exit area, wherein the transition surface is substantially contiguous with the ride surface.

37. The water ride of claim 36, wherein the transition surface is substantially downward sloping.

38. The water ride of claim 34, wherein the sheet flow comprises a high speed sheet flow.

39. The water ride of claim 38, wherein the sheet flow of water has a Froude number between about 2–75.

40. The water ride of claim 39, wherein the sheet flow of water has a Froude number between about 4–25.

41. The water ride of claim 34, wherein the exit area comprises a basin.

42. The water ride of claim 41 additionally comprising a pump for providing the sheet flow of water, and wherein the basin communicates with the pump, and at least a portion of the water that flows into the basin is directed to the pump.

43. A method for providing a simulated wave water ride attraction on which a rider may perform water skimming maneuvers, comprising:

providing a riding surface having a generally inclined slope and a lateral edge;

directing a high speed sheet flow of water onto the riding surface so that the flow of water is formed into a wave shape by the riding surface, wherein there is substantially no correspondence between the wave size and the water depth, and a portion of the flow of water spills over the lateral edge; and controlling the speed of the flow of water.

44. The method of claim 43, wherein the rider can ride the flow of water over the lateral edge.

45. The method of claim 43, comprising directing the high speed sheet flow of water onto the inclined riding surface at a speed so as to form an unbroken yet rideable wave face.

46. The method of claim 43, comprising directing the high speed sheet flow of water onto the inclined riding surface at a speed so as to form a spilling wave with a smooth unbroken shoulder.

47. The method of claim 43, comprising directing the high speed sheet flow of water onto the inclined riding surface at a speed so as to form a white water bore.

48. The method of claim 43, comprising directing the high speed sheet flow of water onto the inclined riding surface at a speed so as to form a stream tunnel wave.

49. The method of claim 43, wherein varying the speed of the sheet flow of water can vary the wave size and shape between an unbroken yet rideable wave face, a spilling wave with a smooth unbroken shoulder, and a white water bore.

* * * * *